(12) United States Patent
Yuh et al.

(10) Patent No.: US 7,280,176 B2
(45) Date of Patent: *Oct. 9, 2007

(54) LIQUID CRYSTAL DISPLAY HAVING A MODIFIED ELECTRODE ARRAY

(75) Inventors: Jin-Tae Yuh, Kyungki-do (KR); Kye-Hun Lee, Kyungki-do (KR); Byoung-Sun Na, Kyungki-do (KR); Dong-Gyu Kim, Kyungki-do (KR); Jong-Woong Chang, Kyungki-do (KR); Jung-Uk Shim, Kyungki-do (KR); Jang-Kun Song, Seoul (KR); Hyun-Sik Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 32 days.

This patent is subject to a terminal disclaimer.

(21) Appl. No.: 10/389,888

(22) Filed: Mar. 18, 2003

(65) Prior Publication Data

US 2003/0151711 A1 Aug. 14, 2003

Related U.S. Application Data

(62) Division of application No. 09/184,953, filed on Nov. 3, 1998, now Pat. No. 6,577,368.

(30) Foreign Application Priority Data

| Nov. 3, 1997 | (KR) | 97-57823 |
| Jan. 21, 1998 | (KR) | 98-1702 |
| Feb. 20, 1998 | (KR) | 98-5288 |
| Feb. 26, 1998 | (KR) | 98-6087 |
| Mar. 12, 1998 | (KR) | 98-8231 |
| Mar. 12, 1998 | (KR) | 98-8233 |
| Mar. 12, 1998 | (KR) | 98-8235 |

(51) Int. Cl.
G02F 1/1343 (2006.01)
G02F 1/1335 (2006.01)

(52) U.S. Cl. ........................ 349/141; 349/106

(58) Field of Classification Search ........... 349/141, 349/106, 38, 44, 110
See application file for complete search history.

(56) References Cited

U.S. PATENT DOCUMENTS 4,946,259 A 8/1990 Matino et al. ............ 350/339
5,576,861 A 11/1996 Abileah et al.

(Continued)

FOREIGN PATENT DOCUMENTS

JP 6-250159 9/1994

*Primary Examiner*—Toan Ton
(74) *Attorney, Agent, or Firm*—F. Chau & Assoc., LLC

(57) ABSTRACT

A liquid crystal display having electrodes on a single substrate includes a transparent planar electrode elongated in the transverse direction formed on the inner surface of the substrate, and an insulating film is deposited thereon. A plurality of linear electrodes, which are elongated in the longitudinal direction and either transparent or opaque, are formed on the insulating film. When voltages applied, the electric field is symmetrical with respect to the longitudinal central line of the linear electrodes and the longitudinal central line of a region between the linear electrodes, and has parabolic or semi-elliptical lines of force having a center on a boundary line between the planar and the linear electrodes.

17 Claims, 73 Drawing Sheets

U.S. PATENT DOCUMENTS

| | | | |
|---|---|---|---|
| 5,598,285 A * | 1/1997 | Kondo et al. | 349/39 |
| 5,892,562 A * | 4/1999 | Yamazaki et al. | 349/141 |
| 5,982,460 A | 11/1999 | Zhang et al. | |
| 6,005,650 A | 12/1999 | Kim et al. | |
| 6,097,465 A | 8/2000 | Hiroki et al. | |
| 6,130,737 A | 10/2000 | Aratani et al. | |
| 6,246,453 B1 | 6/2001 | Zhang et al. | |
| 6,256,081 B1 | 7/2001 | Lee et al. | |
| 6,285,428 B1 | 9/2001 | Kim et al. | |
| 6,778,245 B2 * | 8/2004 | Hiroshi | 349/141 |

* cited by examiner

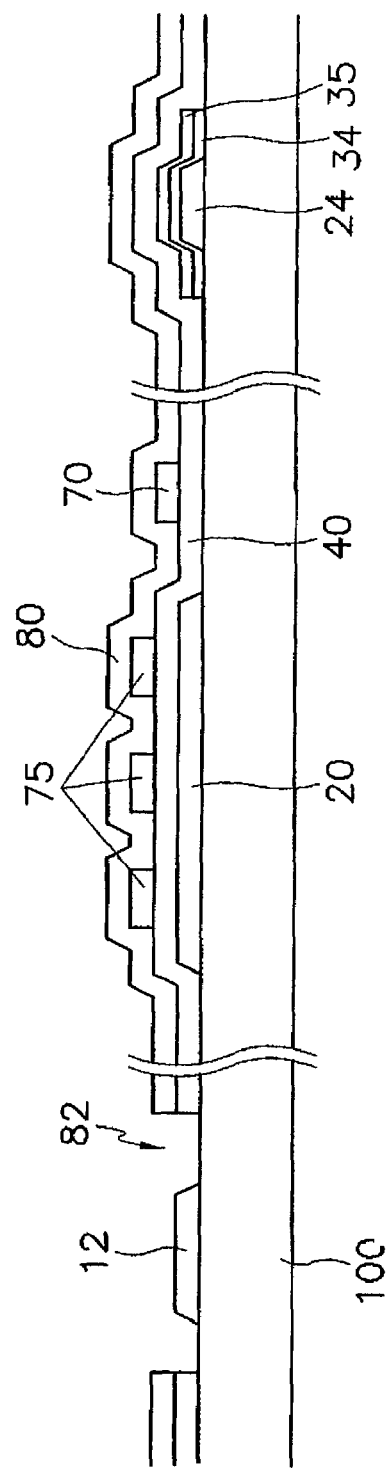
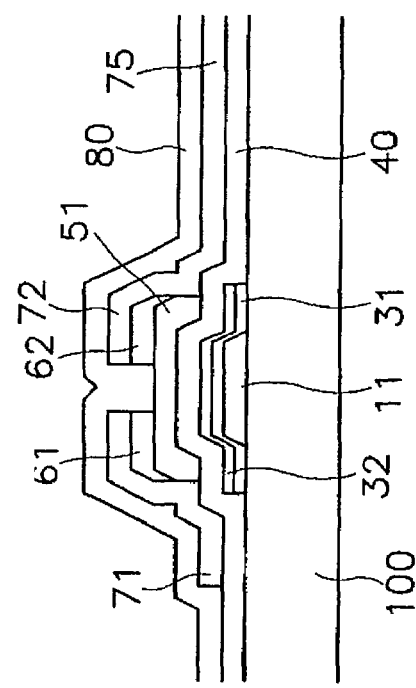

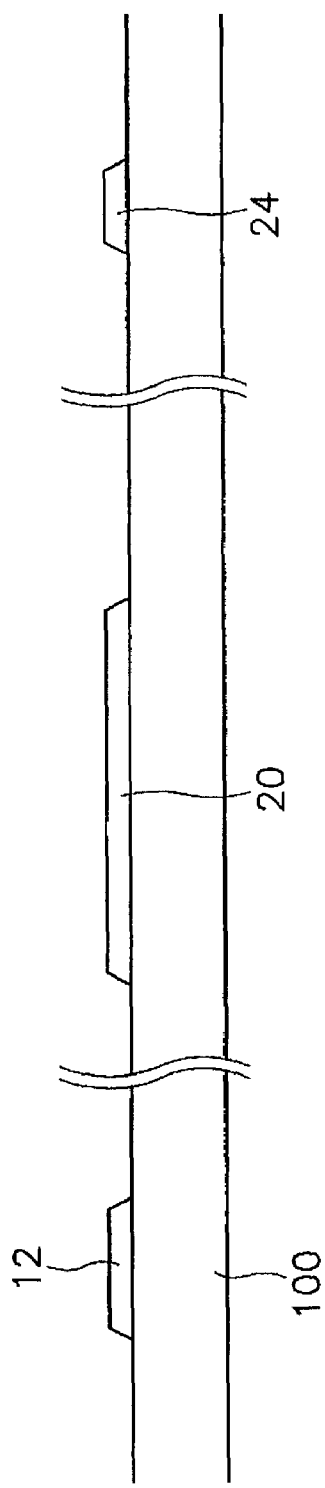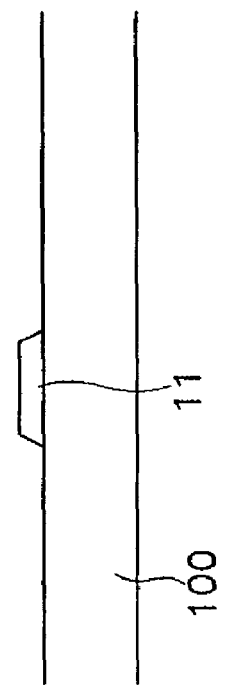

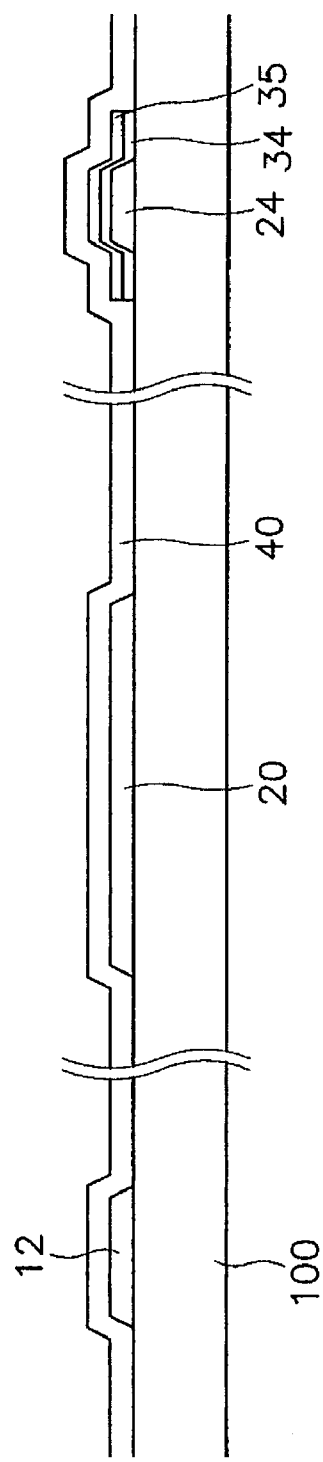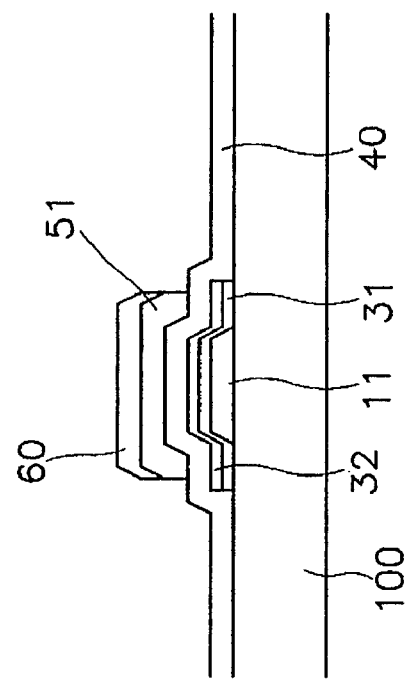

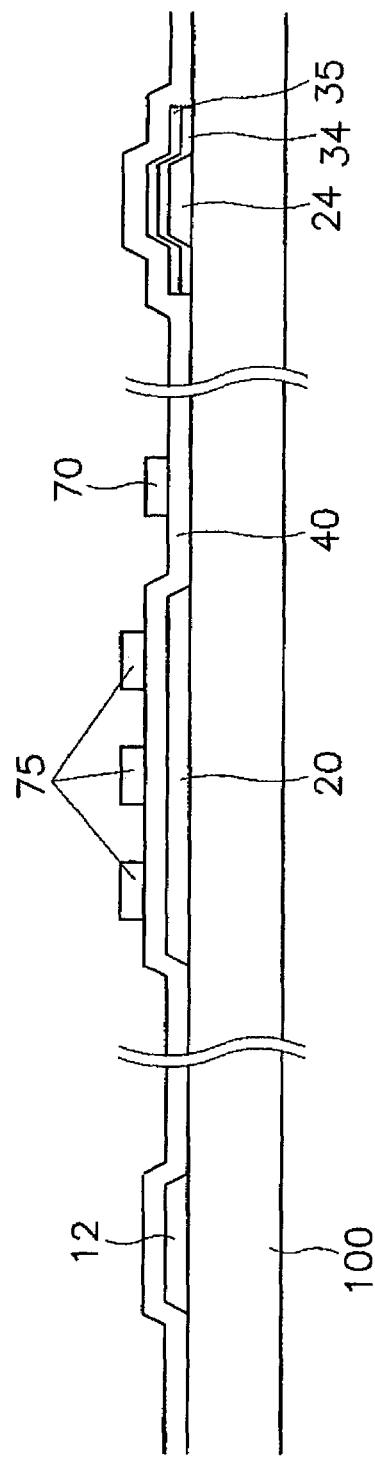
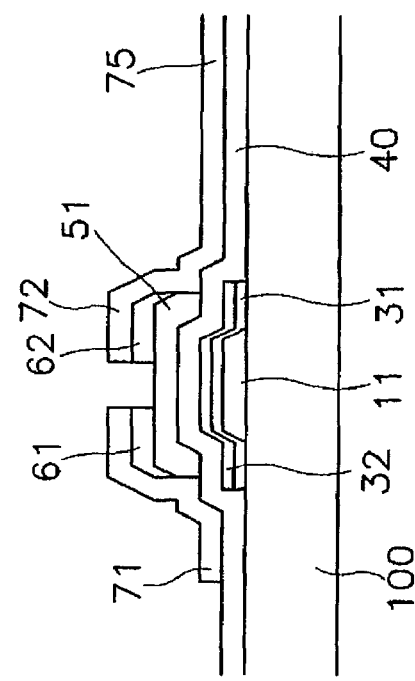
FIG.39B
FIG.39C

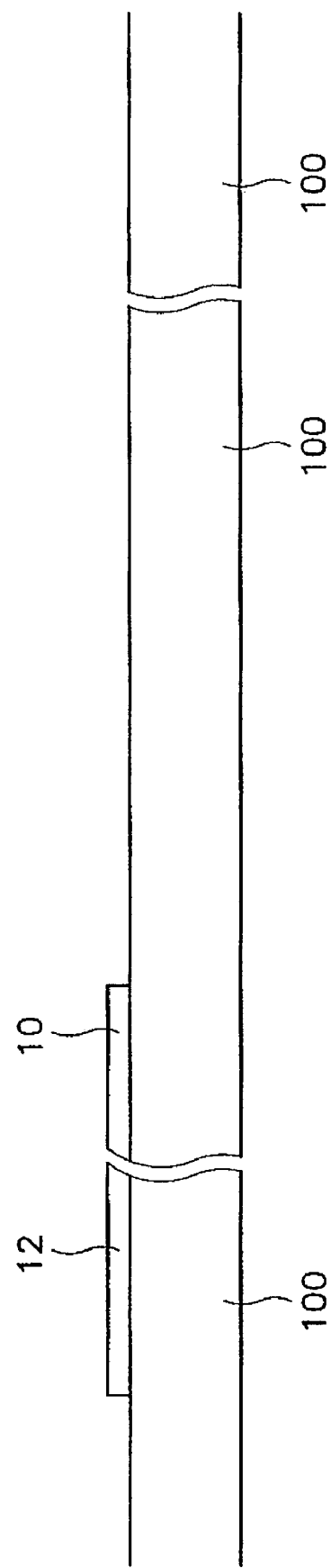

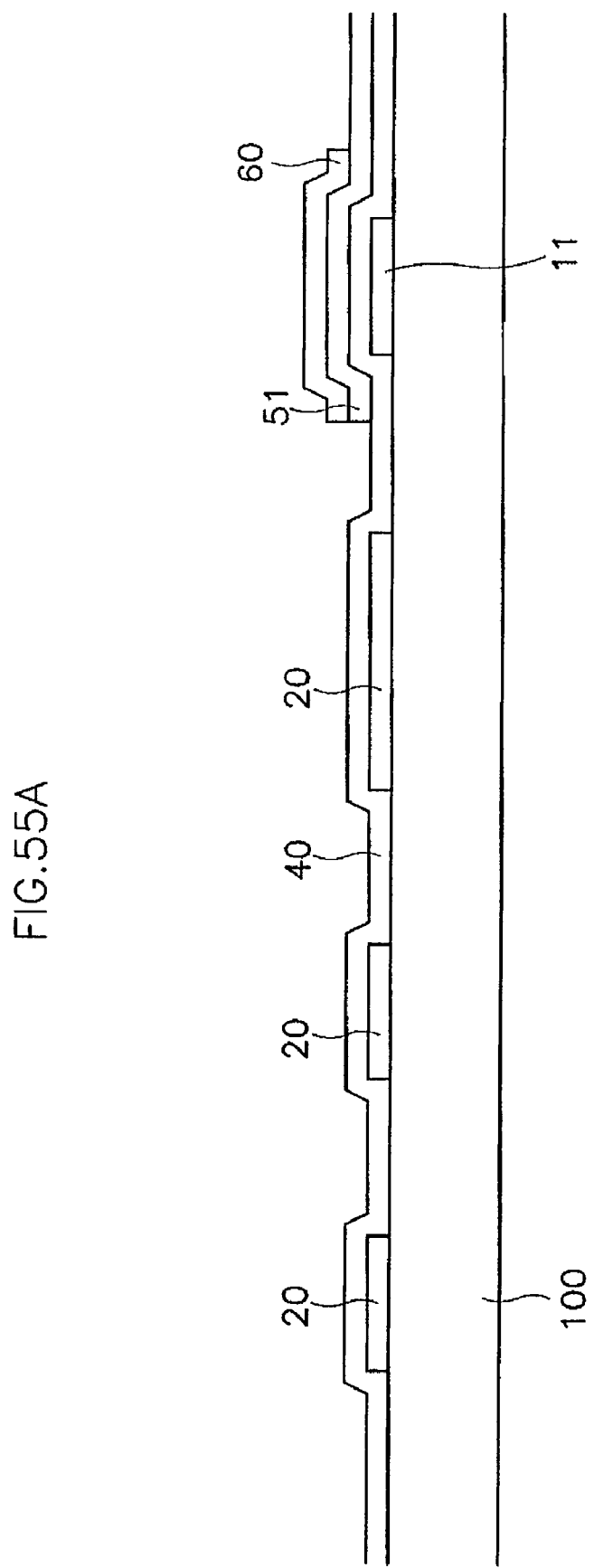

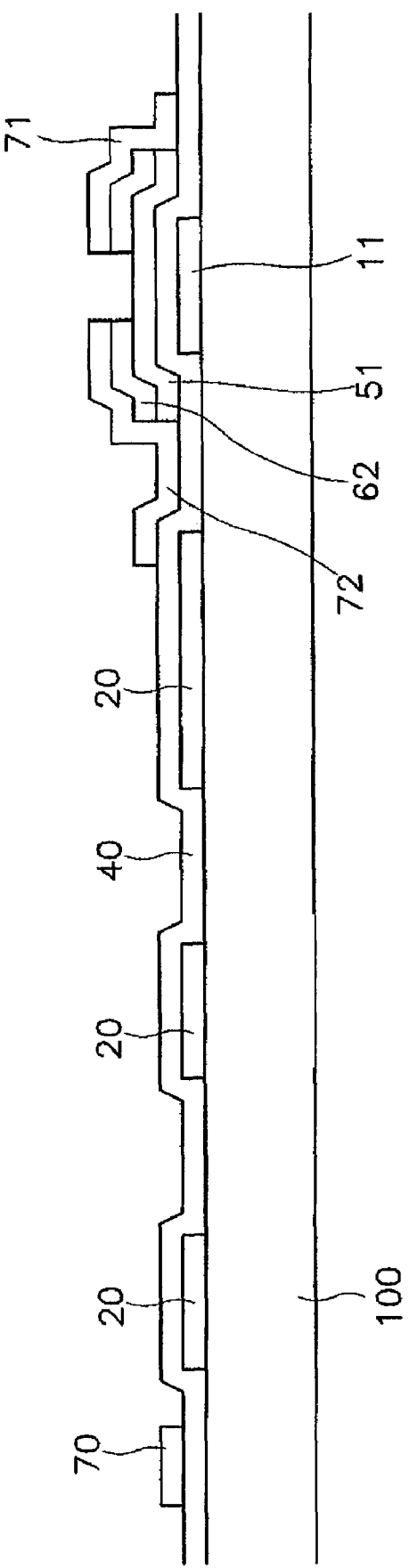

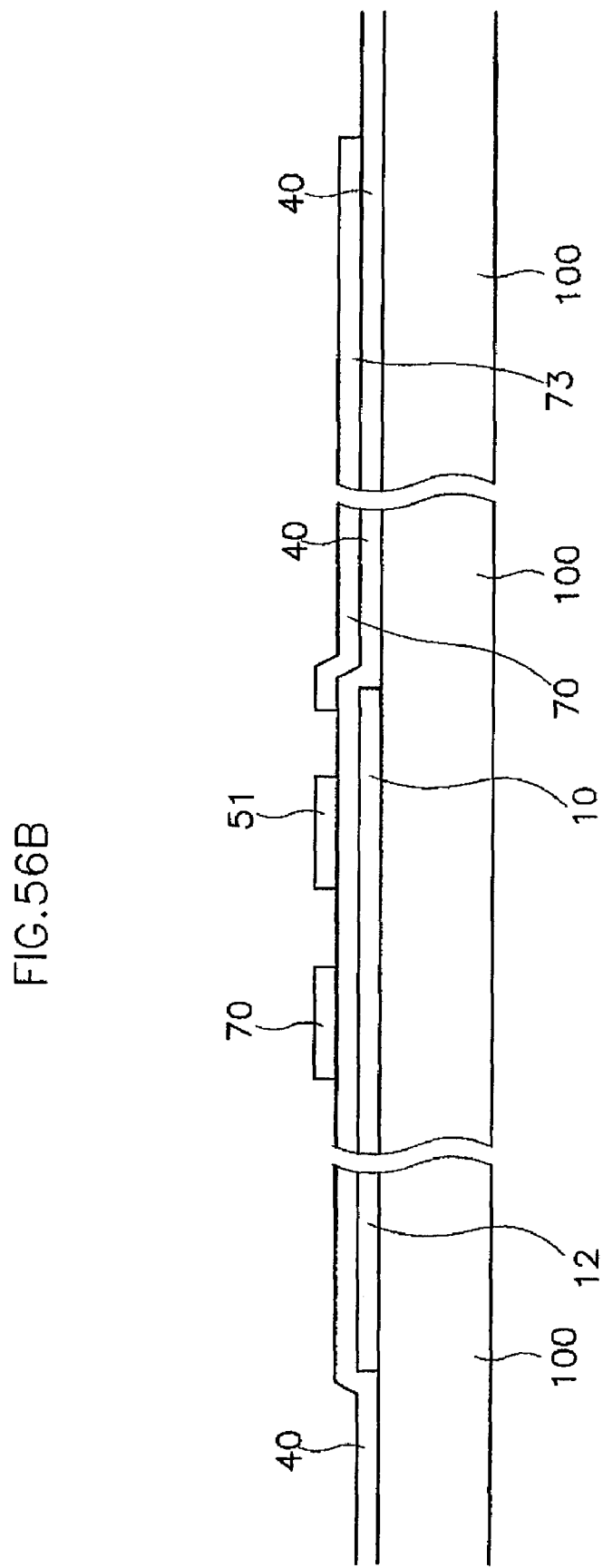

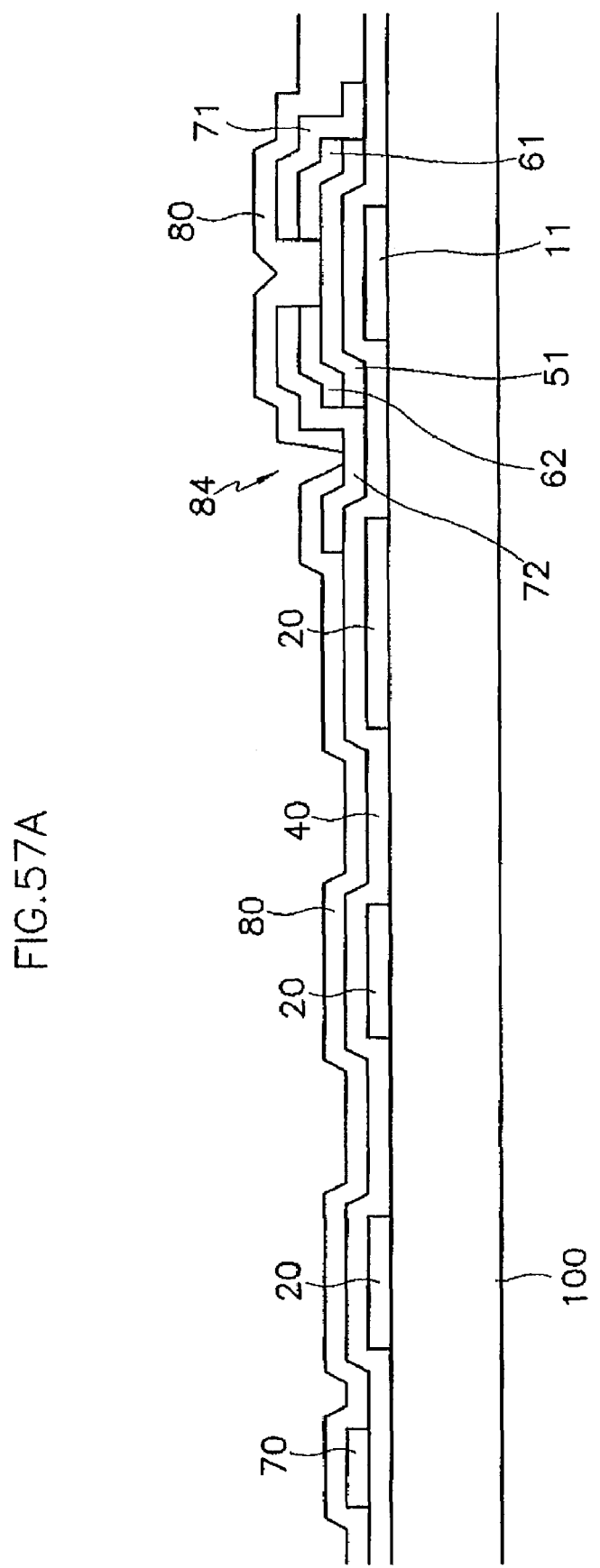

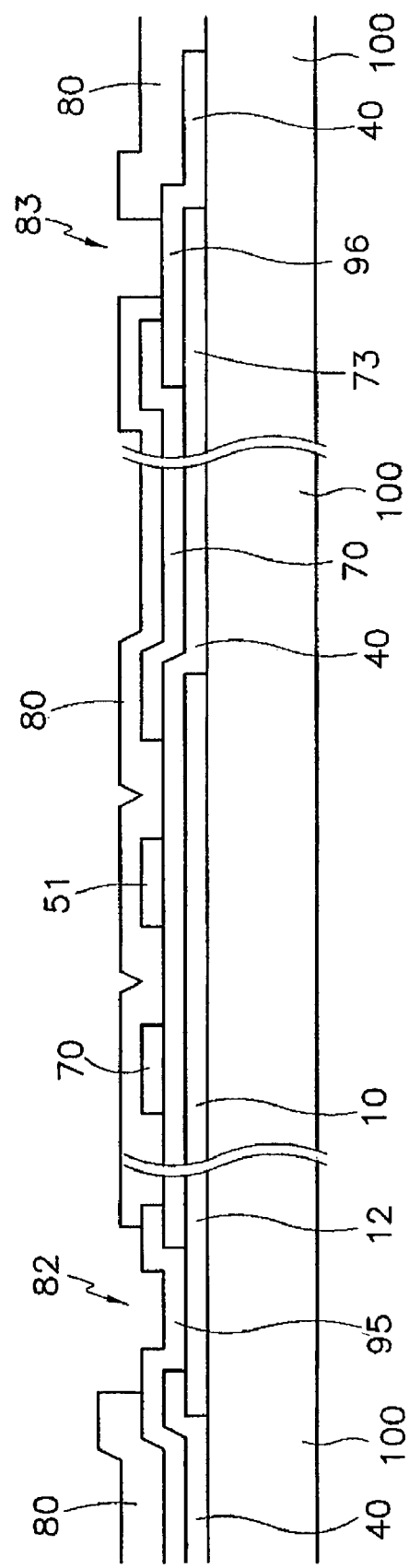

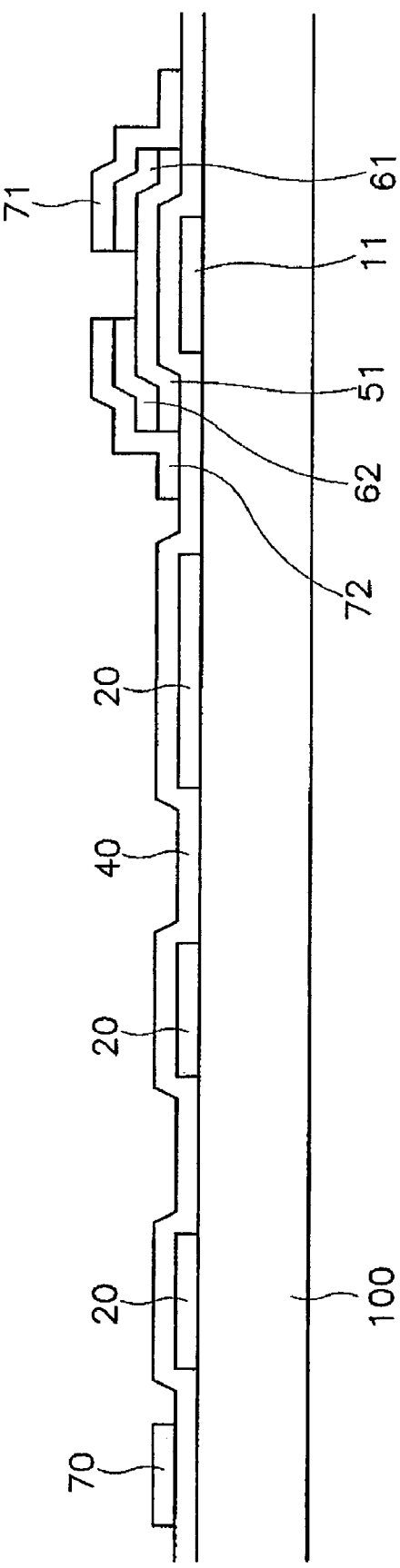

LIQUID CRYSTAL DISPLAY HAVING A MODIFIED ELECTRODE ARRAY

CROSS REFERENCE

This is a divisional application of U.S. application Ser. No. 09/184,953 filed on Nov. 3, 1998 now U.S. Pat. No. 6,577,368.

BACKGROUND OF THE INVENTION (a) Field of the Invention

The present invention relates to a liquid crystal display (LCD). More particularly, the present invention relates to an LCD having a modified electrode array.

(b) Description of the Related Art

Generally, an LCD is a display having two substrates and a liquid crystal layer therebetween. A plurality of electrodes are formed on the inner surfaces of one or both of the substrates. A pair of polarizers are attached to the outer surfaces of the substrates, and the liquid crystal layer serves as an optical switch. When a potential difference is applied to the electrodes, liquid crystal molecules are re-arranged according to the potential difference. The re-arranged liquid crystal molecules scatter the incident light that has passed through first polarizers, and change the transmission characteristics of the light, thereby controlling the transmittance of the light through second polarizers (analyzer) and displaying images.

As an example of a conventional LCD, U.S. Pat. No. 5,576,861 discloses a twisted nematic LCD (TN-LCD) where an upper electrode and a lower electrode are respectively formed on the inner surfaces of upper and lower substrates and a nematic liquid crystal material is injected therebetween. The liquid crystal molecules are twisted parallel to the substrates. The potential difference applied between the two yields an electric field perpendicular to the substrates. The liquid crystal molecules are re-arranged such that torques due to a dielectric anisotropy and an aligning treatment is balanced against each other. The torque due to the dielectric anisotropy forces the long axes of the liquid crystal molecules to be parallel to the field direction, and the magnitude of this torque depends on the intensity of the electric field. The elastic torque generated by the aligning treatment like a rubbing forces the long axes of the liquid crystal molecules to be parallel to a predetermined direction. When the direction of the liquid crystal twists by 90 degrees on going from the lower electrode to the upper electrode, and the polarization directions of the polarizers are perpendicular to each other, the polarization of the incident light, in absence of the electric field, rotates by 90 degrees. Thus, the light passes through the analyzer, thereby causing a white state. However, when sufficient electric field is applied to the liquid crystal layer, the incident light passes through the liquid crystal layer without changing its polarization. Consequently, the light cannot pass through the analyzer, thereby causing black state.

As another example of a conventional LCD, U.S. Pat. No. 5,598,285 discloses an LCD, where two linear electrodes parallel to each other are formed on either of the two substrates. A liquid crystal layer lies over the region between the two electrodes, and where the liquid crystal molecules are aligned parallel to the substrates. The potential difference between the two electrodes yields an electric field substantially parallel to the substrates and perpendicular to the two electrodes. The liquid crystal molecules are re-arranged such that the torque due to the dielectric anisotropy and the elastical torque due to rubbing are balanced against each other. When the polarization directions of the polarizers are perpendicular to each other, in absence of electric field, the crossed polarizer blocks the incident light and makes the liquid crystal display to be in a black state. However, when sufficient electric field is applied to the liquid crystal layer, the polarization of the incident light varies and the light passes through the analyzer, thereby causing a white state.

The above-mentioned LCDs have disadvantages described hereinafter respectively.

The principal disadvantage of the TN-LCD is its narrow viewing angle. In the TN-LCD, the larger an angle made by the direction of the user's eye and the direction normal to a surface of a display, the larger the value $\Delta n \cdot d$ where birefringence $\Delta n$ is the difference of the refractive indices between the directions of the long axes and the short axes of the liquid crystal molecules and d is the thickness of the liquid crystal layer. Accordingly, the contrast, which is defined as the luminance of the brightest state divided by that of the darkest state, decreases dramatically. In addition, gray inversion phenomenon also occurs. Accordingly, the viewing angle that provides the contrast of 10 is very narrow, and thus image quality is deteriorated when viewed at an angle greater than the viewing angle.

To compensate the viewing angle, methods using phase difference compensating films are suggested in U.S. Pat. No. 5,576,861, but they have disadvantages in manufacturing cost and the number of the process steps since the phase difference compensating films are additionally attached. Furthermore, the satisfactory viewing angle may not be still obtained even though the phase retardation compensation films are used.

The U.S. Pat. No. 5,598,285 also has disadvantages in power consumption and aperture ratio. The LCD disclosed in the U.S. Pat. No. 5,598,285 has an electric field of which strength is dependent on the positions. The field strength becomes weaker as it moves further away from the electrodes. Therefore, in order to obtain sufficient field strength at the point far from the electrodes, high driving voltage is required. In addition, since all the electrodes are formed on one substrate and storage capacitors are formed to obtain sufficient capacitance, the aperture ratio is small.

In the meantime, since the liquid crystal display is a passive display, it requires an external light source. A white light is usually used for the light source of the liquid crystal display, and red, green and blue color filters are used for color display. The color filters are formed on one of the substrates, and a black matrix for preventing light leakage at the boundaries of the color filters is formed therebetween.

The light from the light source changes its properties, such as polarization, in the liquid crystal layer, and the transmittance of the light depends on the wavelength of the light. The transmittance also depends on the driving mode of the liquid crystal display.

In the case of TN LCDs, the transmittance of the blue light differs from those of the red and green lights by 10%. Moreover, the IPS LCD has the difference of the transmittances of the blue, red and green lights more than 40%.

In order to reduce the difference in the transmittance, two methods are conventionally used. One is using a backlight unit and a driving circuit and the other is making a cell gap to be different for the pixels of different colors by adjusting the height of the color filters. However, the former method may increase the manufacturing cost and the number of process steps, and the latter may cause uneven rubbing.

SUMMARY OF THE INVENTION

An object of the present invention is to obtain a wide viewing angle.

Another object of the present invention is to reduce power consumption of the liquid crystal display.

Still another object of the present invention is to enlarge the aperture ratio.

In order to accomplish the above-mentioned objects, the LCD electrode array is modified.

First and second electrodes insulated from each other are overlapped at least in part. The second electrode forms a continuous plane between the first electrode, and one pixel includes at least one first electrode and one second electrode.

The potential difference applied between the two electrodes when applying voltages to the electrodes yields an electric field. The shape of an electric line of force is semi-ellipse or parabola having a center on a boundary line or a boundary region between the first electrode and the second electrode. The electric field on the electrodes has vertical and horizontal component.

The liquid crystal molecules on the first electrode or the second electrode and in the boundary region between the two electrodes are re-arranged to have a twist angle and a tilt angle due to the vertical and the horizontal components of the electric field. Therefore, the polarization of the incident light changes by the rearrangement of liquid crystal molecules.

As described above, a wide viewing angle may be obtained since the liquid crystal molecules are re-arranged to have both the twist angle and the tilt angle.

In addition, the liquid crystal molecules on the first electrode and the second electrode contribute to displaying images since the electric field has the vertical and horizontal components on the first electrode and the second electrode as well as in the boundary region between the two electrodes.

In addition, power consumption is low since the strength of the electric field is large in the boundary region between the first electrode and the second electrode.

In addition, the aperture ratio may be enlarged since a storage capacitor for obtaining a sufficient storage capacitance is not additionally required since the two electrodes are overlapped via an insulating film when using a thin film transistor (TFT) as a switching element.

Additional objects and advantages of the present invention are set forth in part in the following description, and will be obvious from the description. The objects and advantages of the invention will be realized and attained by means of the elements and combinations particularly pointed out in the appended claims.

BRIEF DESCRIPTION OF THE DRAWINGS

The accompanying drawings, illustrate embodiments of the present invention and, together with the description, serve to explain the principles of the invention.

FIGS. 35B and 35C are cross-sectional views taken along lines VII1B-VIIB' and VII1C-VII1C' in FIG. 35A;

FIGS. 36A to 39C shows intermediate structures of the LCD shown in FIGS. 35A to 35C;

FIGS. 54A to 57B shows intermediate structures of the LCD shown in FIGS. 51 to 53;

FIGS. 65 and 66 are cross-sectional views taken along lines XIIIA-XIIIA' and XIIIB-XIIIB' in FIG. 64;

DETAILED DESCRIPTION OF THE PREFERRED EMBODIMENTS

A liquid crystal display (LCD) according to the embodiments of the present invention will be described with reference to the drawings.

First, an LCD according to the first embodiment of the present invention is described in detail with reference to FIGS. 1 through 11.

Figure 1:
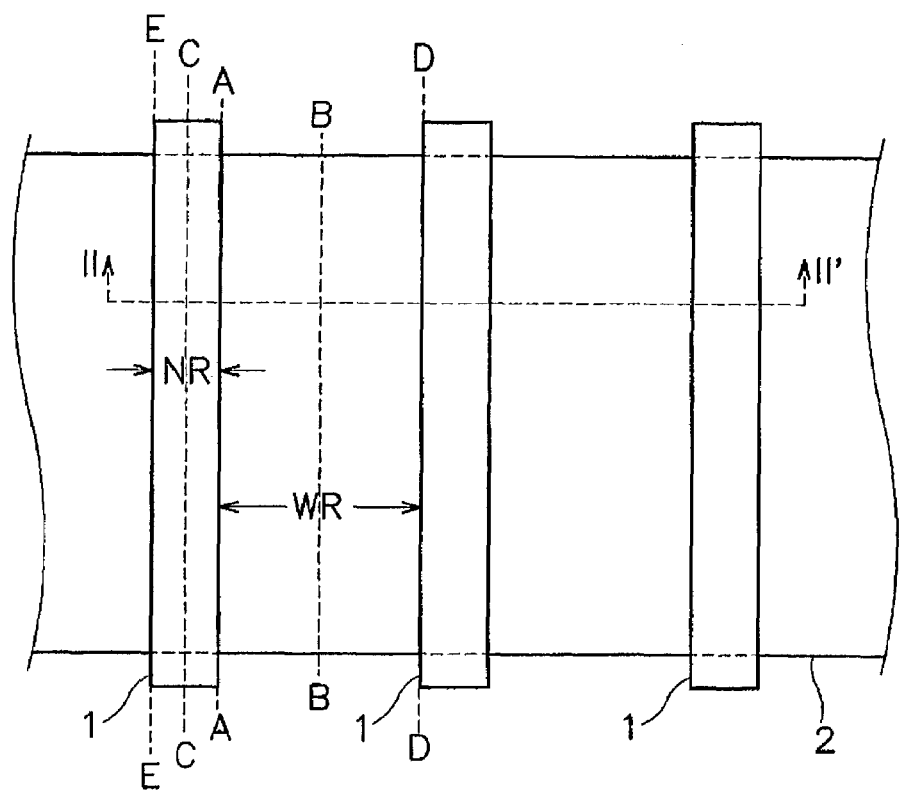
FIG. 1 is a layout view of electrodes of a liquid crystal display (LCD) according to a first embodiment of the present invention.
Figure 2:
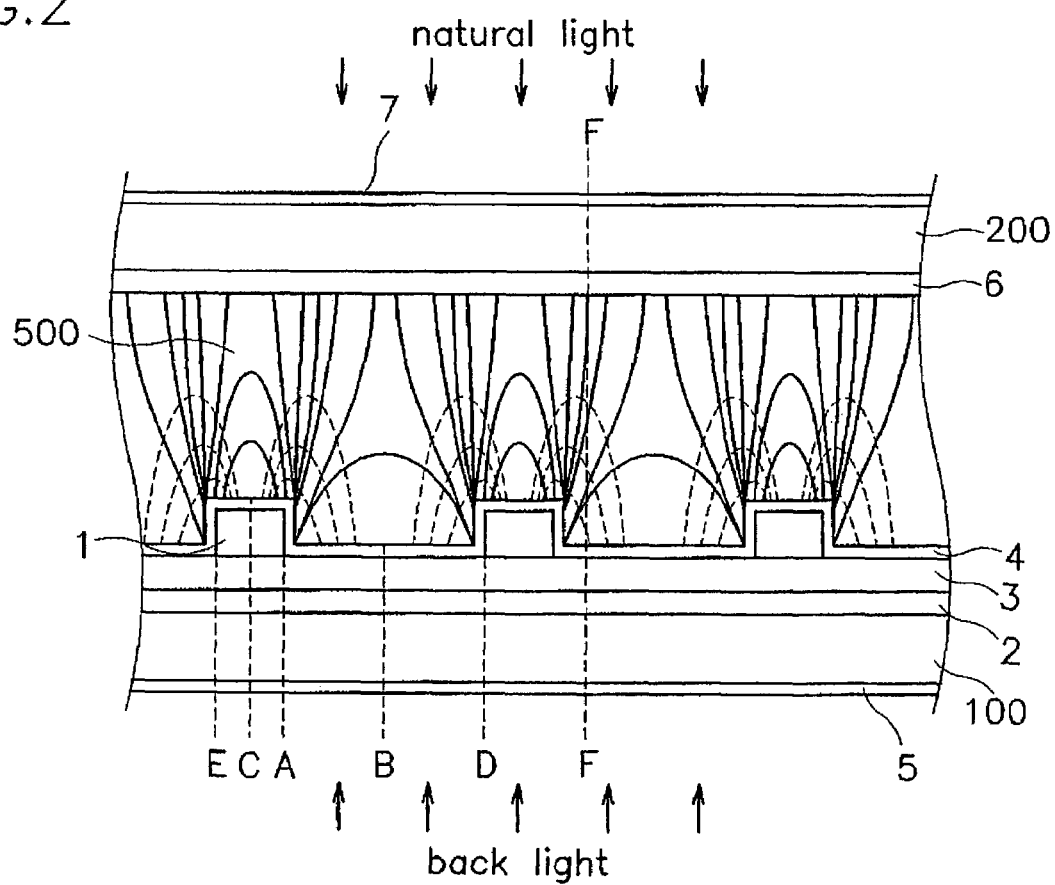
FIG. 2 is a cross-sectional view taken along line II-II' in FIG. 1, which shows both upper and lower substrates as well as equipotential lines and lines of electrical force between the two substrates.

FIG. 1 is a layout view of electrodes of an LCD according to the first embodiment of the present invention, and FIG. 2 is a cross-sectional view taken along the line II-II' in FIG. 1, which illustrates both upper and lower substrates as well as equipotential lines and lines of electrical force between the substrates.

First, the structures of a lower substrate on which electrodes are formed and an upper substrate of the LCD are described in detail.

A planar electrode 2 made of transparent conductive material such as indium tin oxide (ITO) is formed on the inner surface of a lower substrate 100 made of a transparent insulating material such as glass or quartz. The planar electrode 2 has a predetermined longitudinal width and is elongated in the transverse direction. The planar electrode 2 is covered with an insulating film 3, and a plurality of narrow linear electrodes 1 which are parallel to each other and elongated in the longitudinal direction are formed on the insulating film 3. The linear electrodes 1 may be transparent or opaque. The width of the linear electrode 1 is no wider than the distance between the linear electrodes 1, exactly to say, the distance between adjacent boundary lines of the two adjacent linear electrodes 1. An aligning film 4 made of polyimide is coated all over the surface, and may be rubbed or not. A polarizing plate or a polarizer 5 is attached on the outer surface of the lower substrate 100.

On the other hand, an aligning film 6 made of polyimide is coated on the inner surface of an upper substrate 200 of a transparent insulating material that is facing the lower substrate 100. A polarizing plate or an analyzer 7 is attached on the outer surface of the upper substrate 200.

Finally, a liquid crystal layer 500 having optical anisotropy is interposed between the aligning films 4 and 6.

The light source for the liquid crystal display may be either a backlight unit (not shown) located under the lower substrate 100 or an external, natural light which may enter into the LCD through the upper substrate 200. In case of reflective type LCD using the natural light, the polarizing plate 5 attached on the lower substrate 100 may not be required, and it is preferable that the linear electrodes 1 and the planar electrode 2 are made of opaque material having high reflectance such as Aluminum (Al). In addition, the lower substrate 100 may be opaque.

A schematic shape of the electric fields of the above-described LCD is described with reference to FIG. 2.

When voltages are applied to the electrodes 1 and 2, the electric field shown in FIG. 2 due to the potential difference between the electrodes 1 and 2 is generated. In FIG. 2, solid lines indicate equipotential lines, and dotted lines indicate the lines of electrical force.

As shown in FIG. 2, the shape of the electrical field is symmetrical with respect to a longitudinal central line C (actually the line C corresponds to a plane) of a narrow region NR on the linear electrodes 1 and a longitudinal central line B (actually the line B also corresponds to a plane) of a wide region WR between the linear electrodes 1. The line of force has a semi-elliptical or parabolic shape (hereinafter, the shape of the line of force is referred as a semi-elliptical shape for simplicity) and is generated in a region between the central line C of the narrow region NR and the central line B of the wide region WR. The vertices of the line of force are in a boundary line A (actually the line A corresponds to a surface) between the narrow region NR and the wide region WR.

A tangent of the line of force on the boundary line A between the narrow region NR and the wide region WR is substantially parallel to the substrate 100, and that at central points of the narrow region NR and a wide region WR is substantially perpendicular to the substrates 100 and 200. In addition, the center and the vertical vertex of the ellipse are positioned on the boundary line A between the narrow NR and the wide region WR, and two horizontal vertices are positioned in the wide region WR and the narrow region NR respectively. The ellipse is asymmetrical with respect to the boundary line A since the horizontal vertex positioned in the narrow region NR is closer to the center of the ellipse than the horizontal vertex positioned in the wide region WR. In addition, the density of the lines of force varies depending on the position, and thus the field strength also varies in proportion to the density of the lines of force. Accordingly, the field strength is the largest on the boundary line A-A between the narrow region NR and the wide region WR, and it becomes small as goes to the central lines C-C and B-B of the broad and the narrow regions BR and NR and to the upper substrate 200.

The behaviors of the liquid crystal molecules due to the electric field are described hereinafter.

First, the initial states of the liquid crystal molecules are described.

The two aligning films 4 and 6 are rubbed or exposed to ultraviolet light, and the liquid crystal molecules are aligned in one horizontal direction. The liquid crystal molecules may have some pre-tilt angle with respect to the substrates 100 and 200 but they are aligned substantially parallel to the substrates 100 and 200. When viewed on a plane parallel to the substrates 100 and 200, the liquid crystal molecules are arranged to have a predetermined angle with respect to the directions parallel and perpendicular to the linear electrodes 1. The polarizing directions of the polarizing plates 20 and 21 are perpendicular to each other, and the polarizing direction of the polarizer 5 almost coincides with the rubbing direction. The liquid crystal material inserted between the two aligning films 4 and 6 is a nematic liquid crystal having positive dielectric anisotropy.

It is assumed that the voltages are applied to the linear electrodes 1 and the planar electrode 2 and the voltage applied to the linear electrodes 1 is higher than that to the planar electrode 2. Then, the liquid crystal molecules are re-arranged such that the force expected by the electric field, which depends on the direction and the strength of the electric field, and the elastical restoring force due to the aligning treatment are balanced against each other.

The rearrangement of the liquid crystal molecules due to the electric field is described in detail.

For simplicity, it is assumed that a direction perpendicular to the substrates is z direction, a direction perpendicular to the direction of the linear electrodes 1 is x direction, and a direction parallel to the direction of the linear electrodes 1 is y direction. That is to say, it is assumed that the direction from left to right in FIG. 1 is the positive x direction, the direction upward along the linear electrodes 1 in FIG. 1 is the positive y direction, and the direction from the lower substrate 200 to the upper substrate 100 in FIG. 2 is the positive z direction.

First, the variation of a twist angle, which is defined by the angle made by the projection of the long axis of the liquid crystal molecule with the x axis or the initially aligned direction onto x-y plane parallel to the substrate 100 and 11, is described with reference to FIGS. 3, 4 and 5.

Figure 3:
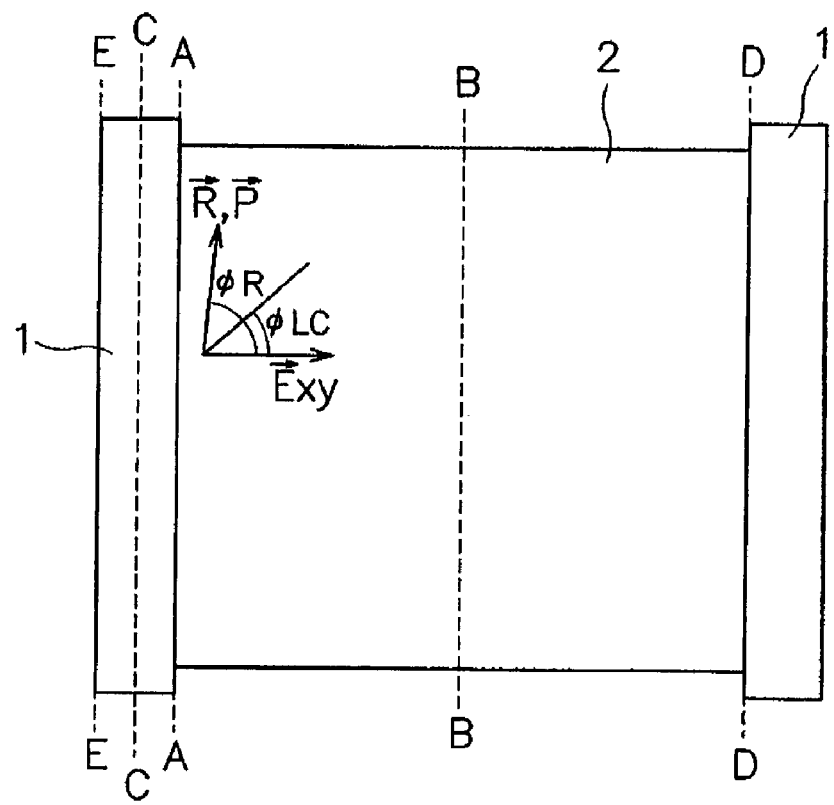
FIG. 3 illustrates the twist angle of liquid crystal molecules in the first embodiment of the present invention.

As shown in FIG. 3, the rubbing direction is indicated by $\vec{R}$, an x-y plane component of the electric field is indicated by $\vec{E_{xy}}$ and the polarizing direction or the optical axis of the polarizer 5 is indicated by $\vec{P}$, while the angle made by the rubbing direction $\vec{R}$ with the x axis is represented by $\theta_R$, and the angle made by the long axis of the liquid crystal molecule with the x axis is represented by $\theta_{LC}$. The angle $\theta_P$ made by the optical axis of the polarizer 5 with the x-axis is equal to $\theta_R$ since the optical axis of the polarizer 5 is parallel to the rubbing direction $\vec{R}$.

The x-y plane component $\vec{E_{xy}}$ of the electric field is in the positive x direction from the boundary line A to the central line B of the wide region WR, and in the negative x direction from the central line B of the wide region WR to the next boundary line D.

The strength of the electric field component $\vec{E_{xy}}$ is the largest on the boundary lines A and D, and it becomes smaller as goes to the central line B-B, where the strength of the electric field component $\vec{E_{xy}}$ is zero.

The magnitude of the elastical restoring force generated by the rubbing process is substantially constant on the xy plane regardless of position.

Figure 4:
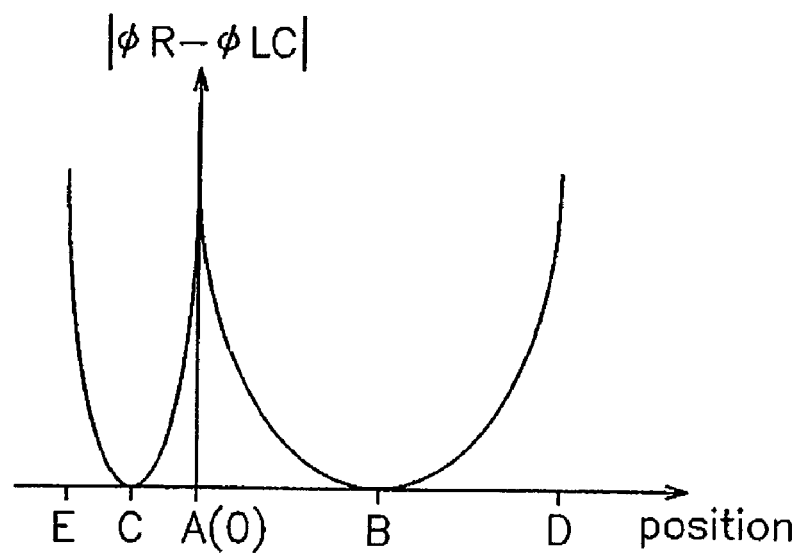
FIG. 4 is a graph illustrating the variation of the twist angle of the liquid crystal molecules as a function of the horizontal position according to the first embodiment of the present invention.

As illustrated in FIG. 4, the long axis of the liquid crystal molecule or the molecular axis on the boundary lines A and D is substantially parallel to the electric field component $\vec{E_{xy}}$, and makes a large angle with respect to the rubbing direction $\vec{R}$ since the liquid crystal molecules are arranged to balance the two forces. However, as approaching the central lines C and B of the regions NR and WR, the angle $|\theta_R - \theta_{LC}|$, which is the angle between the molecular axis and the rubbing direction $\vec{R}$, becomes smaller and the molecular axis lies in parallel with the rubbing direction $\vec{R}$ on the central lines B and C. The angle made by the optical axis of the polarizer 5 with the molecular axis has the same distribution as the above since the optical axis of the polarizer 5 is parallel to the rubbing direction $\vec{R}$, and this angle is closely related to the transmittance of the incident light.

Various shapes of electric fields may be generated by varying the ratio of the widths of the narrow region NR and the wide region WR. Although the narrow region NR on the linear electrodes 1 cannot be used as the display region when the linear electrodes 1 are opaque, it may also be used as the display region when the linear electrodes 1 are transparent.

On the other hand, the x-y plane component of the electric field $\vec{E}_{xy}$ becomes smaller along the z-axis as goes from the lower aligning film 4 to the upper aligning film 6. The elastic restoring force generated by the aligning treatment is the greatest on the surfaces of the aligning films 4 and 6, and it is reduced as approaching the center of the liquid crystal layer between the aligning films 4 and 6.

Figure 5:
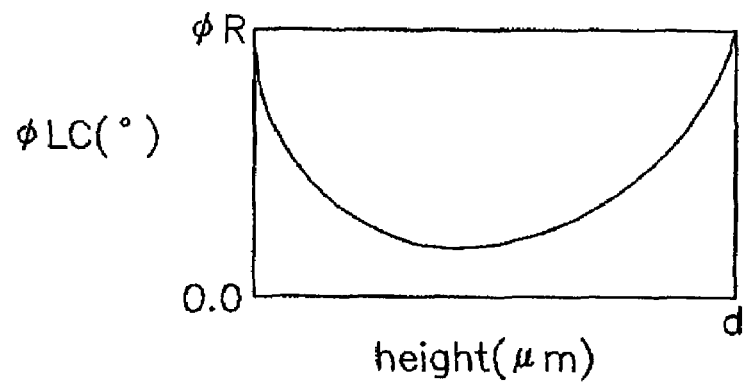
FIG. 5 is a graph illustrating the variation of the twist angle of the liquid crystal molecules as a function of height according to the first embodiment of the present invention.

FIG. 5 illustrates the twist angle made by the molecular axis with the x-axis from the lower aligning film 4 to the upper aligning film 6 along the z-axis. In FIG. 5, the horizontal axis indicates the height from the lower aligning film 4, and the vertical axis represents the twist angle, where d is the cell gap between the two aligning films 4 and 6.

As illustrated in FIG. 5, the twist angle on the surfaces of the aligning films 4 and 6 is large since the aligning force of the aligning films 4 and 6 is great. The twist angle becomes small as approaching the center of the liquid crystal layer, and the molecular axis at the center of the liquid crystal layer is substantially in the direction of the electric field component $\vec{E}_{xy}$. The molecular axis just on the aligning films 4 and 6 is arranged in the rubbing direction $\vec{R}$.

Supposing that the difference of the twist angle between the adjacent liquid crystal molecules is called twist, the twist corresponds to the magnitude of the slope of the curve in FIG. 5. The twist is large near the surfaces of the aligning films 4 and 6, and it decreases as it goes to the center of the liquid crystal layer.

Figure 6:
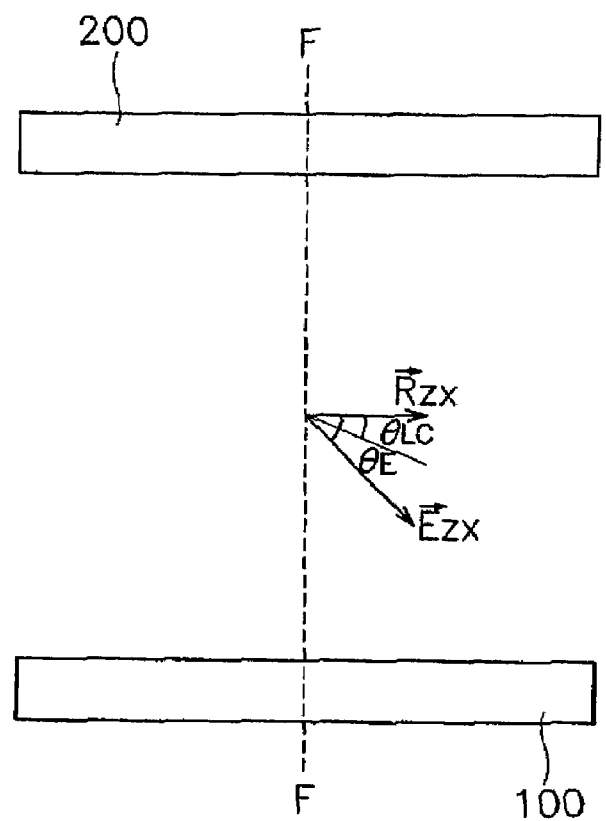
FIG. 6 shows the tilt angle of the liquid crystal molecules according to the first embodiment of the present invention.
Figure 7:
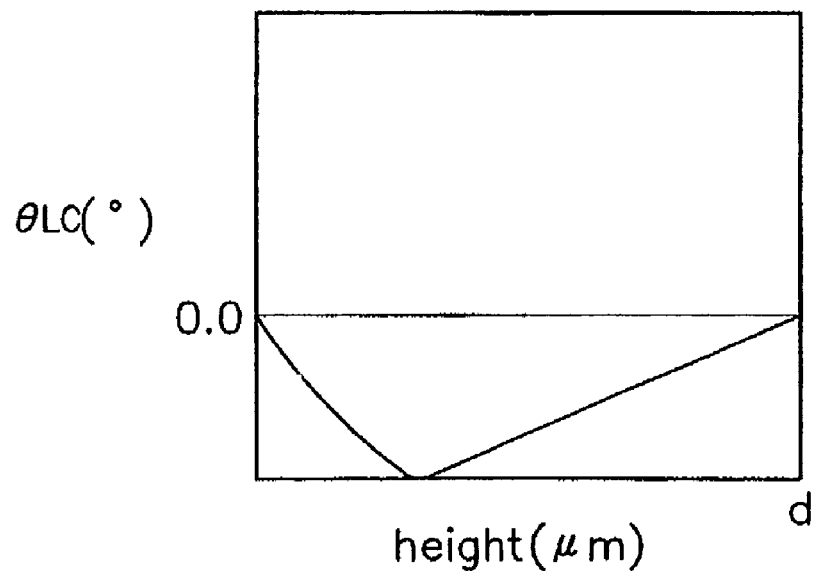
FIG. 7 is a graph illustrating the variation of the tilt angle of the liquid crystal molecules as a function of height according to the first embodiment of the present invention.
Figure 8:
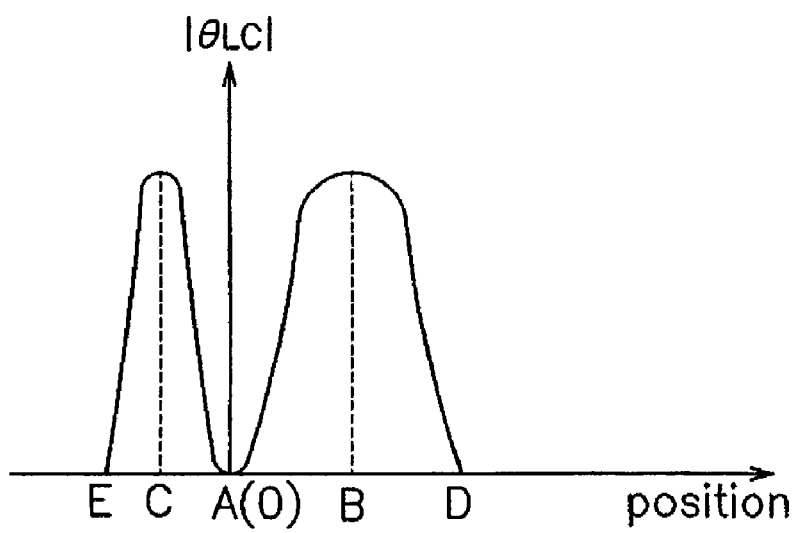
FIG. 8 is a graph illustrating the variation of the tilt angle of the liquid crystal molecules as a function of horizontal position according to the first embodiment of the present invention.

FIGS. 6, 7 and 8 illustrate the variation of the tilt angle which the molecular axis makes with x-axis or the initially aligned direction on a plane perpendicular to the substrate, for example, zx plane. FIG. 6 illustrates only the substrates 100 and 200 to simplify the explanation. In FIG. 6, the zx plane component of the $\vec{R}$ indicating the rubbing direction in FIG. 3 is represented by $\vec{R}_{zx}$, and the zx plane component of the electric field is represented by $\vec{E}_{zx}$, while the angle made by the field component $\vec{E}_{zx}$ with the x axis is indicated by $\theta_E$, and the tilt angle made by the molecular axis with the x axis is indicated by $\theta_{LC}$. Here, $\vec{R}_{zx}$ is in the x direction since the vector $\vec{R}$ exists on the xy plane assuming a pretilt angle is ignored.

The magnitude of the field component $\vec{E}_{xy}$ and the angle $\theta_E$ becomes small as it goes to the upper substrate 200 from the lower substrate 100.

As described above, the elastic restoring force by the aligning treatment is the largest on the surfaces of the two substrates 100 and 200, and it becomes small as it goes to the center of the liquid crystal layer.

The liquid crystal molecules may be arranged to balance the two forces. As illustrated in FIG. 7, the molecular axis on the surfaces of the substrates 100 and 200 is arranged substantially parallel to the x-axis since the aligning force is the strongest there. Since the force due to the electric field becomes relatively stronger compared with the aligning force from the substrates 100 and 200 to a certain point, the magnitude of the tilt angle $\theta_{LC}$ increases continuously. Here, the vertex of the curve is formed at a point near the lower substrate 100.

On the other hand, the angle $\theta_E$ which the field component $\vec{E}_{zx}$ makes with the x axis is almost zero on the boundary lines A and D, and it becomes large as goes to the central line B-B. The magnitude of the field component $\vec{E}_{zx}$ is the greatest on the boundary lines A and D, and it is reduced as goes to the central line B-B.

The magnitude of the elastic restoring force by the aligning treatment is constant on the x axis regardless of the position.

Accordingly, as illustrated in FIG. 8, the tilt angle of the liquid crystal molecule is almost zero on the boundary lines A and D, and it decreases as goes to the central lines C and B. Therefore, the tilt angle of the liquid crystal molecules has the similar distributions to the angle $\theta_E$ made by the field component $\vec{E}_{zx}$ with the x axis, although the tilt angle varies more smoothly than the angle $\theta_E$.

As described above, when the voltages are applied to the two electrodes 1 and 2, the liquid crystal molecules are re-arranged to have the twist angle and the tilt angle. The transmittance of the incident light varies due to the variation of the twist angle and the tilt angle. On the boundary lines A and D, there is little variation in the tilt angle along the z axis, but the twist angle varies very much. On the central lines B and C, on the other hand, there is little variation in the twist angle along the z axis but there is a small variation in the tilt angle. Accordingly, both the twist angle and the tilt angle varies in the region between the boundary lines A and D and the central lines B and C. As a result, a transmittance curve as a function of position has a similar shape to the lines of force.

The transmittance and the viewing angle characteristics of the LCD according to the first embodiment of the present invention are described with reference to experimental results illustrated in FIGS. 9, 10 and 11.

In the experiment, the linear electrodes 1 was made of the opaque material, the widths of the narrow region NR and the wide region WR were 5 μm and 17 μm respectively, the voltage applied to the planar electrode 2 and the linear electrode 1 were 0 V and 5 V respectively, $\theta_R$ was 80°, the pre-tilt angle was about 1.5°, and the cell gap was 4.5 μm.

Figure 9:
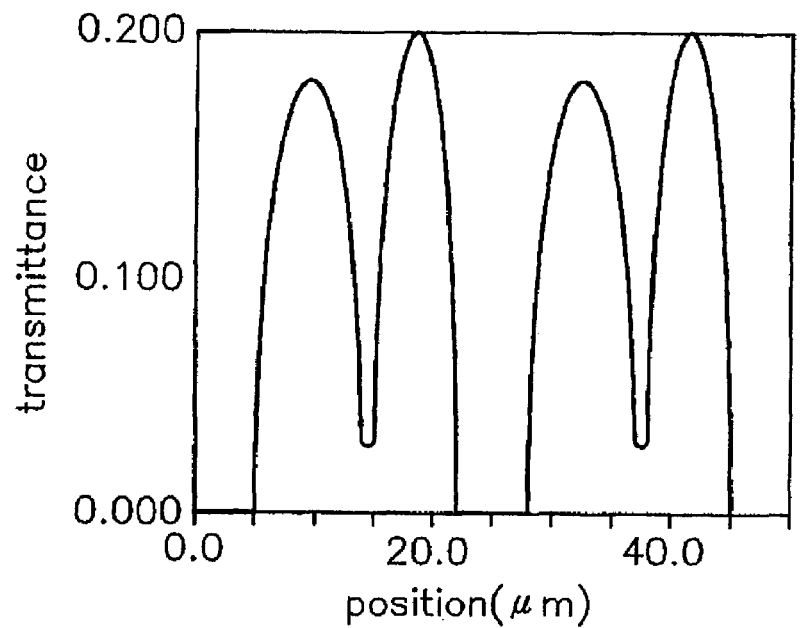
FIG. 9 is a graph illustrating the transmittance as a function of horizontal position in the LCD according to the first embodiment of the present invention.

FIG. 9 is a graphical illustration of the transmittance as a function of position along the x-axis according to the experiment, where the origin is located at the left boundary line of the leftmost linear electrode 1 in FIG. 3.

As illustrated in FIG. 9, the transmittance is zero in the opaque narrow region NR, has minima near the central lines B of the wide region WR, and has maxima in the central regions between the boundary lines A and the central lines B, and between the central lines B and the boundary lines D.

Figure 10:
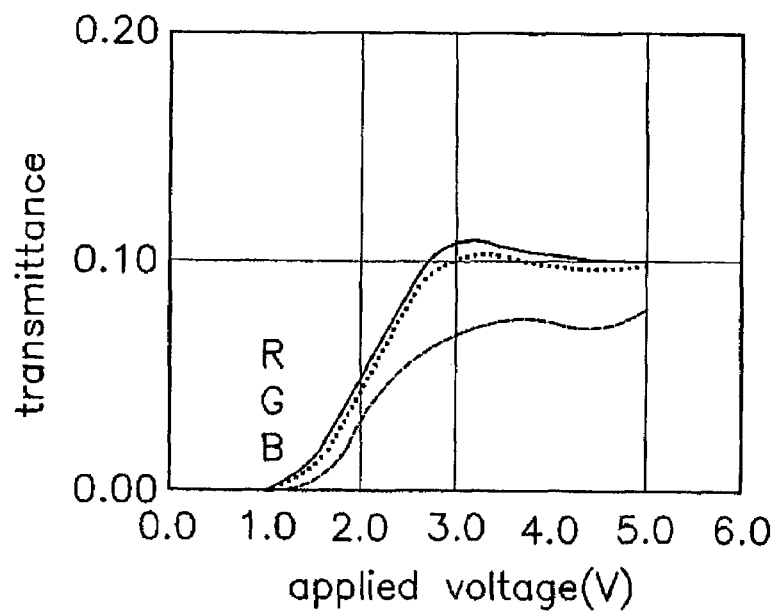
FIG. 10 is a graph illustrating the transmittance as a function of applied voltage in the LCD according to the first embodiment of the present invention.

FIG. 10 illustrates the transmittance as a function of the applied voltage according to the experiment, where the horizontal axis indicates the applied voltage, and the vertical axis indicates the transmittance. As shown in FIG. 10, the threshold voltage is about 1.5 V, and the saturation voltage is about 3 V. Accordingly, it is possible to drive the LCD of the present invention with the low voltage less than 3 V.

Figure 11:
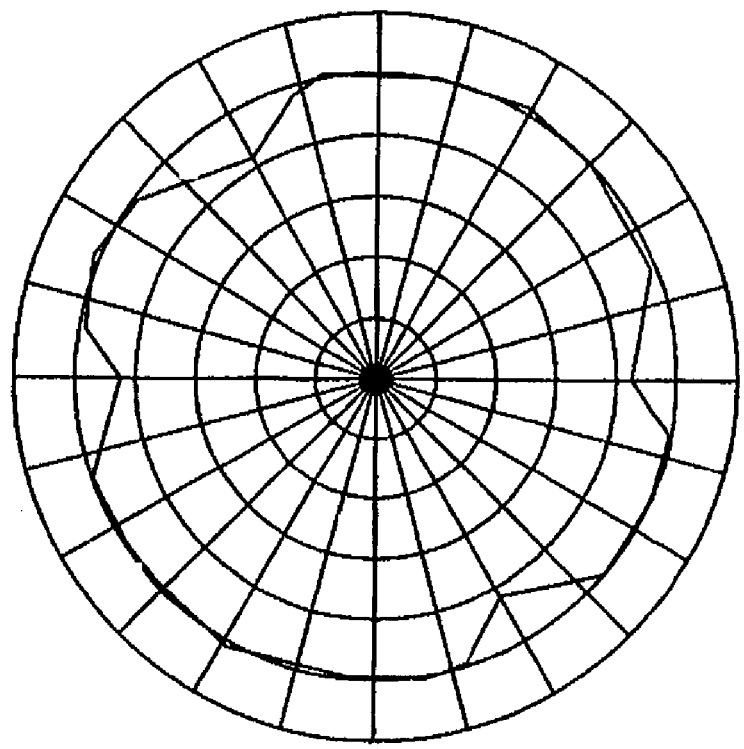
FIG. 11 is a graph illustrating a viewing angle in the LCD according to the first embodiment of the present invention.

FIG. 11 is a graphical illustration showing the viewing angle characteristics according to the experiment. As shown in FIG. 11, the boundary of the region where the contrast is equal to or more than 10 is substantially over 60 degrees.

When using optical phase compensating films between the polarizing plates and the substrates, the viewing angle may become wider.

In the above-mentioned embodiment and experiments, it is possible to modify the kind of the liquid crystal material, the kind of the aligning films, aligning methods, the pre-tilt angle, the polarizing directions of the polarizing plates, the cell gaps, the kind of the phase difference compensating plates, the material forming the electrodes, the widths of the electrodes and the distances between the electrodes. For example, when the linear electrodes 1 are made of transparent material, the higher transmittance can be obtained since the liquid crystal molecules on the linear electrodes 1 are used for controlling the light.

The modifications of the kind of the liquid crystal and/or of initial state are described through second to fourth embodiments.

The second embodiment uses a liquid crystal having negative dielectric anisotropy.

The structure of an LCD according to the second embodiment is similar to the first embodiment, and thus the shape of the electric field is similar. However, the rearrangement of the liquid crystal molecules due to the electric field is different than that of the first embodiment.

In the initial state, the two aligning films 4 and 6 are rubbed or exposed to ultraviolet light, and the liquid crystal molecules are aligned in one horizontal direction. The liquid crystal molecules may have some pre-tilt angle of less than 7 degrees with respect to the substrates 100 and 200 but they are aligned substantially parallel to the substrates 100 and 200. When viewed on a plane parallel to the substrates 100 and 200, the liquid crystal molecules are arranged to have a predetermined angle of equal to or less than 45 degrees with respect to the directions parallel and perpendicular to the linear electrodes 1. The polarizing directions of the polarizing plates 20 and 21 are perpendicular to each other, and the polarizing direction of the polarizer 5 almost coincides with the rubbing direction. Then the initial state is a black state.

For simplicity, it is assumed that a direction perpendicular to the substrates is z direction, a direction perpendicular to the direction of the linear electrodes 1 is x direction, and a direction parallel to the direction of the linear electrodes 1 is y direction. That is to say, it is assumed that the direction from left to right in FIG. 1 is the positive x direction, the direction upward along the linear electrodes 1 in FIG. 1 is the positive y direction, and the direction from the lower substrate 200 to the upper substrate 100 in FIG. 2 is the positive z direction.

First, the variation of a twist angle, which is defined by the angle made by the projection of the long axis of the liquid crystal molecule with the x axis or the initially aligned direction onto x-y plane parallel to the substrate 100 and 11, is described with reference to FIGS. 12, 13 and 14.

Figure 12:
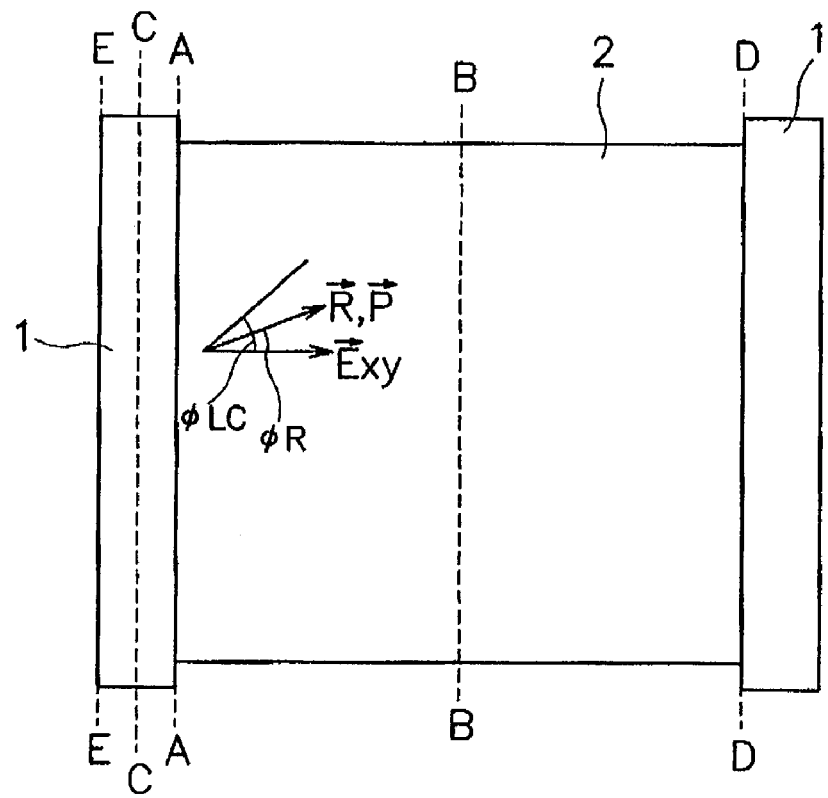
FIG. 12 illustrates the twist angle of liquid crystal molecules in the second embodiment of the present invention.

As shown in FIG. 12, the rubbing direction is indicated by $\vec{R}$, an x-y plane component of the electric field is indicated by $\vec{E}_{xy}$, and the polarizing direction or the optical axis of the polarizer 5 is indicated by $\vec{P}$, while the angle made by the rubbing direction $\vec{R}$ with the x axis is represented by $\theta_R$, and the angle made by the long axis of the liquid crystal molecule with the x axis is represented by $\theta_{LC}$. The angle $\theta_P$ made by the optical axis of the polarizer 5 with the x-axis is equal to $\theta_R$ since the optical axis of the polarizer 5 is parallel to the rubbing direction $\vec{R}$.

The x-y plane component $\vec{E}_{xy}$ of the electric field is in the positive x direction from the boundary line A to the central line B of the wide region WR, and in the negative x direction from the central line B of the wide region WR to the next boundary line D.

The strength of the electric field component $\vec{E}_{xy}$ is the largest on the boundary lines A and D, and it becomes smaller as goes to the central line B-B, where the strength of the electric field component $\vec{E}_{xy}$ is zero.

The magnitude of the elastically restoring force generated by the rubbing process is substantially constant on the x-y plane regardless of position.

Figure 13:
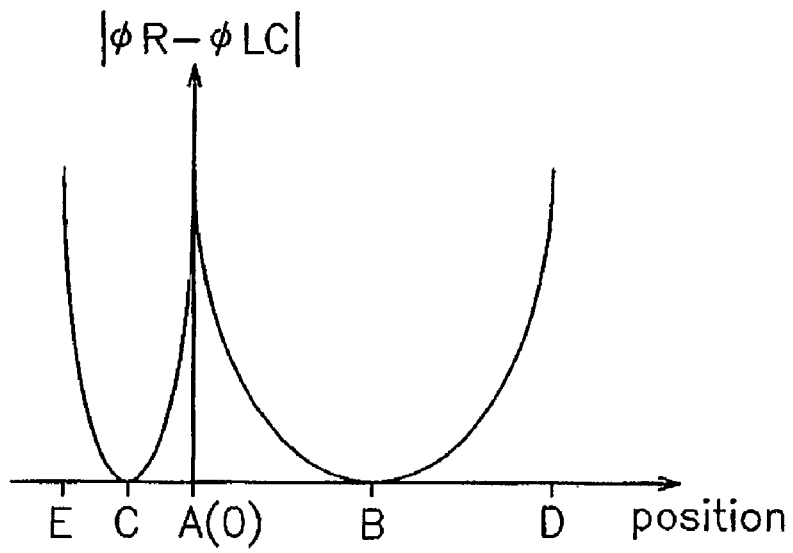
FIG. 13 is a graph illustrating the variation of the twist angle of the liquid crystal molecules as a function of the horizontal position according to the second embodiment of the present invention.

As illustrated in FIG. 13, the long axis of the liquid crystal molecule or the molecular axis on the boundary lines A and D is substantially perpendicular to the electric field component $\vec{E}_{xy}$, and to the rubbing direction $\vec{R}$ since the liquid crystal molecules are arranged to balance the two forces. However, as approaching the central lines C and B of the regions NR and WR, the angle $|\theta_R - \theta_{LC}|$, which is the angle between the molecular axis and the rubbing direction $\vec{R}$, becomes smaller and the molecular axis lies in parallel with the rubbing direction $\vec{R}$ on the central lines B and C. The angle made by the optical axis of the polarizer 5 with the molecular axis has the same distribution as the above since the optical axis of the polarizer 5 is parallel to the rubbing direction $\vec{R}$, and this angle is closely related to the transmittance of the incident light.

On the other hand, the x-y plane component of the electric field $\vec{E}_{xy}$ becomes smaller along the z-axis as goes from the lower aligning film 4 to the upper aligning film 6. The elastic restoring force generated by the aligning treatment is the greatest on the surfaces of the aligning films 4 and 6, and it is reduced as approaching the center of the liquid crystal layer between the aligning films 4 and 6.

Figure 14:
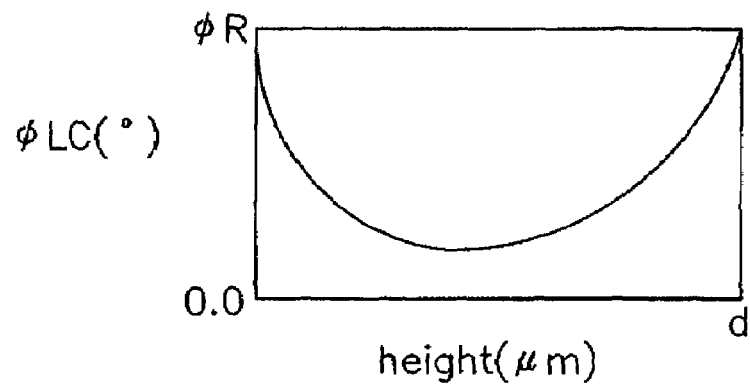
FIG. 14 is a graph illustrating the variation of the twist angle of the liquid crystal molecules as a function of height according to the second embodiment of the present invention.

FIG. 14 illustrates the twist angle made by the molecular axis with the x-axis from the lower aligning film 4 to the upper aligning film 6 along the z-axis. In FIG. 14, the horizontal axis indicates the height from the lower aligning film 4, and the vertical axis represents the twist angle, where d is the cell gap between the two aligning films 4 and 6.

As illustrated in FIG. 14, the twist angle on the surfaces of the aligning films 4 and 6 is large since the aligning force of the aligning films 4 and 6 is great. The twist angle becomes small as approaching the center of the liquid crystal layer, and the molecular axis at the center of the liquid crystal layer is substantially in the direction of the electric field component $\vec{E}_{xy}$. The molecular axis just on the aligning films 4 and 6 is arranged in the rubbing direction $\vec{R}$.

Supposing that the difference of the twist angle between the adjacent liquid crystal molecules is called twist, the twist corresponds to the magnitude of the slope of the curve in FIG. 14. The twist is large near the surfaces of the aligning films 4 and 6, and it decreases as goes to the center of the liquid crystal layer.

Figure 15:
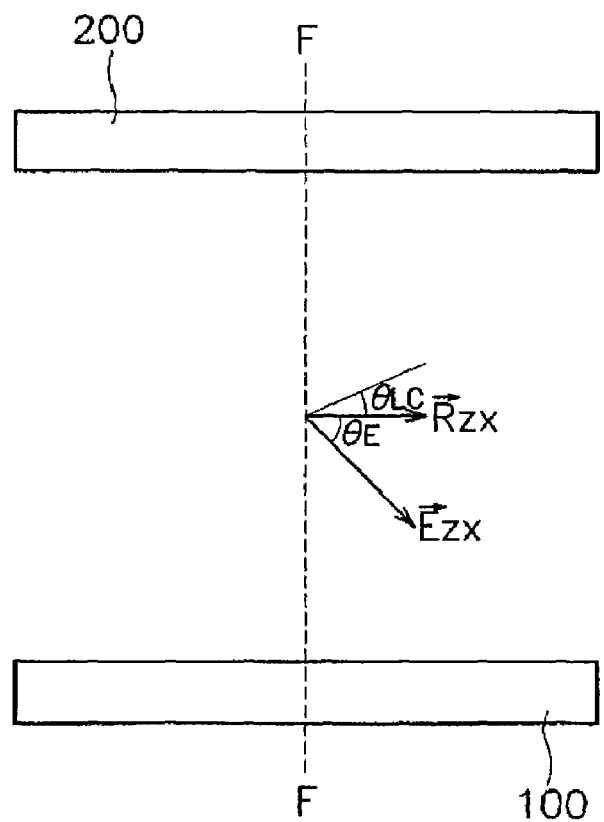
FIG. 15 shows the tilt angle of the liquid crystal molecules according to the second embodiment of the present invention.
Figure 16:
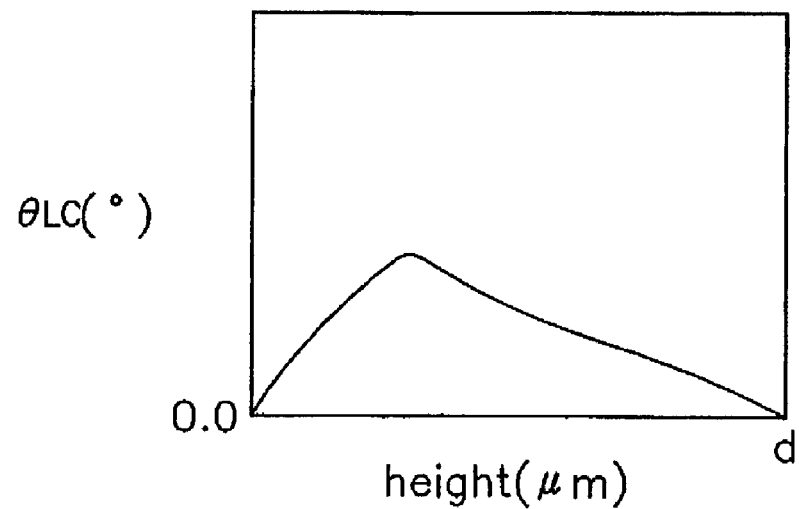
FIG. 16 is a graph illustrating the variation of the tilt angle of the liquid crystal molecules as a function of height according to the second embodiment of the present invention.
Figure 17:
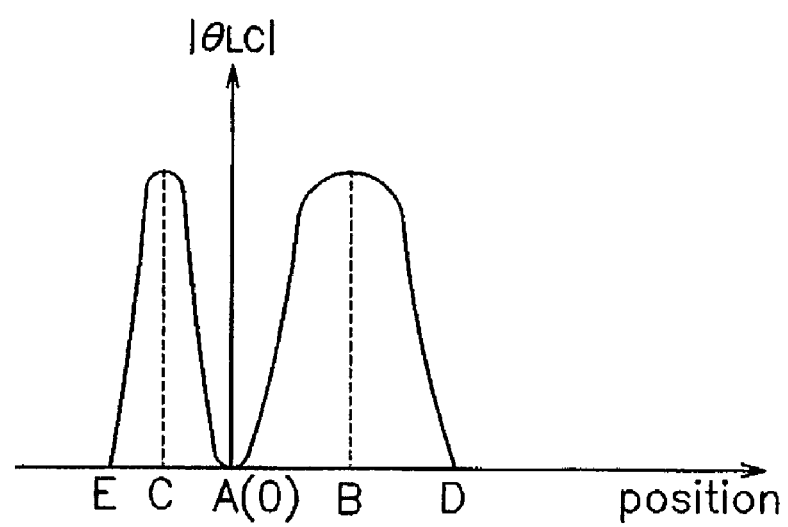
FIG. 17 is a graph illustrating the variation of the tilt angle of the liquid crystal molecules as a function of horizontal position according to the second embodiment of the present invention.

FIGS. 15, 16 and 17 illustrate the variation of the tilt angle which the molecular axis makes with x-axis or the initially aligned direction on a plane perpendicular to the substrate, for example, z-x plane. FIG. 15 illustrates only the substrates 100 and 200 to simplify the explanation. In FIG. 15, the z-x plane component of the $\vec{R}$ indicating the rubbing direction in FIG. 12 is represented by $\vec{R}_{zx}$, and the zx plane component of the electric field is represented by $\vec{E}_{xy}$, while the angle made by the field component $\vec{E}_{xy}$ with the x axis is indicated by $\theta_E$, and the tilt angle made by the molecular axis with the x axis is indicated by $\theta_{LC}$. Here, $\vec{R_{zx}}$ is in the x direction since the vector $\vec{R}$ exists on the x-y plane assuming a pretilt angle is ignored.

The magnitude of the field component $\vec{E_{xy}}$ and the angle $\theta_E$ becomes small as it goes to the upper substrate 200 from the lower substrate 100.

As described above, the elastic restoring force by the aligning treatment is the largest on the surfaces of the two substrates 100 and 200, and it becomes small as it goes to the center of the liquid crystal layer.

The liquid crystal molecules may be arranged to balance the two forces. As illustrated in FIG. 7, the molecular axis on the surfaces of the substrates 100 and 200 is arranged substantially parallel to the x-axis since the aligning force is the strongest there. Since the force due to the electric field becomes relatively stronger compared with the aligning force from the substrates 100 and 200 to a certain point, the magnitude of the tilt angle $\theta_{LC}$ increases continuously. Here, the vertex of the curve is formed at a point near the lower substrate 100.

On the other hand, the angle $\theta_E$ which the field component $\vec{E_{zx}}$ makes with the x axis is almost zero on the boundary lines A and D, and it becomes large as goes to the central line B-B. The magnitude of the field component $\vec{E_{zx}}$ is the greatest on the boundary lines A and D, and it is reduced as goes to the central line B-B.

The magnitude of the elastic restoring force by the aligning treatment is constant on the x-axis regardless of the position.

Accordingly, as illustrated in FIG. 17, the tilt angle of the liquid crystal molecule is almost zero on the boundary lines A and D, and it decreases as goes to the central lines C and B. Therefore, the tilt angle of the liquid crystal molecules has the similar distributions to the angle $\theta_E$ made by the field component $\vec{E_{zx}}$ with the x axis, although the tilt angle varies more smoothly than the angle $\theta_E$.

As described above, when the voltages are applied to the two electrodes 1 and 2, the liquid crystal molecules are re-arranged to have the twist angle and the tilt angle. The transmittance of the incident light varies due to the variation of the twist angle and the tilt angle. On the boundary lines A and D, there is little variation in the tilt angle along the z-axis, but the twist angle varies very much. On the central lines B and C, on the other hand, there is little variation in the twist angle along the z-axis but there is a small variation in the tilt angle. Accordingly, both the twist angle and the tilt angle vary in the region between the boundary lines A and D and the central lines B and C. As a result, a transmittance curve as a function of position has a similar shape to the lines of force.

The third embodiment uses a liquid crystal having positive dielectric anisotropy but the liquid crystal molecules in their initial states are perpendicular to the substrates.

The structure of an LCD according to the third embodiment is similar to the first embodiment, and thus the shape of the electric field is similar. However, the rearrangement of the liquid crystal molecules due to the different initial states is different than that of the first embodiment.

In the initial state, the two aligning films 4 and 6 are rubbed or exposed to ultraviolet light, and the liquid crystal molecules are aligned perpendicular to the substrates 100 and 200. The liquid crystal molecules may have some pre-tilt angle with respect to the substrates 100 and 200 but they are aligned substantially perpendicular to the substrates 100 and 200. When viewed on a plane parallel to the substrates 100 and 200, the liquid crystal molecules are arranged to have a predetermined angle with respect to the directions parallel and perpendicular to the linear electrodes 1. The polarizing directions of the polarizing plates 20 and 21 are perpendicular to each other, and the polarizing direction of the polarizer 5 almost coincides with the rubbing direction. Then the initial state is a black state. The liquid crystal is nematic and may have chiral dopant of 0.001-3.0 wt %.

For simplicity, it is assumed that a direction perpendicular to the substrates is z direction, a direction perpendicular to the direction of the linear electrodes 1 is x direction, and a direction parallel to the direction of the linear electrodes 1 is y direction. That is to say, it is assumed that the direction from left to right in FIG. 1 is the positive x direction, the direction upward along the linear electrodes 1 in FIG. 1 is the positive y direction, and the direction from the lower substrate 200 to the upper substrate 100 in FIG. 2 is the positive z direction.

First, the variation of a twist angle, which is defined by the angle made by the projection of the long axis of the liquid crystal molecule with the x axis or the initially aligned direction onto x-y plane parallel to the substrate 100 and 11, is described with reference to FIGS. 18, 19 and 20.

Figure 18:
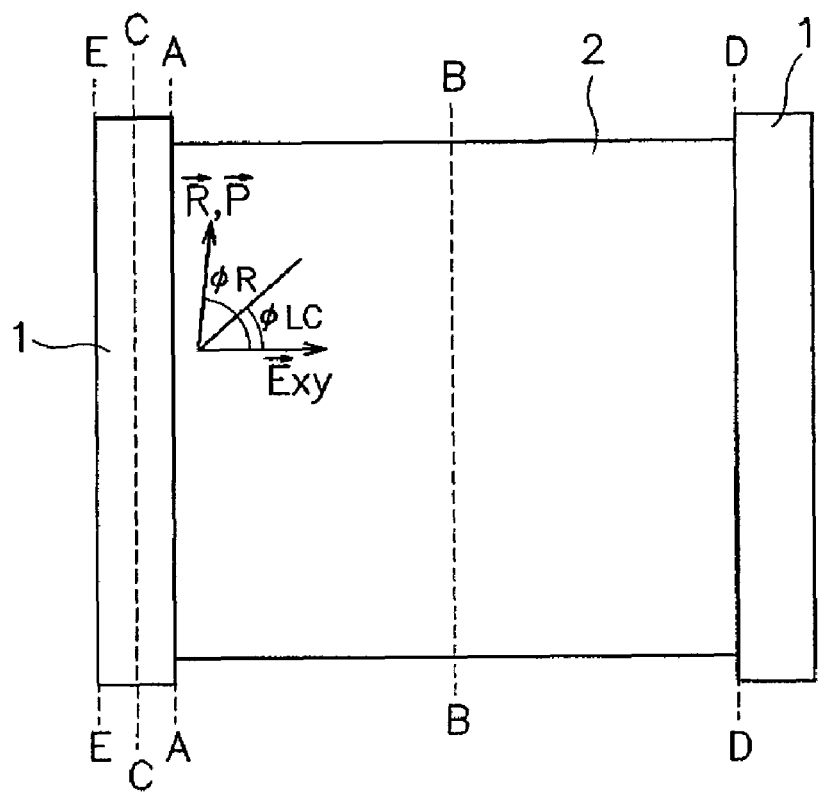
FIG. 18 illustrates the twist angle of liquid crystal molecules in the third embodiment of the present invention.

As shown in FIG. 18, the rubbing direction is indicated by $\vec{R}$, an x-y plane component of the electric field is indicated by $\vec{E_{xy}}$, and the polarizing direction or the optical axis of the polarizer 5 is indicated by $\vec{P}$, while the angle made by the rubbing direction $\vec{R}$ with the x axis is represented by $\theta_R$, and the angle made by the long axis of the liquid crystal molecule with the x axis is represented by $\theta_{LC}$. The angle $\theta_P$ made by the optical axis of the polarizer 5 with the x-axis is equal to $\theta_R$ since the optical axis of the polarizer 5 is parallel to the rubbing direction $\vec{R}$.

The x-y plane component $\vec{E_{xy}}$ of the electric field is in the positive x direction from the boundary line A to the central line B of the wide region WR, and in the negative x direction from the central line B of the wide region WR to the next boundary line D.

The strength of the electric field component $\vec{E_{xy}}$ is the largest on the boundary lines A and D, and it becomes smaller as goes to the central line B-B, where the strength of the electric field component $\vec{E_{xy}}$ is zero.

The magnitude of the elastically restoring force generated by the rubbing process is substantially constant on the x-y plane regardless of position.

Figure 19:
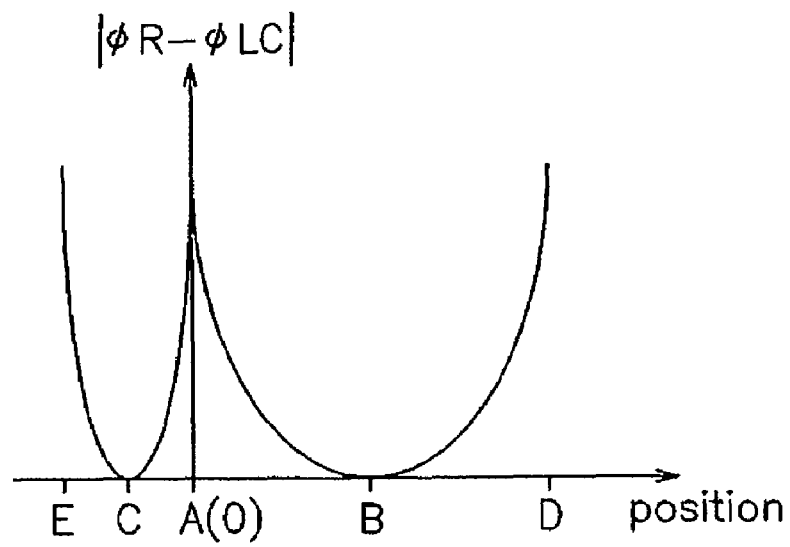
FIG. 19 is a graph illustrating the variation of the twist angle of the liquid crystal molecules as a function of the horizontal position according to the third embodiment of the present invention.

As illustrated in FIG. 19, the long axis of the liquid crystal molecule or the molecular axis on the boundary lines A and D is substantially parallel to the electric field component $\vec{E_{xy}}$, and makes a large angle with respect to the rubbing direction $\vec{R}$ since the liquid crystal molecules are arranged to balance the two forces. However, as approaching the central lines C and B of the regions NR and WR, the angle $|\theta_R - \theta_{LC}|$, which is the angle between the molecular axis and the rubbing direction $\vec{R}$, becomes smaller and the molecular axis lies in parallel with the rubbing direction $\vec{R}$ on the central lines B and C. The angle made by the optical axis of the polarizer 5 with the molecular axis has the same distribution as the above since the optical axis of the polarizer 5 is parallel to the rubbing direction $\vec{R}$, and this angle is closely related to the transmittance of the incident light.

On the other hand, the x-y plane component of the electric field $\vec{E_{xy}}$ becomes smaller along the z-axis as goes from the lower aligning film 4 to the upper aligning film 6. The elastic restoring force generated by the aligning treatment is the greatest on the surfaces of the aligning films 4 and 6, and it is reduced as approaching the center of the liquid crystal layer between the aligning films 4 and 6.

Figure 20:
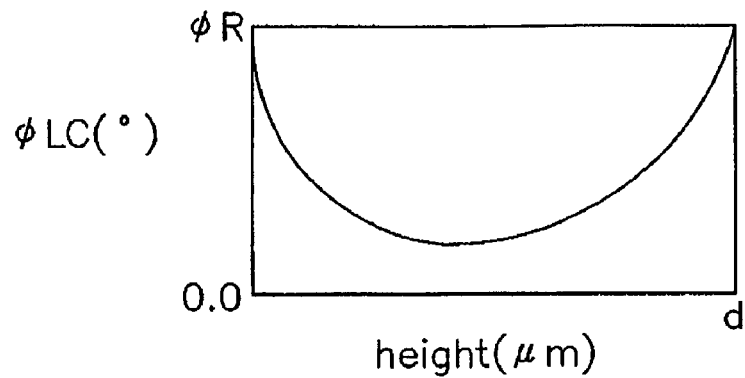
FIG. 20 is a graph illustrating the variation of the twist angle of the liquid crystal molecules as a function of height according to the third embodiment of the present invention.

FIG. 20 illustrates the twist angle made by the molecular axis with the x-axis from the lower aligning film 4 to the upper aligning film 6 along the z-axis. In FIG. 20, the horizontal axis indicates the height from the lower aligning film 4, and the vertical axis represents the twist angle, where d is the cell gap between the two aligning films 4 and 6.

As illustrated in FIG. 20, the twist angle on the surfaces of the aligning films 4 and 6 is large since the aligning force of the aligning films 4 and 6 is great. The twist angle becomes small as approaching the center of the liquid crystal layer, and the molecular axis at the center of the liquid crystal layer is substantially in the direction of the electric field component $\vec{E_{xy}}$. The molecular axis just on the aligning films 4 and 6 is arranged in the rubbing direction $\vec{R}$.

Supposing that the difference of the twist angle between the adjacent liquid crystal molecules is called twist, the twist corresponds to the magnitude of the slope of the curve in FIG. 20. The twist is large near the surfaces of the aligning films 4 and 6, and it decreases as goes to the center of the liquid crystal layer.

Figure 21:
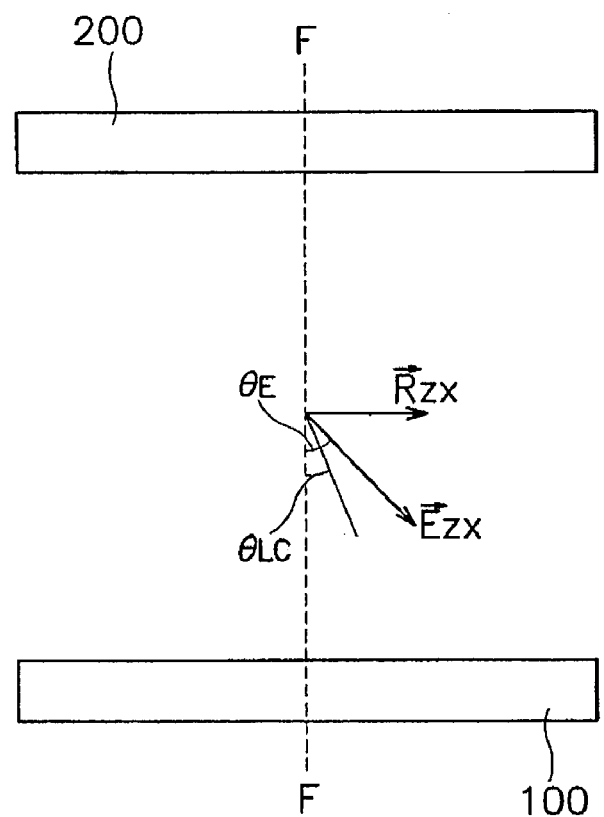
FIG. 21 shows the tilt angle of the liquid crystal molecules according to the third embodiment of the present invention.
Figure 22:
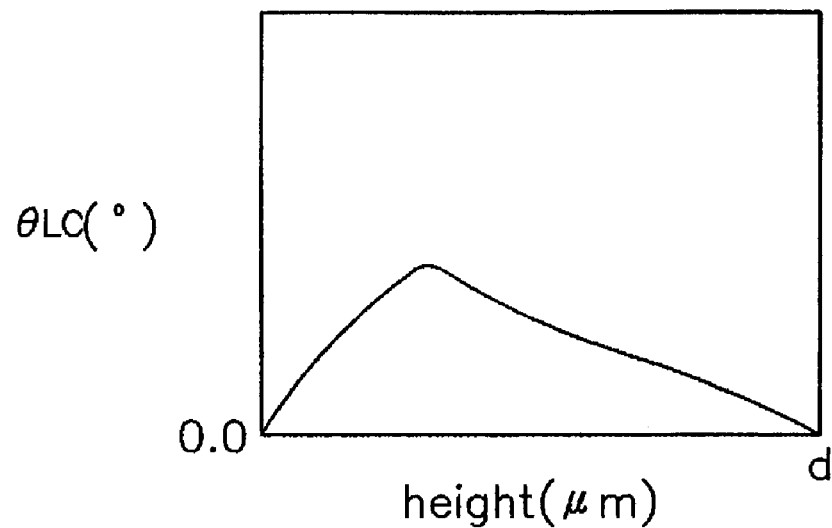
FIG. 22 is a graph illustrating the variation of the tilt angle of the liquid crystal molecules as a function of height according to the third embodiment of the present invention.
Figure 23:
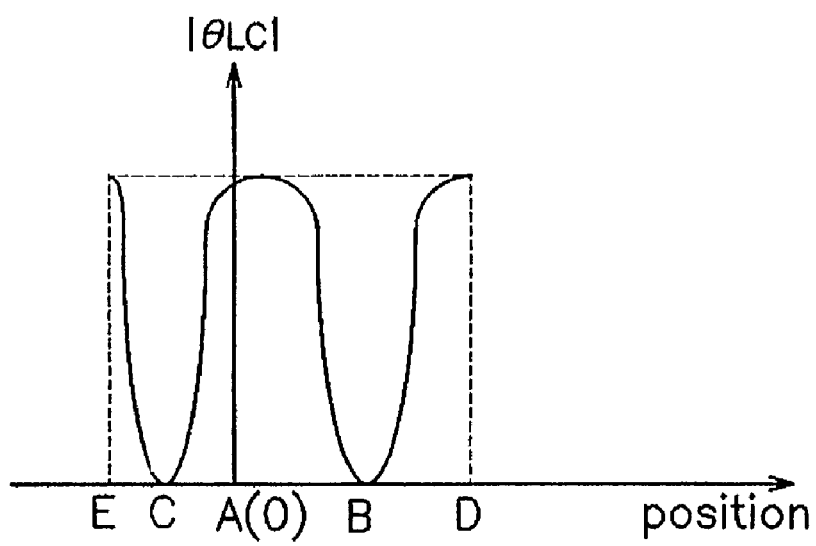
FIG. 23 is a graph illustrating the variation of the tilt angle of the liquid crystal molecules as a function of horizontal position according to the third embodiment of the present invention.

FIGS. 21, 22 and 23 illustrate the variation of the tilt angle which the molecular axis makes with x-axis or the initially aligned direction on a plane perpendicular to the substrate, for example, z-x plane. FIG. 21 illustrates only the substrates 100 and 200 to simplify the explanation. In FIG. 21, the z-x plane component of the $\vec{R}$ indicating the rubbing direction in FIG. 18 is represented by $\vec{R_{zx}}$, and the z-x plane component of the electric field is represented by $\vec{E_{zx}}$, while the angle made by the field component $\vec{E_{zx}}$ with the z axis is indicated by $\theta_E$, and the tilt angle made by the molecular axis with the z axis is indicated by $\theta_{LC}$. Here, $\vec{R_{zx}}$ is in the x direction since the vector $\vec{R}$ exists on the x-y plane, assuming a pretilt angle is ignored.

The magnitude of the field component $\vec{E_{zx}}$ and the angle $\theta_E$ becomes large as it goes to the upper substrate 200 from the lower substrate 100.

As described above, the elastic restoring force by the aligning treatment is the largest on the surfaces of the two substrates 100 and 200, and it becomes small as it goes to the center of the liquid crystal layer.

The liquid crystal molecules may be arranged to balance the two forces. As illustrated in FIG. 21, the molecular axis on the surfaces of the substrates 100 and 200 is arranged substantially parallel to the z-axis since the aligning force is the strongest there. Since the force due to the electric field becomes relatively stronger compared with the aligning force from the substrates 100 and 200 to a certain point, the magnitude of the tilt angle $\theta_{LC}$ increases continuously. Here, the vertex of the curve is formed at a point near the lower substrate 100.

On the other hand, the angle $\theta_E$ which the field component $\vec{E_{zx}}$ makes with the z axis is almost 90 degrees on the boundary lines A and D, and it becomes small as it goes to the central line B-B. The magnitude of the field component $\vec{E_{zx}}$ is the greatest on the boundary lines A and D, and it is reduced as goes to the central line B-B.

The magnitude of the elastic restoring force by the aligning treatment is constant on the x-axis regardless of the position.

Accordingly, as illustrated in FIG. 23, since the long axes of the liquid crystal molecules at the boundary lines A and D are almost perpendicular to the field direction, the lines A and D form a discontinuous plane. However, the tilt angle of the liquid crystal molecule is almost 90 degrees near the boundary lines A and D, and decreases as it goes to the central lines C and B. Therefore, the tilt angle of the liquid crystal molecules has the similar distributions to the angle $\theta_E$ made by the field component $\vec{E_{zx}}$ with the z axis, although the tilt angle varies more smoothly than the angle $\theta_E$.

When the liquid crystal molecules have a pre-tilt angle, the discontinuous plane may be eliminated.

As described above, when the voltages are applied to the two electrodes 1 and 2, the liquid crystal molecules are re-arranged to have the twist angle and the tilt angle. The transmittance of the incident light varies due to the variation of the twist angle and the tilt angle. On the boundary lines A and D, there is large variation in the tilt angle and the twist angle along the z-axis. On the central lines B and C, on the other hand, there is little variation in the twist angle and the tilt angle along the z-axis. Accordingly, both the twist angle and the tilt angle vary in the region between the boundary lines A and D and the central lines B and C. As a result, a transmittance curve as a function of position has a similar shape to the lines of force.

The fourth embodiment uses a liquid crystal having negative dielectric anisotropy and the liquid crystal molecules in their initial states are perpendicular to the substrates.

The structure of an LCD according to the third embodiment is similar to the first embodiment, and thus the shape of the electric field is similar. However, the rearrangement of the liquid crystal molecules due to the different initial states is different from that of the first embodiment.

In the initial state, the two aligning films 4 and 6 are rubbed or exposed to ultraviolet light, and the liquid crystal molecules are aligned perpendicular to the substrates 100 and 200. The liquid crystal molecules may have some pre-tilt angle with respect to the substrates 100 and 200 but they are aligned substantially perpendicular to the substrates 100 and 200. When viewed on a plane parallel to the substrates 100 and 200, the liquid crystal molecules are arranged to have a predetermined angle with respect to the directions parallel and perpendicular to the linear electrodes 1. The polarizing directions of the polarizing plates 20 and 21 are perpendicular to each other, and the polarizing direction of the polarizer 5 almost coincides with the rubbing direction. Then the initial state is a black state. The liquid crystal is nematic and may have chiral dopant of 0.001-3.0 wt %.

For simplicity, it is assumed that a direction perpendicular to the substrates is z direction, a direction perpendicular to the direction of the linear electrodes 1 is x direction, and a direction parallel to the direction of the linear electrodes 1 is y direction. That is to say, it is assumed that the direction from left to right in FIG. 1 is the positive x direction, the direction upward along the linear electrodes 1 in FIG. 1 is the positive y direction, and the direction from the lower substrate 200 to the upper substrate 100 in FIG. 2 is the positive z direction.

First, the variation of a twist angle, which is defined by the angle made by the projection of the long axis of the liquid crystal molecule with the x axis or the initially aligned direction onto x-y plane parallel to the substrate 100 and 11, is described with reference to FIGS. 24, 25 and 26.

Figure 24:
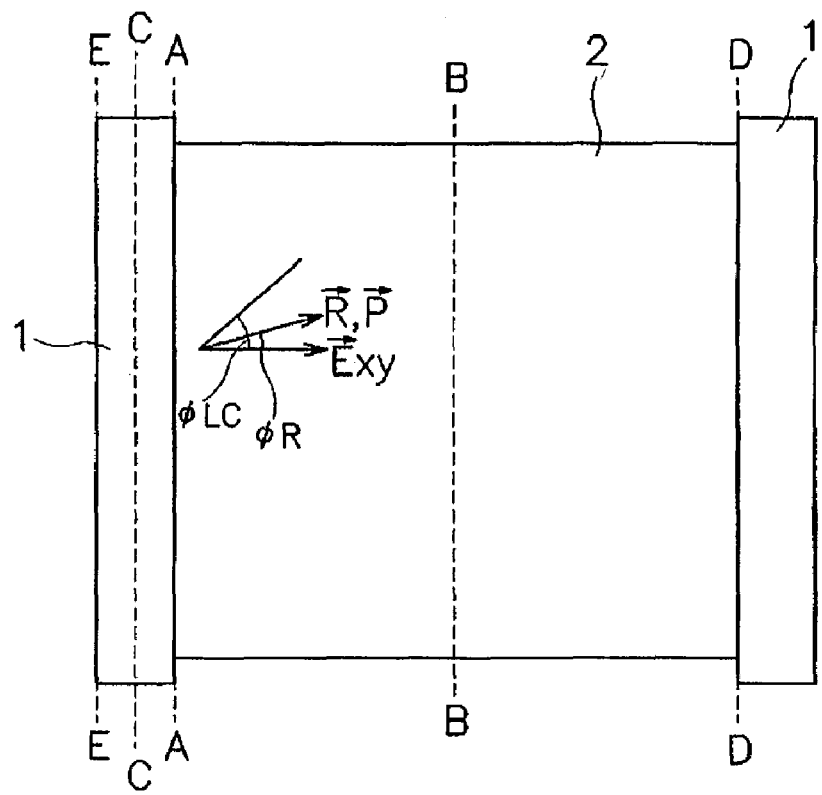
FIG. 24 illustrates the twist angle of liquid crystal molecules in the fourth embodiment of the present invention.

As shown in FIG. 24, the rubbing direction is indicated by $\vec{R}$, an x-y plane component of the electric field is indicated by $\vec{E}_{xy}$, and the polarizing direction or the optical axis of the polarizer 5 is indicated by $\vec{P}$, while the angle made by the rubbing direction $\vec{R}$ with the x axis is represented by $\theta_R$, and the angle made by the long axis of the liquid crystal molecule with the x axis is represented by $\theta_{LC}$. The angle $\theta_P$ made by the optical axis of the polarizer 5 with the x-axis is equal to $\theta_R$ since the optical axis of the polarizer 5 is parallel to the rubbing direction $\vec{R}$.

The x-y plane component $\vec{E}_{xy}$ of the electric field is in the positive x direction from the boundary line A to the central line B of the wide region WR, and in the negative x direction from the central line B of the wide region WR to the next boundary line D.

The strength of the electric field component $\vec{E}_{xy}$ is the largest on the boundary lines A and D, and it becomes smaller as goes to the central line B-B, where the strength of the electric field component $\vec{E}_{xy}$ is zero.

The magnitude of the elastically restoring force generated by the rubbing process is substantially constant on the x-y plane regardless of position.

Figure 25:
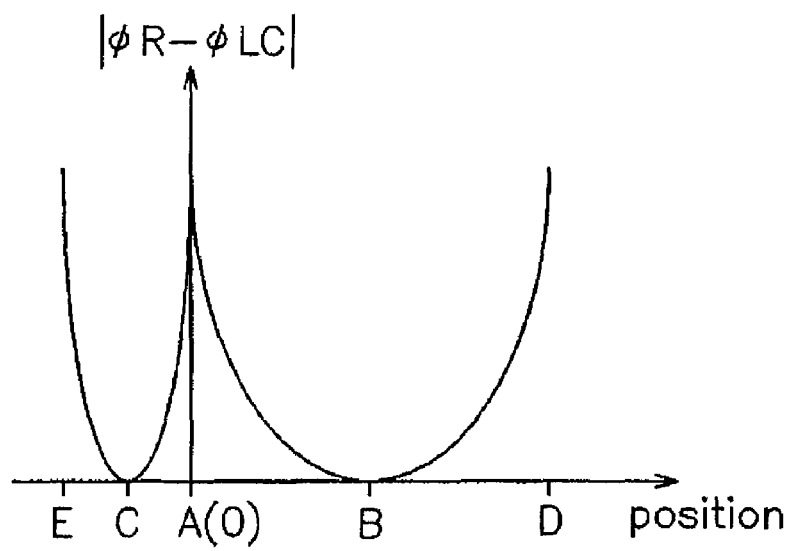
FIG. 25 is a graph illustrating the variation of the twist angle of the liquid crystal molecules as a function of the horizontal position according to the fourth embodiment of the present invention.

As illustrated in FIG. 25, the long axis of the liquid crystal molecule or the molecular axis on the boundary lines A and D is substantially perpendicular to the electric field component $\vec{E}_{xy}$, and to the rubbing direction $\vec{R}$ since the liquid crystal molecules are arranged to balance the two forces. However, as approaching the central lines C and B of the regions NR and WR, the angle $|\theta_R - \theta_{LC}|$, which is the angle between the molecular axis and the rubbing direction $\vec{R}$ becomes smaller and the molecular axis lies in parallel with the rubbing direction $\vec{R}$ on the central lines B and C. The angle made by the optical axis of the polarizer 5 with the molecular axis has the same distribution as the above since the optical axis of the polarizer 5 is parallel to the rubbing direction $\vec{R}$, and this angle is closely related to the transmittance of the incident light.

On the other hand, the x-y plane component of the electric field $\vec{E}_{xy}$ becomes smaller along the z-axis as goes from the lower aligning film 4 to the upper aligning film 6. The elastic restoring force generated by the aligning treatment is the greatest on the surfaces of the aligning films 4 and 6, and it is reduced as approaching the center of the liquid crystal layer between the aligning films 4 and 6.

Figure 26:
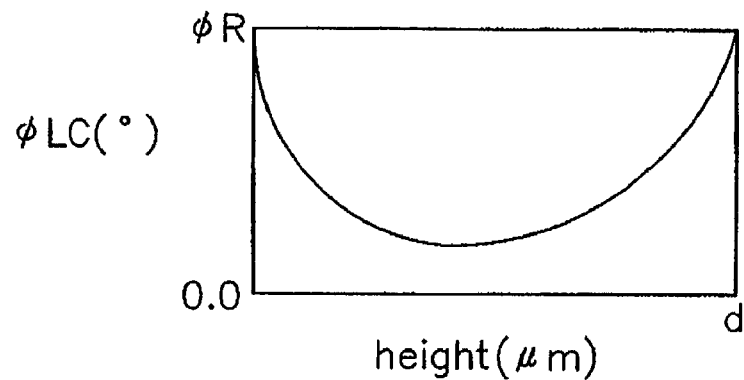
FIG. 26 is a graph illustrating the variation of the twist angle of the liquid crystal molecules as a function of height according to the fourth embodiment of the present invention.

FIG. 26 illustrates the twist angle made by the molecular axis with the x-axis from the lower aligning film 4 to the upper aligning film 6 along the z-axis. In FIG. 26, the horizontal axis indicates the height from the lower aligning film 4, and the vertical axis represents the twist angle, where d is the cell gap between the two aligning films 4 and 6.

As illustrated in FIG. 26, the twist angle on the surfaces of the aligning films 4 and 6 is large since the aligning force of the aligning films 4 and 6 is great. The twist angle becomes small as approaching the center of the liquid crystal layer, and the molecular axis at the center of the liquid crystal layer is substantially in the direction of the electric field component $\vec{E}_{xy}$. The molecular axis just on the aligning films 4 and 6 is arranged in the rubbing direction $\vec{R}$.

Supposing that the difference of the twist angle between the adjacent liquid crystal molecules is called twist, the twist corresponds to the magnitude of the slope of the curve in FIG. 26. The twist is large near the surfaces of the aligning films 4 and 6, and decreases as it goes to the center of the liquid crystal layer.

Figure 27:
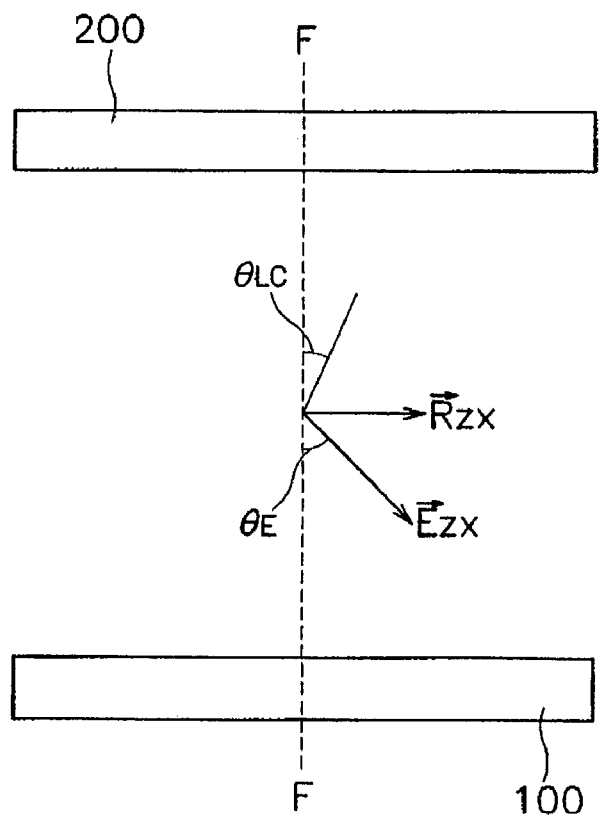
FIG. 27 shows the tilt angle of the liquid crystal molecules according to the fourth embodiment of the present invention.
Figure 28:
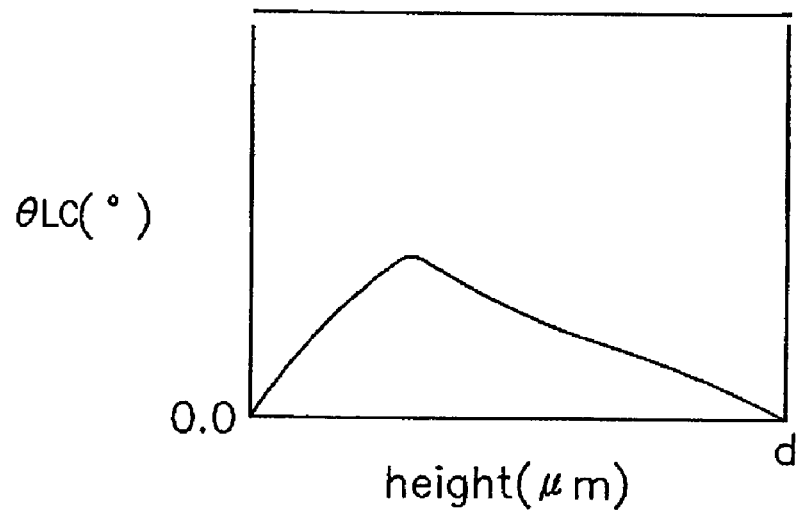
FIG. 28 is a graph illustrating the variation of the tilt angle of the liquid crystal molecules as a function of height according to the fourth embodiment of the present invention.
Figure 29:
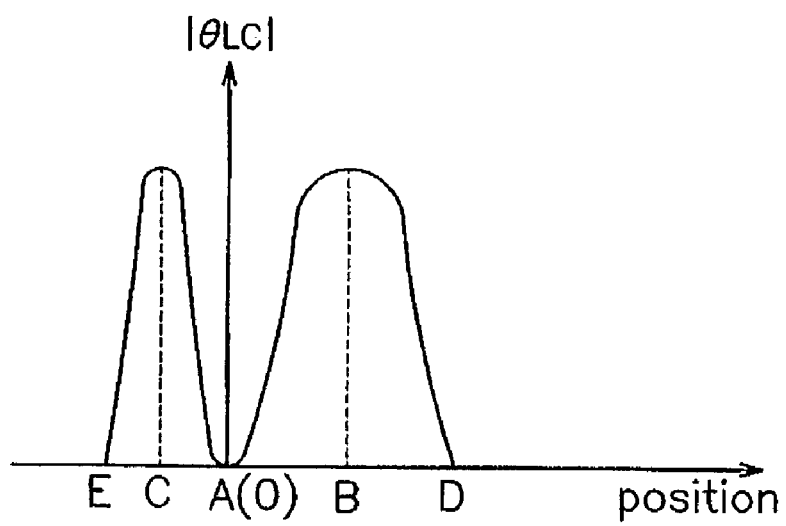
FIG. 29 is a graph illustrating the variation of the tilt angle of the liquid crystal molecules as a function of horizontal position according to the fourth embodiment of the present invention.

FIGS. 27, 28 and 29 illustrate the variation of the tilt angle which the molecular axis makes with x-axis or the initially aligned direction on a plane perpendicular to the substrate, for example, zx plane. FIG. 27 illustrates only the substrates 100 and 200 to simplify the explanation. In FIG. 27, the zx plane component of the $\vec{R}$ indicating the rubbing direction in FIG. 24 is represented by $\vec{R}_{zx}$, and the zx plane component of the electric field is represented by $\vec{E}_{zx}$, while the angle made by the field component $\vec{E}_{zx}$ with the z axis is indicated by $\theta_E$, and the tilt angle made by the molecular axis with the z axis is indicated by $\theta_{LC}$. Here, $\vec{R}_{zx}$ is in the x direction since the vector $\vec{R}$ exists on the x-y plane assuming a pretilt angle is ignored.

The magnitude of the field component $\vec{E}_{zx}$ and the angle $\theta_E$ becomes large as it goes to the upper substrate 200 from the lower substrate 100.

As described above, the elastic restoring force by the aligning treatment is the largest on the surfaces of the two substrates 100 and 200, and it becomes small as it goes to the center of the liquid crystal layer.

The liquid crystal molecules may be arranged to balance the two forces. As illustrated in FIG. 27, the molecular axis on the surfaces of the substrates 100 and 200 is arranged substantially parallel to the z-axis since the aligning force is the strongest there. Since the force due to the electric field becomes relatively stronger compared with the aligning force from the substrates 100 and 200 to a certain point, the magnitude of the tilt angle $\theta_{LC}$ increases continuously. Here, the vertex of the curve is formed at a point near the lower substrate 100.

On the other hand, the angle $\theta_E$ which the field component $\vec{E}_{zx}$ makes with the z axis is almost 90 degrees on the boundary lines A and D, and it becomes small as it goes to the central line B-B. The magnitude of the field component $\vec{E}_{zx}$ is the greatest on the boundary lines A and D, and it is reduced as goes to the central line B-B.

The magnitude of the elastic restoring force by the aligning treatment is constant on the x-axis regardless of the position.

Accordingly, as illustrated in FIG. 29, the tilt angle of the liquid crystal molecule is almost zero degrees on the boundary lines A and D, and increases as it goes to the central lines C and B. Therefore, the tilt angle of the liquid crystal molecules has the similar distributions to the angle $\theta_E$ made by the field component $\vec{E}_{zx}$ with the z axis, although the tilt angle varies more smoothly than the angle $\theta_E$.

When the liquid crystal molecules have a pre-tilt angle, the discontinuous plane may be eliminated.

As described above, when the voltages are applied to the two electrodes 1 and 2, the liquid crystal molecules are re-arranged to have the twist angle and the tilt angle. The transmittance of the incident light varies due to the variation of the twist angle and the tilt angle. On the boundary lines A and D, there is little variation in the tilt angle but the twist angle along the z-axis varies greatly. On the central lines B and C, on the other hand, there is little variation in the twist angle along the z-axis but there is a small variation in the tilt angle. Accordingly, both the twist angle and the tilt angle vary in the region between the boundary lines A and D and the central lines B and C. As a result, a transmittance curve as a function of position has a similar shape to the lines of force.

Next, modifications of the electrode structure are described.

The LCD according to the fifth embodiment of the present invention is described with reference to the FIGS. 30 and 31.

Unlike the first to fourth embodiments of the present invention, the portions of the planar electrode overlapping the linear electrodes are removed in this embodiment. Therefore, the planar electrode is divided into a plurality of common electrodes 2, each being located between the linear electrodes 1. Furthermore, since the two adjacent common electrodes 2 in the transverse direction should be connected, common electrode lines or connections 23 connecting the common electrodes 2 are provided. These connections 23 may overlap the linear electrodes 1 as shown in FIG. 30, but may be located outward the linear electrodes 1 in order to prevent overlapping. In FIG. 30, openings 8 are defined by the adjacent two common electrodes 2 and the connections 23 connecting them.

For simplicity, a region on a linear electrode 1 is defined as a narrow region NR, a region including an opening 8 and connections 23 as a boundary region BR, and a region on the common electrode 2 as a wide region WR, while the widths of the narrow region NR, the boundary region BR, and the wide region WR is designated as a, c and b, respectively.

Figure 30:
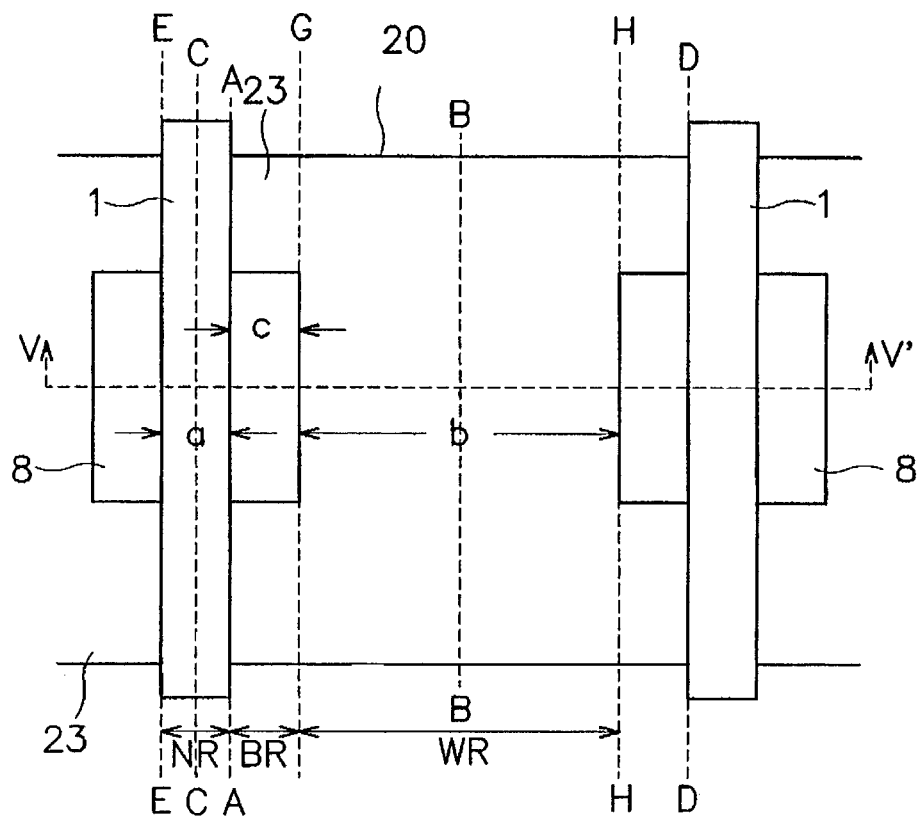
FIG. 30 is a layout view of an LCD according to a fifth embodiment of the present invention.
Figure 31:
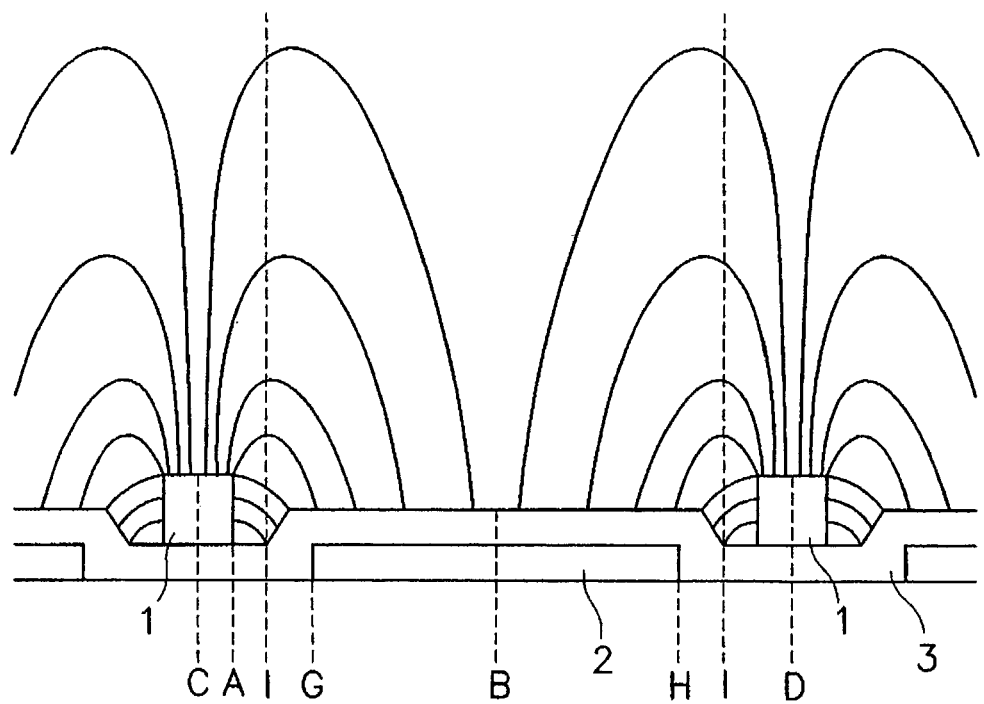
FIG. 31 is a cross-sectional view taken along the line V-V' in FIG. 30.

In FIG. 31 which is a cross-sectional view taken along line V-V' in FIG. 30, the lines of force between the central line C of the narrow region NR and the central line B of the wide region WR are in parabolic or semi-elliptical shapes. When the width of the boundary region BR is fixed, the location of the vertex of the line of force varies depending on the value of the a/b. However, the vertex of the parabolic line of force is located approximately on the central line I of the boundary region BR. The shape of the parabola is asymmetric when a is different from b, but it is substantially symmetric when a and b are the same. When c is zero, the electric field has the shape similar to the electric field of the first embodiment, and even though c is not zero, the electric field on the planar electrode 2 or the linear electrodes 1 also has the horizontal component and the vertical component.

Accordingly, in the transmissive type display where both or one of the two electrodes 1 and 2 is made of transparent material, the light incident on the liquid crystal layer through the transparent electrode 1 or 2 is controlled by the twist and the tilt of the liquid crystal molecules on the transparent electrode. Here, the smaller the value of c, the lesser the threshold voltage of the liquid crystal material becomes.

In case of the reflection type display where the two electrodes 1 and 2 are made of opaque metal having high reflectance such as Al, the reflectance gets higher as the value of c becomes smaller. In this case, the re-arranged liquid crystal molecules on the electrodes 1 and 2 having the twist angle and the tilt angle change the polarization of the light incident on the liquid crystal layer through the upper substrate and that of the light which is reflected by the electrodes 1 and 2 and incident on the liquid crystal layer.

Figure 33:
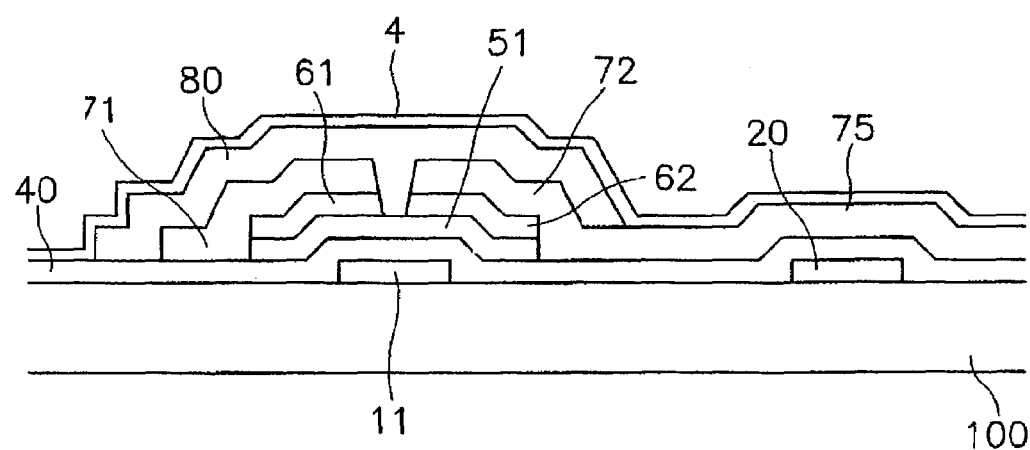
FIG. 33 is a cross-sectional view taken along line VIA-VIA' in FIG. 32.
Figure 34:
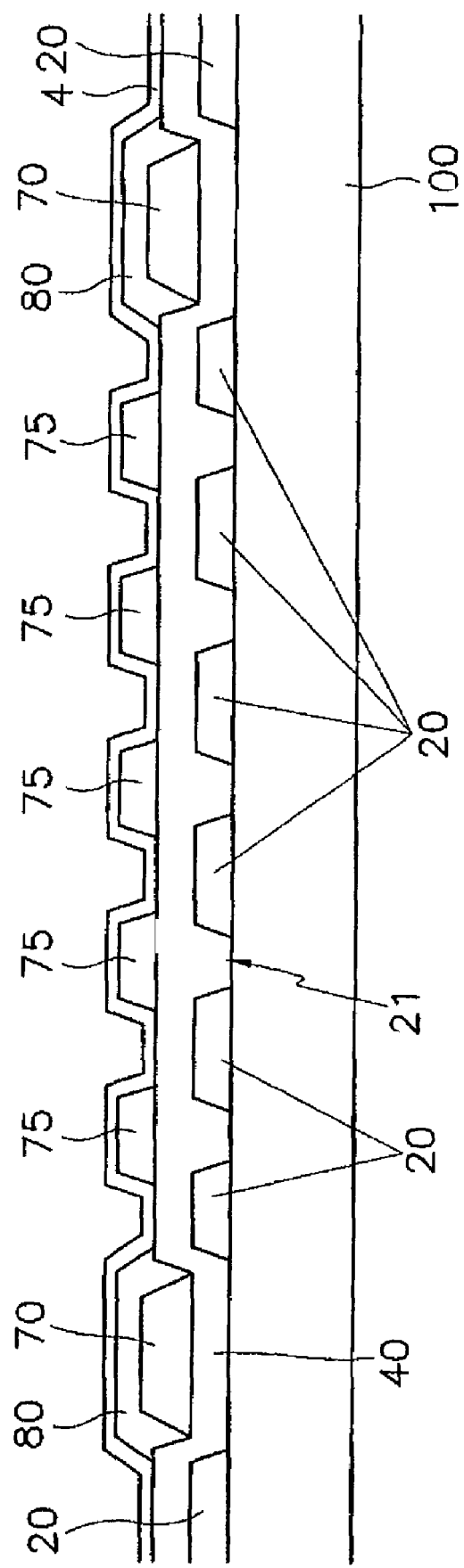
FIG. 34 is a cross-sectional view taken along line VIB-VIB' in FIG. 32.

The LCD according to the sixth embodiment of the present invention having a thin film transistor as a switching element as well as the electrodes suggested in the first to the fifth embodiments, is described in detail with reference to FIGS. 32 to 34.

Figure 32:
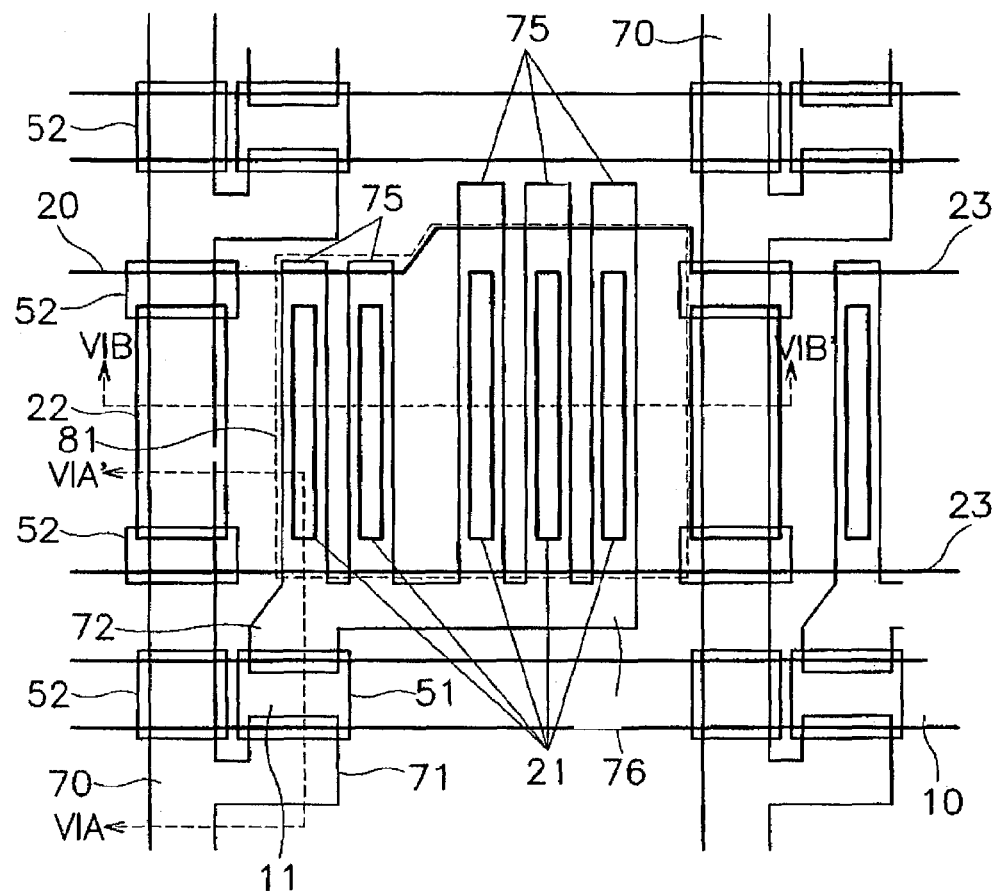
FIG. 32 is a layout view of the LCD according to a sixth embodiment of the present invention.

FIG. 32 is a layout of a pixel formed on the lower substrate of the LCD according to the sixth embodiment of the present invention, wherein hundreds of thousands of such pixels are formed in a matrix type in the LCD.

A plurality of gate lines or scanning signal lines 10 and a plurality of planar common electrodes 20 are formed on a transparent insulating substrate 100. The scanning signal lines 10 are elongated in the transverse direction, and the common electrodes are located between the scanning signal lines 10. A portion 11 of the scanning signal line 10 serve as a gate electrode, and connections 23 connect adjacent common electrodes 20.

The scanning signal lines 10 and the common electrodes 20 are covered with a gate insulating film 40, and a channel layer 51 made of amorphous silicon is formed on a portion of a gate insulating film 40 opposite the gate electrode 11 of the scanning signal line 10. Two separated portions 61 and 62 of the doped amorphous silicon layer heavily doped with n-type impurity are formed on portions of the channel layer 51, and the portions 61 and 62 are opposite to each other with respect to the gate electrode 11.

On the other hand, a plurality of data lines 70 are formed on the gate insulating film 40 and elongated longitudinally to intersect the gate lines 10. A branch of the data line 70 extends to one portion 61 of the doped amorphous silicon layer to form a source electrode 71, and a drain electrode 72 is formed on the other portion 62 of the doped amorphous silicon layer. The gate electrode 11, the source electrode 71 and the drain electrode 72 form electrodes of the TFT along with the channel layer 51. The doped amorphous silicon layer 61 and 62 improves ohmic contact between the source and the drain electrodes 71 and 72 and the amorphous silicon layer 51.

The drain electrode 72 extends to form a plurality of linear pixel electrodes 75 elongated longitudinally and a connecting portion 76 of the pixel electrodes 75. The data line 70, the source and the drain electrodes 71 and 72 and the connecting portion 76 are covered with a passivation film 80, and the aligning film 4 is coated thereon.

Since the connections 23 overlap the data line 70, and the overlapping causes parasitic capacitance to increase the RC delay of the image signal of the data line 70. To reduce the RC delay, it is preferable that the overlapping between the connection 23 and the data line 70 is minimized.

A portion of the passivation film 80 in the display region where the pixel electrode 75 and the common electrode 20 are located may be removed to obtain sufficient electric field.

Other amorphous silicon patterns 52 are formed on the portions of the gate insulating layer 40 where the gate lines 10, the connections 23 intersect the data lines 70 in order to enhance the insulation therebetween.

A method for manufacturing the LCD according to the sixth embodiment of the present invention is described in detail hereinafter.

First, a transparent conductive layer such as indium tin oxide (ITO) is deposited and patterned to form common electrodes 20 and their connections 23. A film of Cr, Al, Mo, Ti, Ta or their alloys are deposited and patterned to form scanning signal lines 10. A gate insulating film 40 made of such as silicon nitride is deposited to cover the common electrode 20, the gate electrode 11 and the scanning signal lines 10. An amorphous silicon layer and an n+ type amorphous silicon layer are sequentially deposited on the gate insulating film 40, and patterned to form 51, 52 and 61, 62.

A film of Cr, Al, Mo and Ta or their alloys are deposited and patterned to form a data wire including data lines 70, source electrodes 71, drain electrodes 72 and pixel electrodes 75. A portion of the n+ type amorphous silicon layer which is not covered by the data wire are removed. Next, a passivation film 80 is deposited and patterned to form an opening 81 on the display region. Finally, an aligning film 4 is coated thereon.

Next, a substrate for a liquid crystal display and a manufacturing method thereof according to the seventh embodiment are described in detail.

Figure 35A:
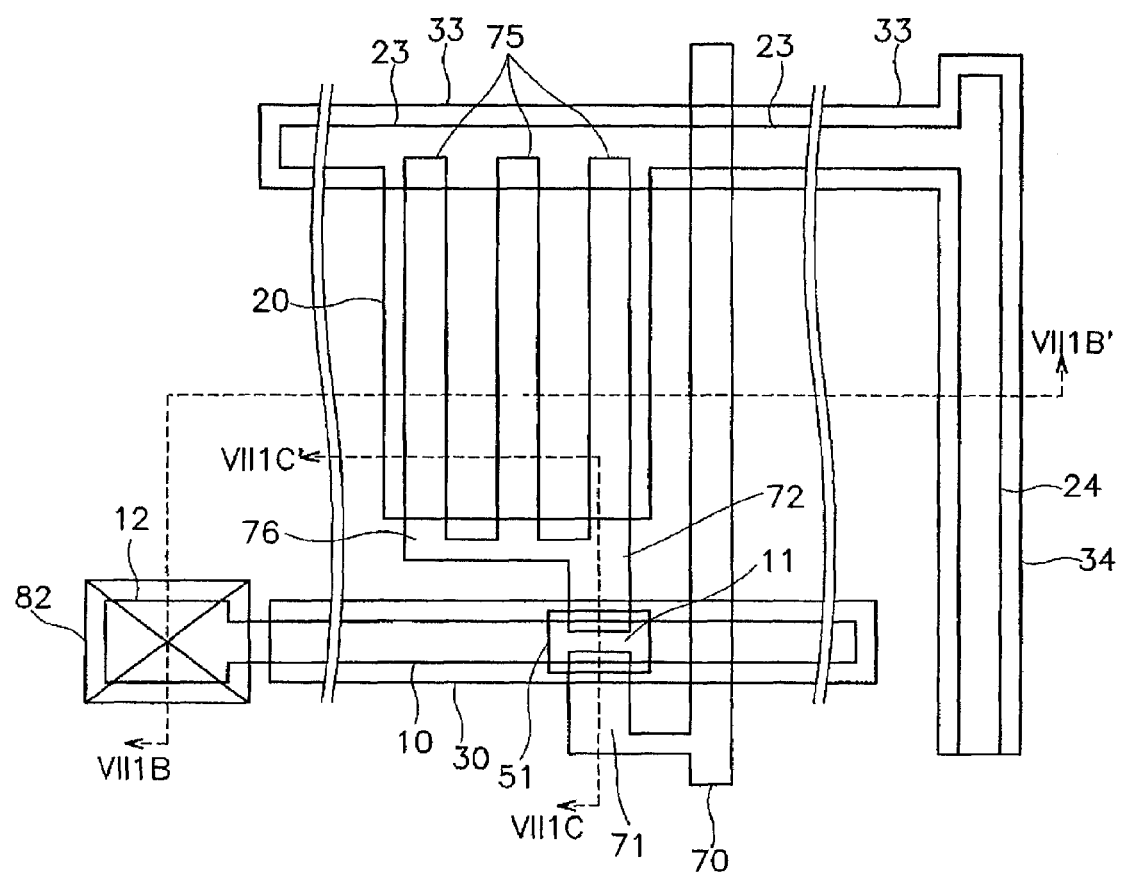
FIG. 35A is a layout view of the LCD according to a seventh embodiment of the present invention.

First, the structure of a liquid crystal display substrate is described with reference to FIGS. 35A to 35C. FIG. 35A is a layout view of a lower substrate of a liquid crystal display, and FIGS. 35B and 35C are sectional views taken along the lines VII1B-VII1B' and VII1C-VII1C' respectively.

As shown in FIGS. 35A to 35C, a planar common electrode 20 made of transparent conductive material such as ITO (indium tin oxide) is formed on a transparent insulating substrate 100. The common electrode 20 is in a pixel region, and is connected to adjacent common electrodes (not shown) in adjacent pixel regions via a plurality of connections 23 on the substrate 100 to transmit common signals. A common signal transmitter 24 on the substrate 100 is electrically connected to the common electrode 20 via the connection 23, and located near the right edge of the substrate 100.

At the lower part of the pixel region, a gate line 10 is formed on the substrate 100 and extends in the transverse direction. The gate line 10 is connected to a gate pad 12 which is located near the left edge of the substrate 100 and receives external scanning signals. A portion 11 of the gate line 10 serves as a gate electrode.

The common electrode 20, the connections 23, the common signal transmitter 24, the gate line 10 and the gate pad 12 are made of transparent conductive materials, and a redundant pattern for preventing their disconnection is formed on the upper part of the common electrode 20, the connections 23, the common signal transmitter 24 and the gate line 10. A redundant connection 33 is provided on the connections 23 and upper part of the common electrode 20, a redundant common signal transmitter 34 on the common signal transmitter 24, and a redundant gate line 30 and a redundant gate electrode 31 on the gate line 10 and the gate electrode 11, respectively. The redundant pattern 30, 31, 33 and 34 may be made of any conductive material such as Al or Al alloy. However, when using Al or Al alloy, since direct contact of ITO and Al and Al alloy yields an oxide therebetween, a buffer layer 32 and 35 made of refractory metal such as Cr or MoW alloy is interposed between the two layers.

The common electrode 20 and the redundant pattern are covered with a gate insulating layer 40. As shown in FIGS. 35A and 35B, a channel layer 51 made of amorphous silicon is formed on the gate insulating layer 40 opposite the gate electrode 11. Two separate portions 61 and 62 of a contact layer of amorphous silicon heavily doped with n type impurity are formed on the channel layer 51 and located opposite to each other with respect to the gate electrode 11.

A data line 70 extending in the longitudinal direction is also formed on the gate insulating layer 40 and intersects the gate line. A branch of the data line 70 extends to one portion 61 of the doped amorphous silicon layer to form a source electrode 71, and a drain electrode 72 is formed on the other portion 62 of the doped amorphous silicon layer. The gate electrode 11, the source electrode 71 and the drain electrode 72 form electrodes of the TFT along with the channel layer 51. The doped amorphous silicon layer 61 and 62 improves ohmic contact between the source and the drain electrodes 71 and 72 and the amorphous silicon layer 51.

The drain electrode 72 extends to form a plurality of linear pixel electrodes 75 elongated longitudinally and a connecting portion 76 of the pixel electrodes 75. The data line 70, the source and the drain electrodes 71 and 72 and the connecting portion 76 are covered with a passivation film 80, and the passivation film 80 and the gate insulating layer 40 having a contact hole 82 exposing the gate pad 12.

A portion of the passivation film 80 in the pixel region where the pixel electrode 75 and the common electrode 20 are located may be removed to obtain sufficient electric field.

A method for manufacturing the LCD according to the seventh embodiment of the present invention is described in detail with reference to FIGS. 36A to 39C. FIGS. 36A, 37A, 38A and 39A are layout views of the intermediate structures of the liquid crystal display substrate according to this embodiment, and FIGS. 36B and 36C, 37B and 37C, 38B and 38C, and 39B and 39C are sectional views taken along the lines VII2B and VII2C in FIG. 36A, VII3B and VII3C in FIG. 37A, and VII4B and VII4C in FIG. 38A and VII5B and VII5C in FIG. 39A.

Figure 36A:
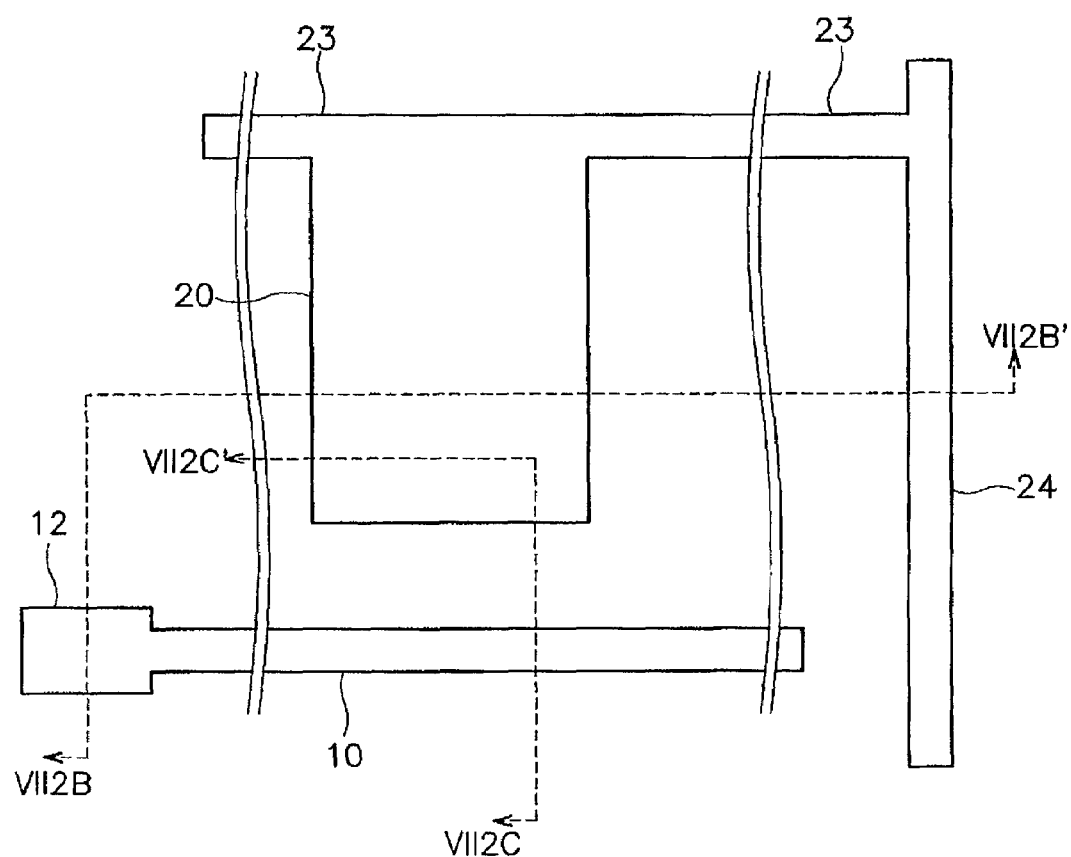

First, as shown in FIGS. 36A-36C, a transparent conductive layer such as indium tin oxide is deposited to the thickness of 50-100 nm on an insulating substrate 100 and patterned using a first mask to form a common wire including a common electrode 20, their connections 23 and a common signal transmitter 24, and a gate wire including a gate line 10 and a gate pad 12.

Figure 37A:
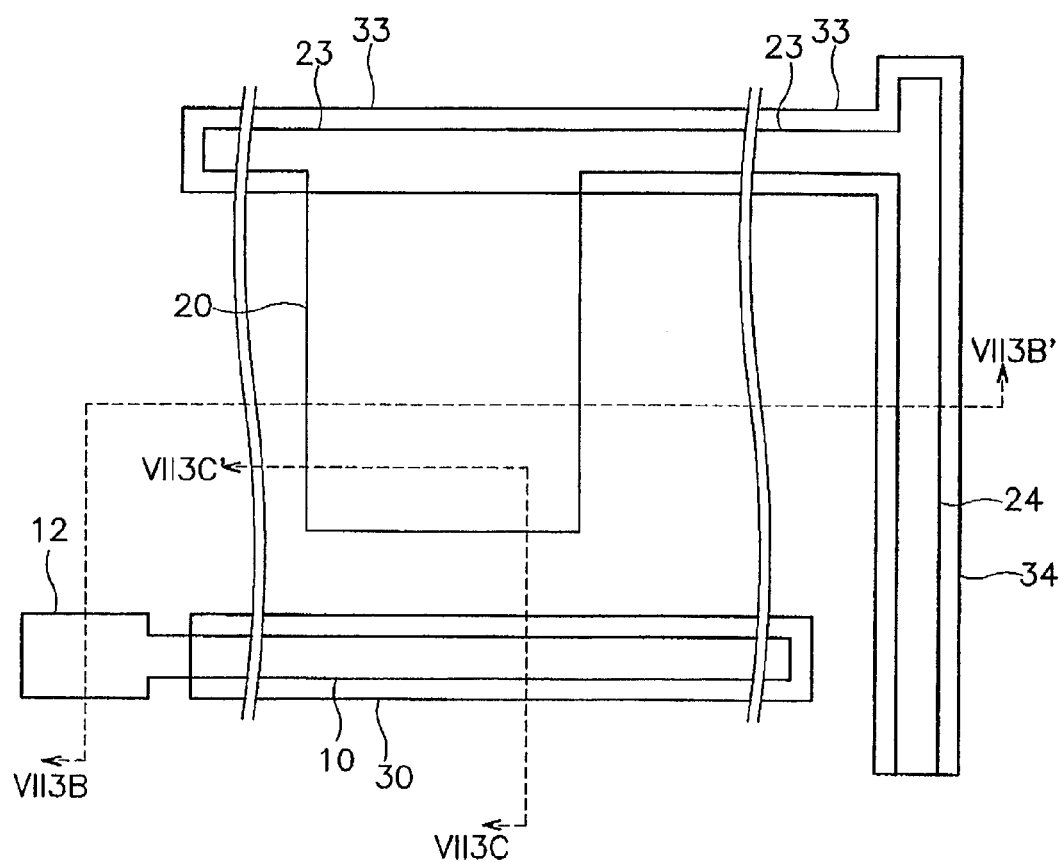
Figure 37B:
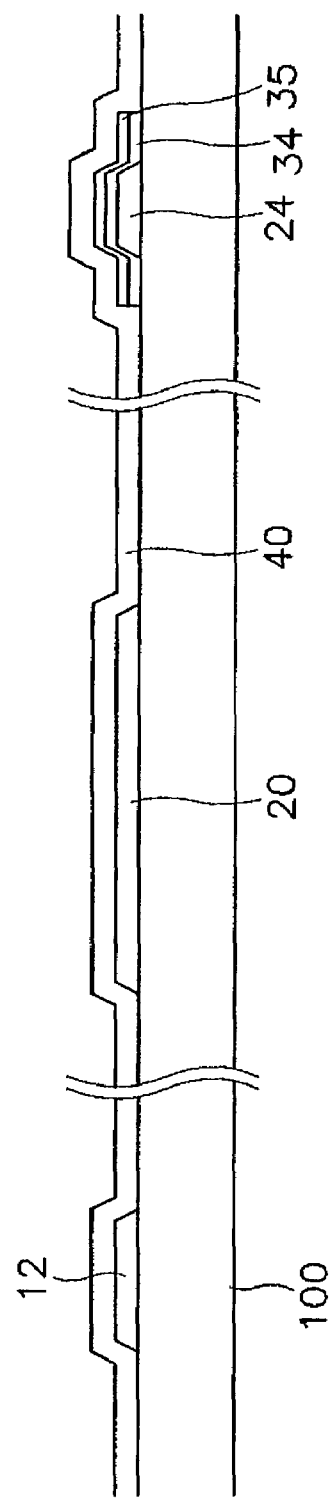
Figure 37C:
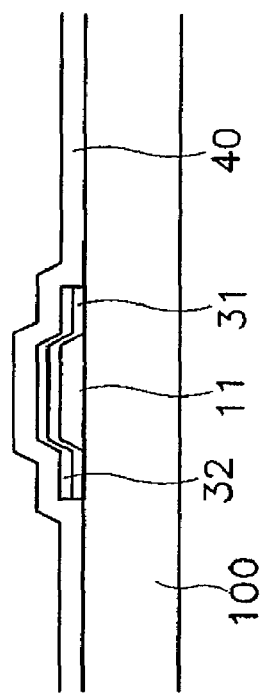

As shown in FIGS. 37A-37C, a lower conductive film made of a refractory metal such as Cr or Mo—W, and an upper conductive film of Al or Al alloys with thickness of 100-400 nm are deposited in sequence and patterned by using a second mask to form a redundant pattern 30, 33 and 34 and a buffer layer 32 and 35 thereunder. A gate insulating layer 40 is deposited thereon.

Figure 38A:
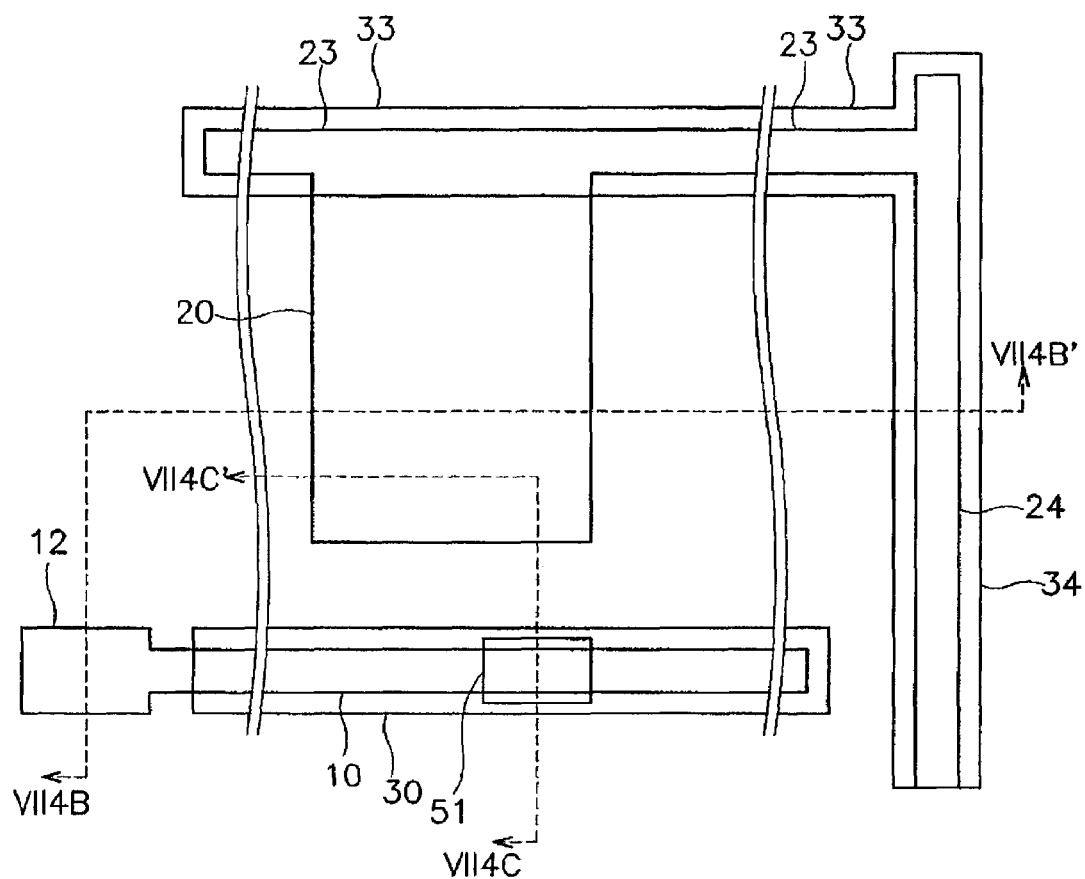

As shown in FIGS. 38A-38C, an amorphous silicon layer and an n+ type amorphous silicon layer are sequentially deposited on the gate insulating film 40, and patterned by using a third mask to form the patterns 51 and 60.

Figure 39A:
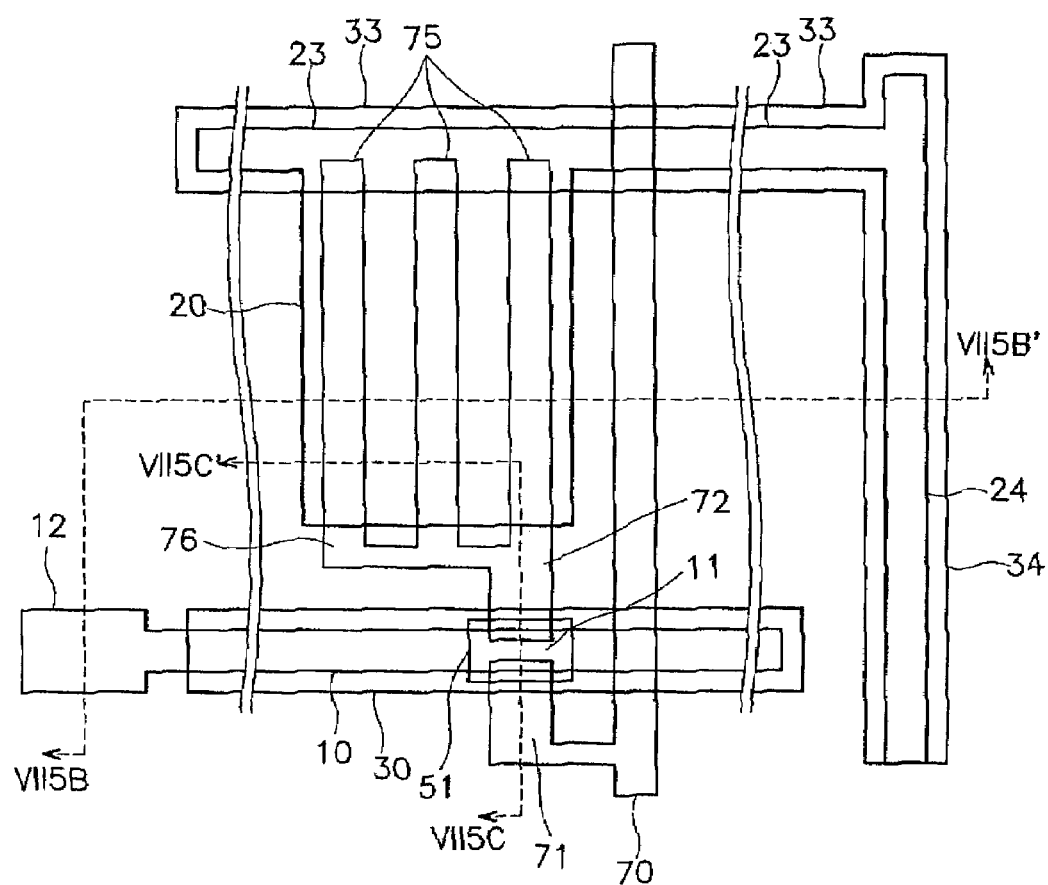

As shown in FIGS. 39A-39C, a film made of Cr, Al, Mo and Ta or their alloys are deposited to a thickness of 100-200 nm and patterned by using a fourth mask to form a data wire including data lines 70, source electrodes 71, drain electrodes 72 and pixel electrodes 75. A portion of the n+ type amorphous silicon layer which is not covered by the data wire are removed.

Finally, a passivation film 80 with thickness of 200-400 nm is deposited and patterned along with the gate insulating layer 40 by using a fifth mask to form a contact hole 82.

Alternatively, the common wire and the gate wire are formed after the redundant pattern and the buffer layer is formed.

The material and the width of the electrodes 20 and 75 and the distance between the electrodes 20 may vary depending on the design of the liquid crystal display. For example, if the pixel electrodes 75 are transparent, the liquid crystal molecules over the pixel, electrodes 75 contribute to the display of images, causing larger transmittance. In case of reflective liquid crystal display, the common electrode 20 and the pixel electrodes 75 may be made of an opaque material having large reflectance.

Next, a substrate for a liquid crystal display and a manufacturing method thereof according to the eighth embodiment are described in detail.

Figure 40:
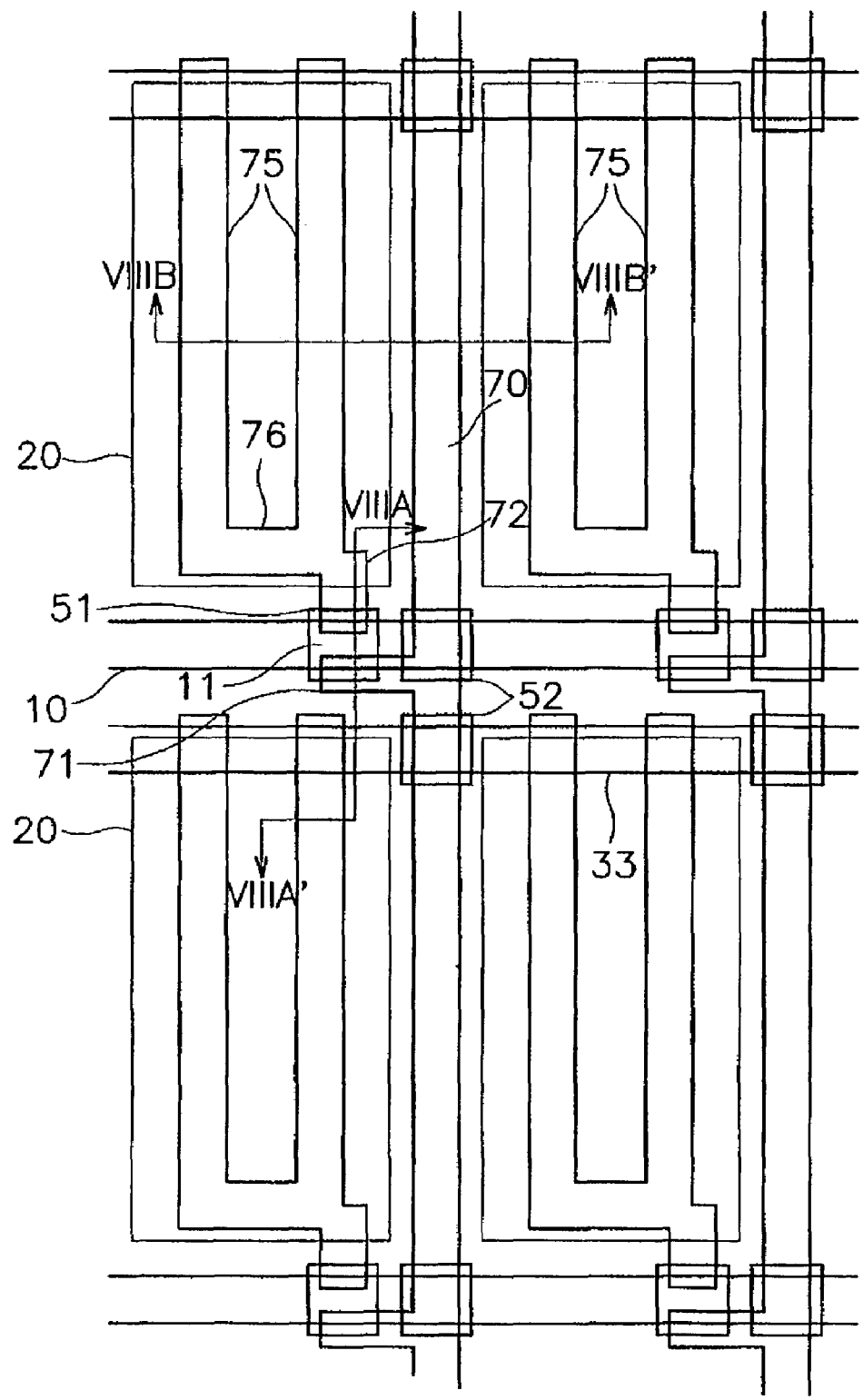
FIG. 40 is a layout view of the LCD according to an eighth embodiment of the present invention.
Figure 41:
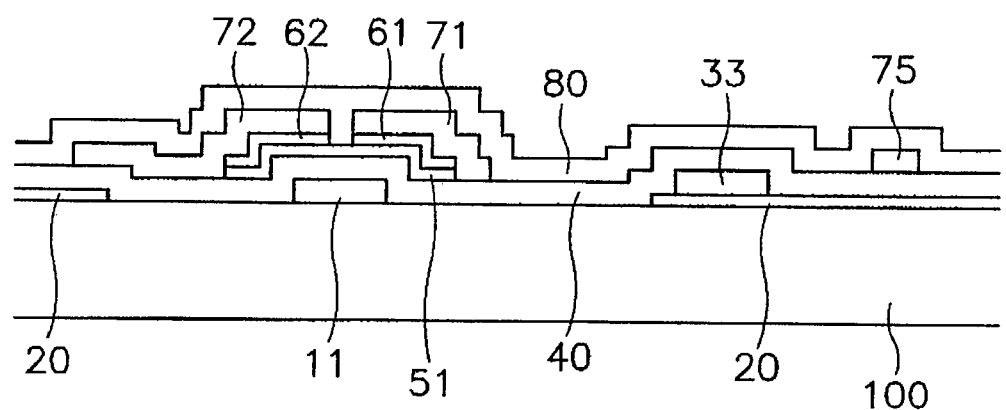
FIGS. 41 and 42 are two different cross-sectional views taken along line VIIIA-VIIIA' in FIG. 40.
Figure 42:
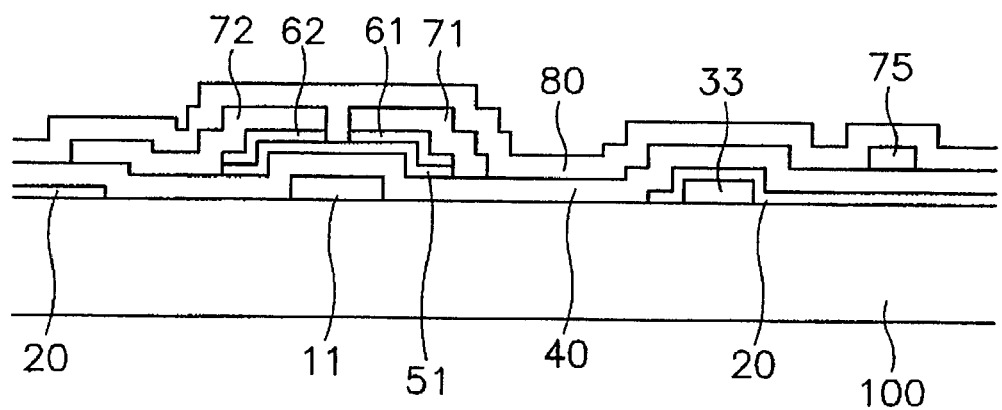

The structure of a liquid crystal display substrate with reference to FIGS. 40 to 42. FIG. 40 is a layout view of a lower substrate of a liquid crystal display, and FIGS. 41 and 42 are sectional views of different embodiments taken along the line VIIIA-VIIIA'.

As shown in FIGS. 40 to 42, a plurality of rectangular common electrodes 20 made of transparent conductive material such as ITO (indium tin oxide) are formed on a transparent insulating substrate 100. Each common electrode 20 is in a pixel region, and is connected to adjacent common electrodes in adjacent pixel regions via a plurality of connections 23 on the substrate 100 to transmit common signals. However, the connections 23 may be eliminated.

A plurality of common electrode lines 33 located at the upper parts of the common electrodes 20 extends in the transverse direction to electrically connect the common electrodes 20. The common electrode lines 33 have lower resistivity than the common electrodes 20, and are located either on the common electrodes 20 as in FIG. 41 or under the common electrodes 20 as in FIG. 42.

Between the common electrodes 20 adjacent along a column, a gate line 10 is formed on the substrate 100 and extends in the transverse direction. A portion 11 of the gate line 10 serves as a gate electrode.

The common electrode lines 33 and the gate line 10 may be made of any conductive material such as Al, Al alloy, Mo or Cr. However, when using Al or Al alloy, since direct contact of ITO and Al and Al alloy yields an oxide therebetween, a buffer layer made of refractory metal such as Cr or MoW alloy is interposed between the two layers.

The common electrodes 20 and the gate line 10 and the common electrode lines 33 are covered with a gate insulating layer 40. As shown in FIGS. 41 and 42, a channel layer 51 of amorphous silicon is formed on the gate insulating layer 40 opposite the gate electrode 11. Two separate portions 61 and 62 of a contact layer of amorphous silicon heavily doped with n type impurity are formed on the channel layer 51 and located opposite to each other with respect to the gate electrode 11.

A data line 70 extending in the longitudinal direction is also formed on the gate insulating layer 40 and intersects the gate line 10. A branch of the data line 70 extends to one portion 61 of the doped amorphous silicon layer to form a source electrode 71, and a drain electrode 72 is formed on the other portion 62 of the doped amorphous silicon layer. The gate electrode 11, the source electrode 71 and the drain electrode 72 form electrodes of the TFT along with the channel layer 51. The doped amorphous silicon layer 61 and 62 improves ohmic contact between the source and the drain electrodes 71 and 72 and the amorphous silicon layer 51.

The drain electrode 72 extends to form a plurality of linear pixel electrodes 75 elongated longitudinally and a connecting portion 76 of the pixel electrodes 75. The data line 70, the source and the drain electrodes 71 and 72 and the connecting portion 76 are covered with a passivation film 80.

A plurality of isolated amorphous silicon patterns 52 are located at the intersections of the gate line 10 and the common electrode lines 33 and the data lines 70, and interposed between the gate insulating layer 40 and the data lines 70.

A method for manufacturing the LCD according to the eighth embodiment of the present invention is described.

In the case of the structure shown in FIG. 41, an ITO layer and a metal layer are deposited in sequence. The metal layer is patterned to form common electrode lines 33 and gate lines 10, and the ITO layer is patterned to form common electrodes 20 and connections 23.

On the other hand, in the case of the structure shown in FIG. 42, a metal layer is deposited and patterned to form common electrode lines 33 and gate lines 10. Thereafter, an ITO layer is deposited and patterned to form common electrodes 20 and connections 23. In this case, the connections 23 may be eliminated.

Next, a gate insulating layer 40, an amorphous silicon layer 51 and a doped amorphous silicon layer 61 and 62 are deposited in sequence, and the doped amorphous silicon layer and the amorphous silicon layer are then patterned.

A metal film is deposited and patterned to form a data wire including data lines 70, source electrodes 71, drain electrodes 72 and pixel electrodes 75. A portion of the n+ type amorphous silicon layer which is not covered by the data wire are removed.

Finally, a passivation film 80 is deposited and patterned along with the gate insulating layer 40 to expose pads of the gate lines 10 and of the data lines 70.

In this embodiment, since the common electrodes 20 are patterned by using the common electrode lines 33 and the gate lines 10, misalignment may be reduced.

Figure 43:
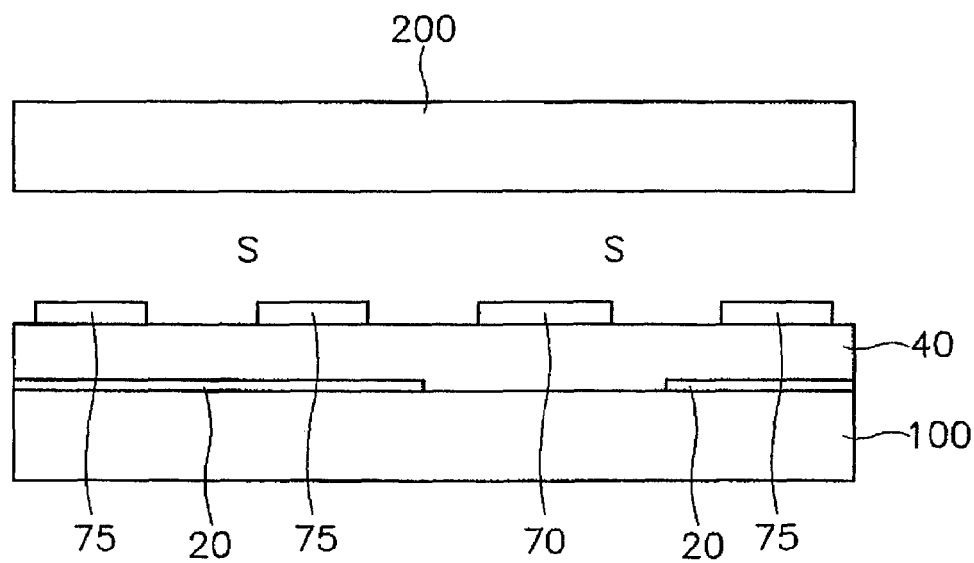
FIG. 43 is a cross-sectional view taken along line VIIIB-VIIIB' in FIG. 40.

FIG. 43 shows a sectional view taken along the line VIIIB-VIIIB' in FIG. 40 but includes an upper substrate. Among the regions between the pixel electrodes 75 and the common electrodes 20, the regions S adjacent to the data line 70 have disturbed electric field due to the signals flowing through the data line 70. Accordingly, the liquid crystal molecules in the regions S arrange themselves different from the other regions, and light may leak.

The ninth embodiment suggests the structure reducing the light leakage.

Figure 44:
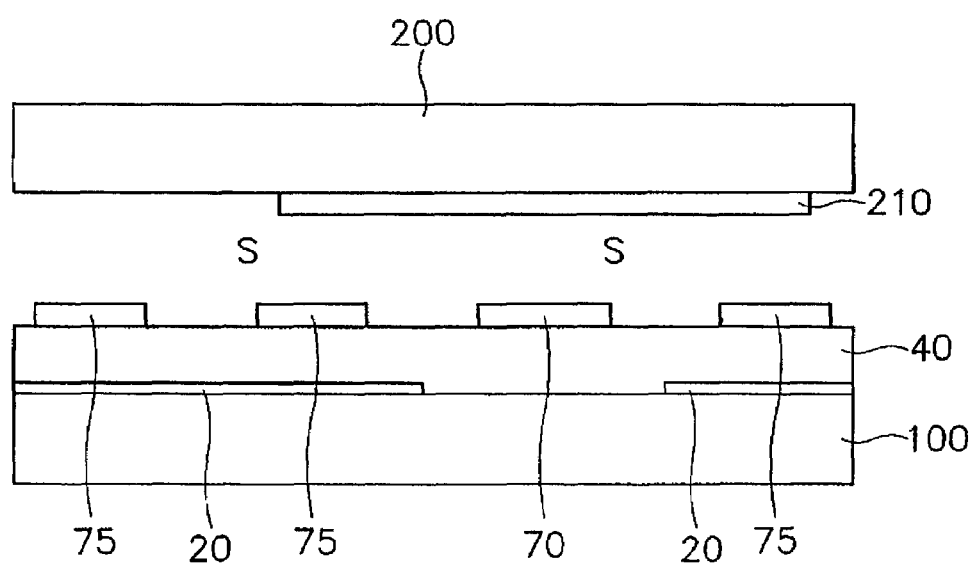
FIGS. 44 to 46 are cross-sectional views of LCDs according to a ninth embodiment of the present invention.
Figure 45:
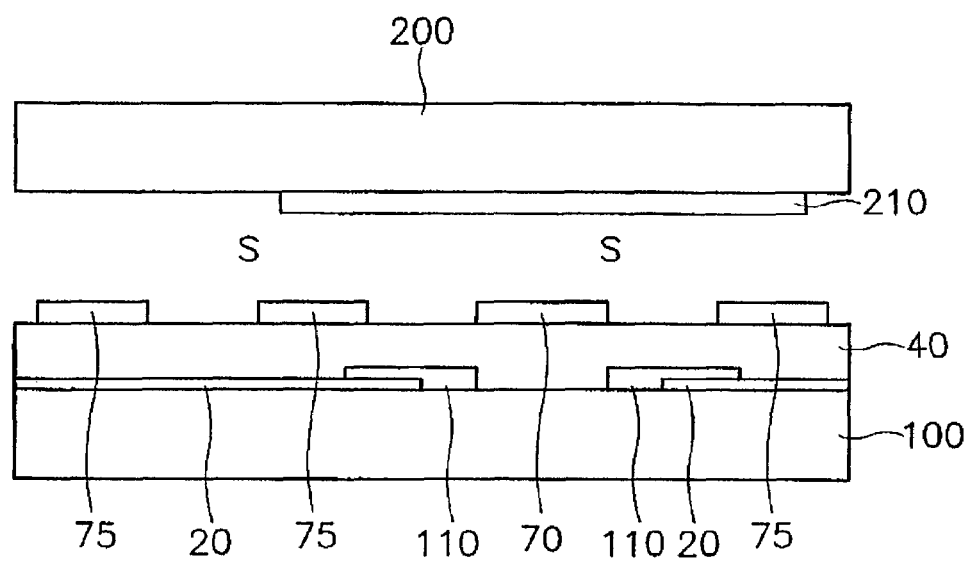
Figure 46:
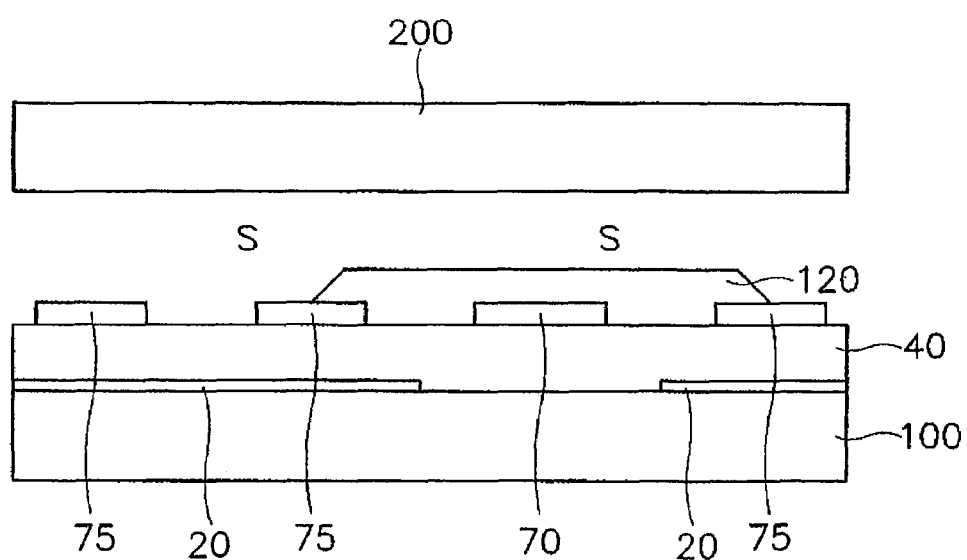

FIGS. 44, 45 and 46 are sectional views of the liquid crystal display according to the ninth embodiment of the present invention.

As shown in FIG. 44, a light blocking film 210 made of an opaque material such as Cr is formed on the upper substrate 200, and located at the position corresponding to the regions S.

In addition to the light blocking film 210 on the upper substrate 200, another light blocking film 110 is formed between the data line 70 and the pixel electrodes 75 adjacent thereto as shown in FIG. 45. The light blocking films 110 are formed on both the lower substrate 100 and the common electrodes 20, covered with the gate insulating layer 40, and overlap the data line 70.

It is preferable that the light blocking films 110 are conductive as well as opaque to have a potential equal to the common electrodes 20. In this case, the light blocking films 110 block the electric field due to the data line 70 as well as prevent light leakage in the region S.

FIG. 46 shows the structure having only a light blocking film 120 on the lower substrate 100. The light blocking film 120 is formed on the gate insulating layer 40 and covers the data line 70 at all and the pixel electrodes in part. The light blocking film 120 in FIG. 46 is made of insulating material, preferably organic material, since it directly contacts the data line 70 and the pixel electrodes 75.

The structures in the previous embodiments include a planar electrode, an insulating layer covering the planar electrode and a plurality of linear electrodes on the insulating layer. However, the linear electrode may be located under the planar electrode or may lie on the same plane. These structures are obtained by patterning the planar electrodes such that the planar electrode forms a continuous plane between the linear electrodes. The planar electrode may overlap the linear electrode in part. Otherwise, the planar electrode may not overlap the linear electrode but the distance between the adjacent boundaries of the pixel electrode and of the linear electrode is very close. The width of the planar electrode is either equal to or larger than that of the linear electrode. The liquid crystal molecules above the planar electrode are used for display, while the conventional IPS LCD uses the liquid crystal molecules only above the regions between the electrodes.

Figure 47:
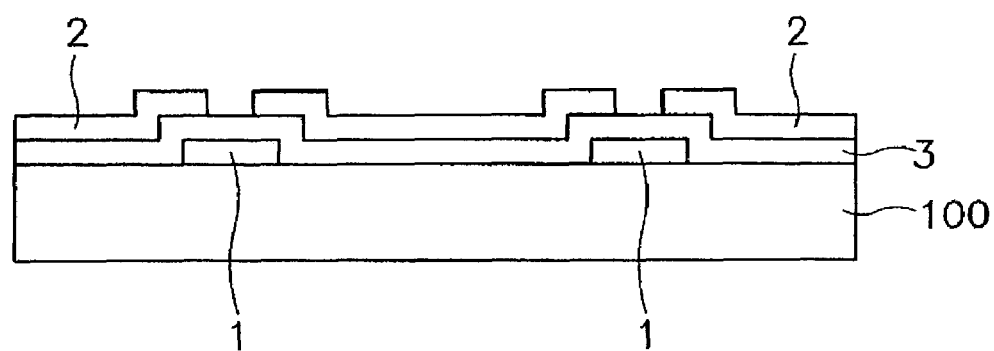
FIG. 47 is a cross-sectional view of an LCD according to a tenth embodiment of the present invention.

FIG. 47 is a sectional view of an LCD according to the tenth embodiment of the present invention.

As shown in FIG. 10, a plurality of linear first electrodes 1 are formed on an insulating substrate 100, and the first electrodes 1 are covered with an insulating layer 3. A plurality of planar second electrodes 2 are formed on the insulating layer 3, overlap the first electrode in part, and have the width equal to or larger than that of the first electrode. The first and the second electrodes 1 and 2 may be transparent or opaque according to the type of the LCD.

Figure 48:
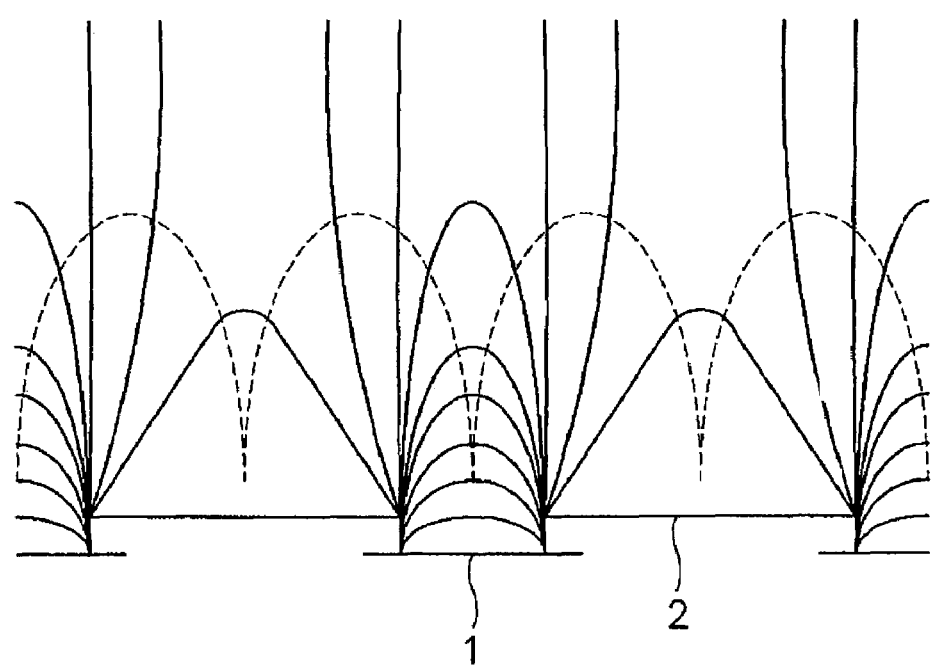
FIG. 48 is a schematic diagram of the electric field and equipotential lines in the LCD according to the tenth embodiment of the present invention.
Figure 49:
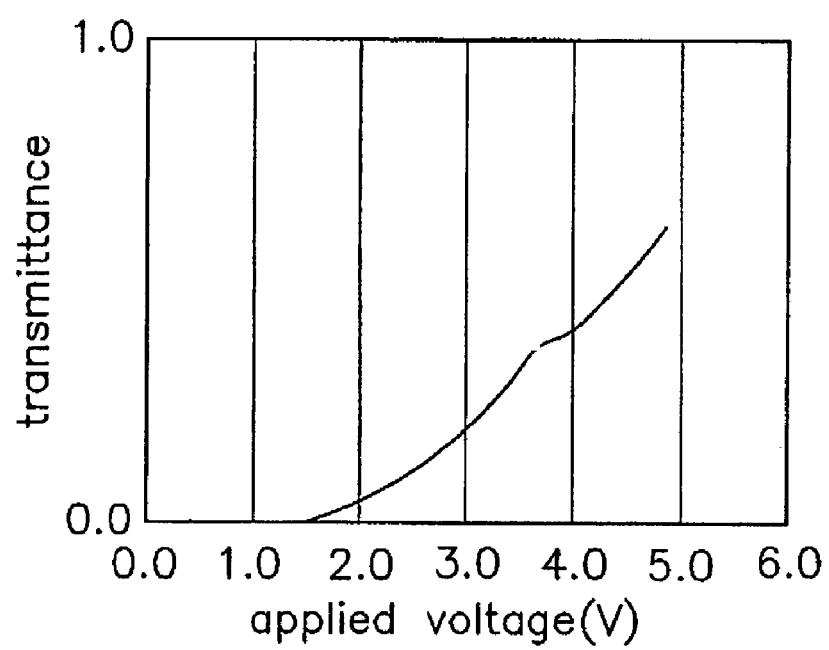
FIG. 49 is a graph illustrating the transmittance as a function of applied voltage in the LCD according to the tenth embodiment of the present invention.
Figure 50:
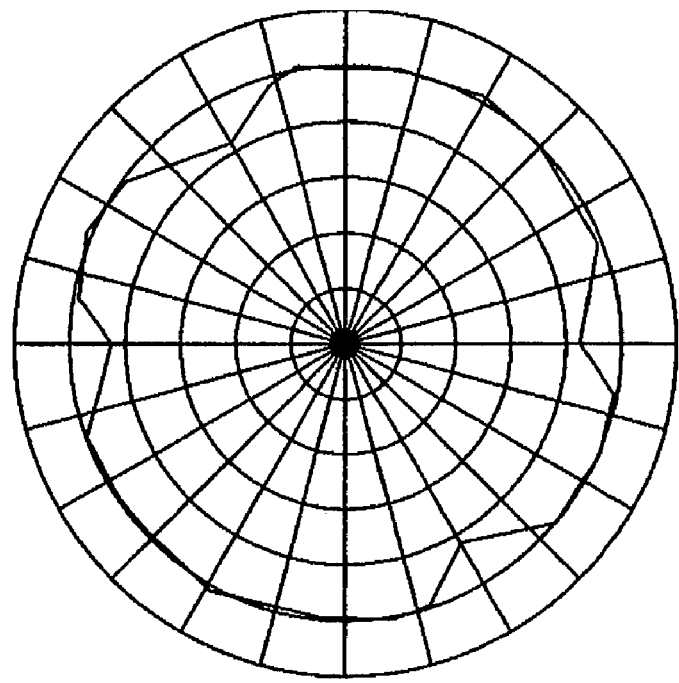
FIG. 50 is a graph illustrating a viewing angle in the LCD according to the tenth embodiment of the present invention.

FIGS. 48, 49 and 50 shows an electric field, transmittance and viewing angle characteristic of the LCD according to the tenth embodiment, respectively.

When applying 0 V and 5 V to the first and the second electrodes 1 and 2 respectively, the potential difference between the first and the second electrodes 1 and 2 yields the electric field shown in FIG. 48. In FIG. 48, solid lines indicate equipotential lines, and dotted lines indicate the lines of electrical force.

As shown in FIG. 48, the shape of the electrical field is symmetrical with respect to the central lines of the first and the second electrodes 1 and 2, and similar to that shown in FIG. 2.

FIG. 49 illustrates the transmittance as a function of the applied voltage according this embodiment. As shown in FIG. 10, the threshold voltage is about 1.5 V, and the saturation voltage is about 5 V.

FIG. 50 is a graphical illustration showing the viewing angle characteristics according to this embodiment. As shown in FIG. 50, the boundary of the region where the contrast is equal to or more than 10 is substantially over 60 degrees.

Figure 52:
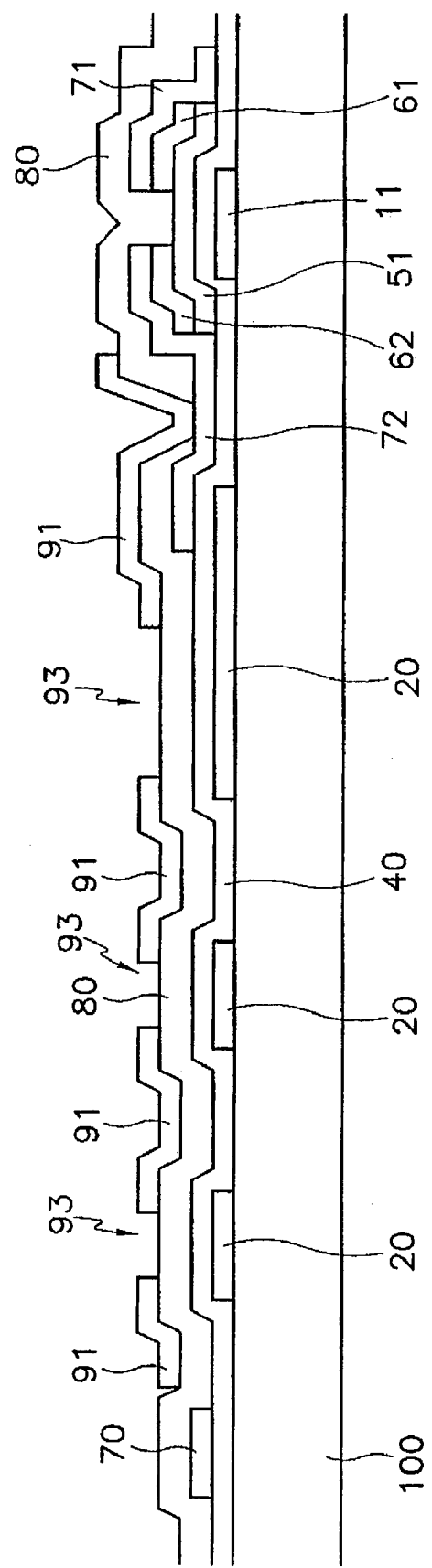
FIGS. 52 and 53 are cross-sectional views taken along lines XIA-XIA' and XIB-XIB' in FIG. 51.
Figure 53:
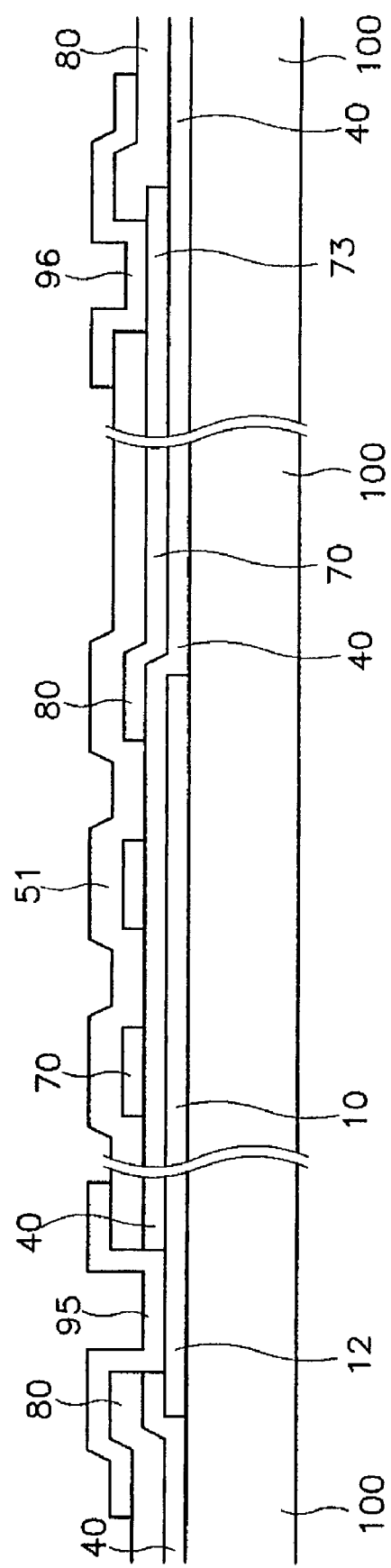

The LCD according to a eleventh embodiment of the present invention having a thin film transistor as a switching element as well as the electrodes suggested in the tenth embodiment, is described in detail with reference to FIGS. 51 to 53.

Figure 51:
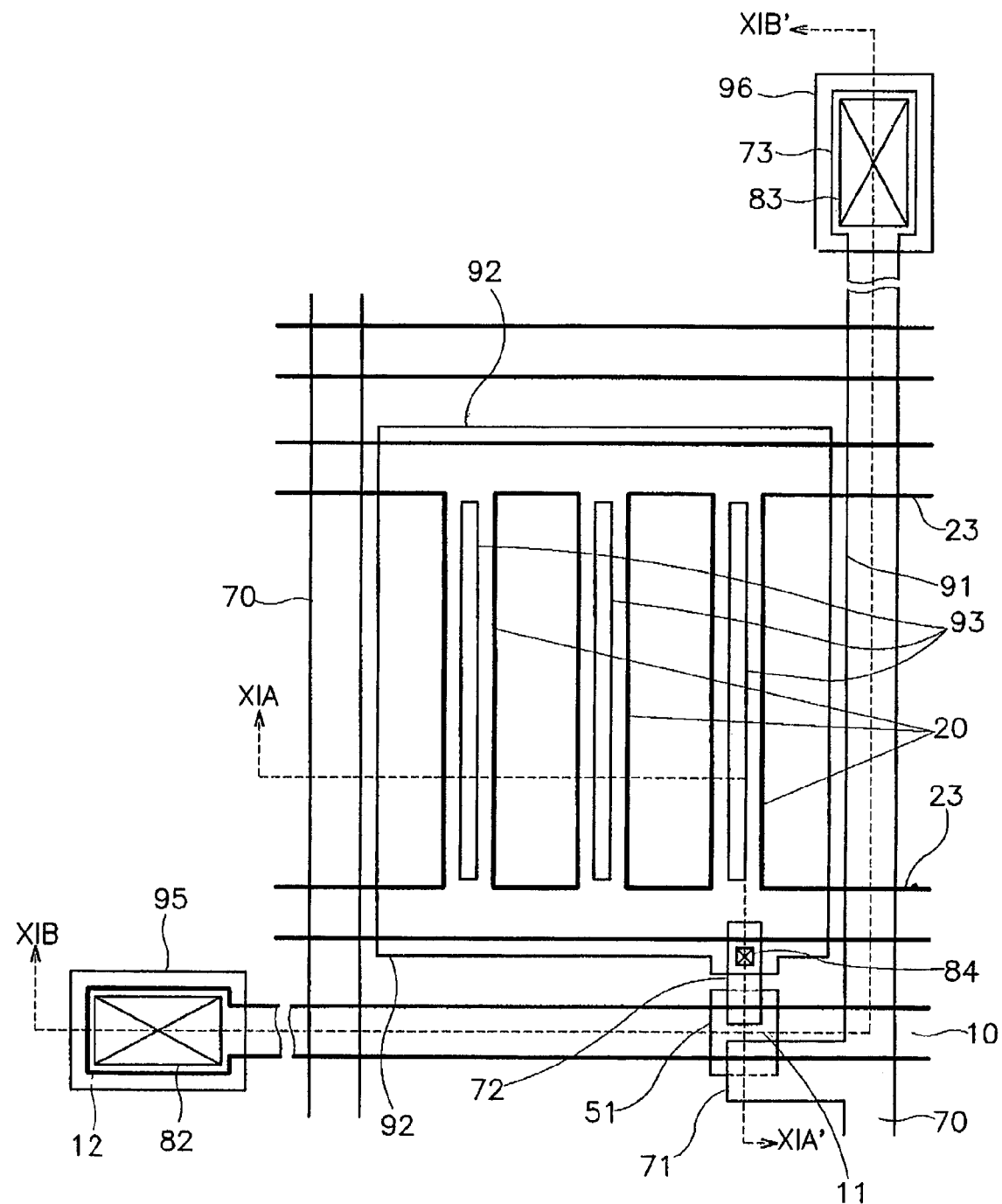
FIG. 51 is a layout view of an LCD according to an eleventh embodiment of the present invention.

FIG. 51 is a layout of a lower substrate of an LCD according to the eleventh embodiment of the present invention, wherein hundreds of thousands of such pixels are formed in a matrix type in the LCD. FIGS. 52 and 53 are sectional views taken along the lines XIA-XIA' and XIB-XIB', respectively.

A plurality of gate lines or scanning signal lines 10 and a gate pad 12 are formed on a transparent insulating substrate 100. The gate line 10 extends in the transverse direction and the gate pad 12 is connected to the left end of the gate line 10. A portion 11 of the gate line 10 serves as a gate electrode of a thin film transistor.

A plurality of common electrodes 20 elongated longitudinally are formed on the 100, and lies between the gate lines 10. A pair of transverse common electrode lines 23 connecting the common electrodes 20 are also formed on the substrate 100.

The gate lines 10, the common electrodes 20 and the common electrode lines 23 are covered with a gate insulating film 40, and a channel layer 51 made of amorphous silicon is formed on a portion of a gate insulating film 40 opposite to the gate electrode 11 of the scanning signal line 10. Two separated portions 61 and 62 of a amorphous silicon layer heavily doped with n type impurity are formed on portions of the channel layer 51, and the portions 61 and 62 are opposite to each other with respect to the gate electrode 11.

On the other hand, a plurality of data lines 70 and a data pad 73 are formed on the gate insulating film 40. The data line 70 is elongated longitudinally to intersect the gate lines 10, and the data pad 73 is connected to the upper end of the gate line 10. A branch of the data line 70 extends to one portion 61 of the doped amorphous silicon layer to form a source electrode 71, and a drain electrode 72 is formed on the other portion 62 of the doped amorphous silicon layer. The gate electrode 11, the source electrode 71 and the drain electrode 72 form electrodes of the TFT along with the channel layer 51. The doped amorphous silicon layer 61 and 62 improves the ohmic contact between the source and the drain electrodes 71 and 72 and the amorphous silicon layer 51.

The data line 70, the data pad 73 and the source and the drain electrodes 71 and 72 are covered with a passivation film 80. The passivation film 80 has contact holes 82, 83 and 84 exposing the gate pad 12, the data pad 73 and the drain electrode 84.

A plurality of linear pixel electrodes 91 elongated longitudinally and a connecting portion 92 of the pixel electrodes 91 are formed on the passivation film 80, and a redundant gate pad 95 and a redundant data pad 96 are also formed on the passivation layer 80. The boundaries 93 of the pixel electrodes 91 are over the common electrodes 20, and the connecting portion 92 is connected to the pixel electrodes 91 and connected to the drain electrode 72 through the contact hole 84. The width of the pixel electrode 91 is equal to or larger than that of the common electrode 20. The redundant gate pad 95 and the redundant data pad 96 are connected to the gate pad 12 and the data pad 73 through the contact holes 82 and 83, respectively.

A method for manufacturing the LCD according to the eleventh embodiment of the present invention is described in detail with reference to FIGS. 51 to 53 and 54A to 57B.

Figure 54A:
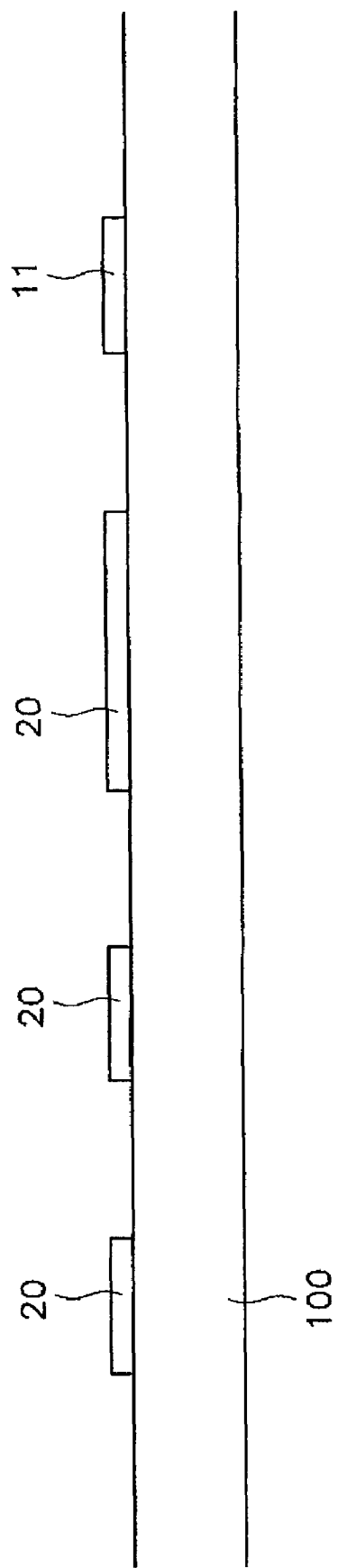

First, as shown in FIGS. 54A-54B, a conductive layer made of a refractory metal such as Cr, Al, Mo, Ti, Ta or their alloys is deposited on an insulating substrate 100 and patterned using a first mask to form a common wire including a plurality of common electrodes 20 and common electrode lines 33, and a gate wire including a gate line 10 and a gate pad 12.

Figure 55B:
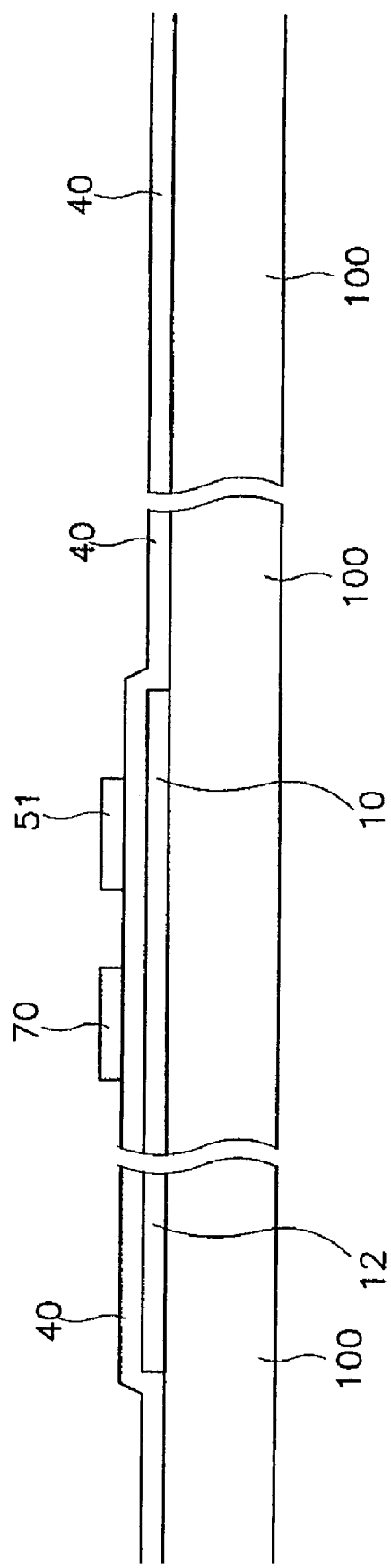

As shown in FIGS. 55A-55B, a gate insulating layer 40 of such as silicon nitride, an amorphous silicon layer and an n+ type amorphous silicon layer are sequentially deposited on the gate insulating film 40. The n+ type amorphous silicon layer and the amorphous silicon layer are patterned using a second mask to form the channel layer 51 and a pattern 60.

As shown in FIGS. 56A-56B, a film made of Cr, Al, Mo and Ta or their alloys are deposited and patterned by using a third mask to form a data wire including data lines 70, a data pad 73, a source electrode 71 and a drain electrodes 72. A portion of the n+ type amorphous silicon layer which is not covered by the data wire is removed.

Figure 57B:
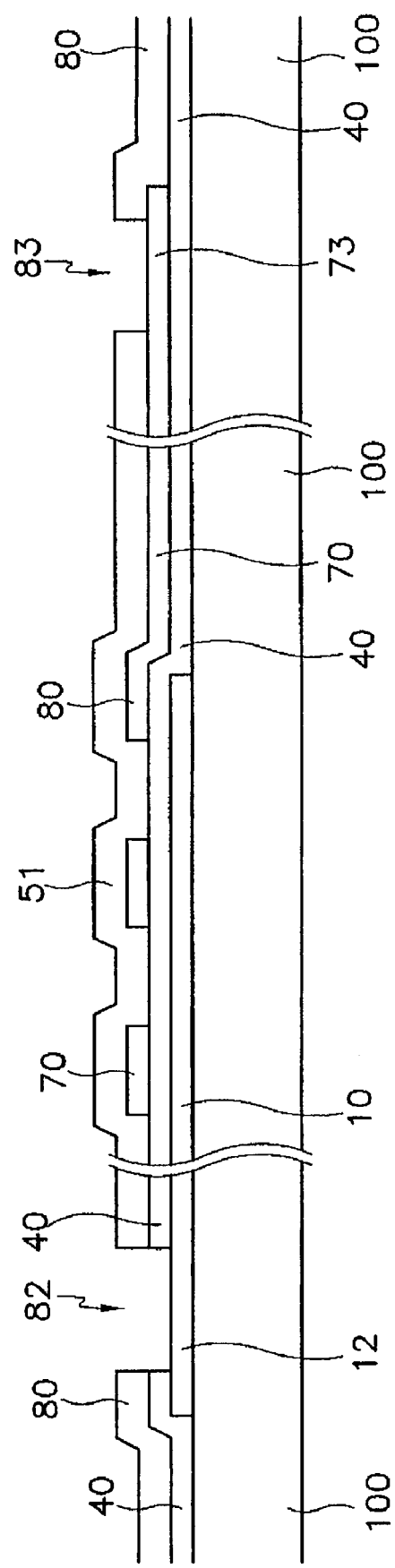

As shown in FIGS. 57A-57B, a passivation film 80 with thickness of 200-400 nm is deposited and patterned along with the gate insulating layer 40 by using a fourth mask to form contact holes 82, 83 and 84.

Finally, an ITO layer is deposited and patterned by using a fifth mask to form pixel electrodes 91, connecting members 92, a redundant gate pad 95 and a redundant data pad 96.

Figure 58:
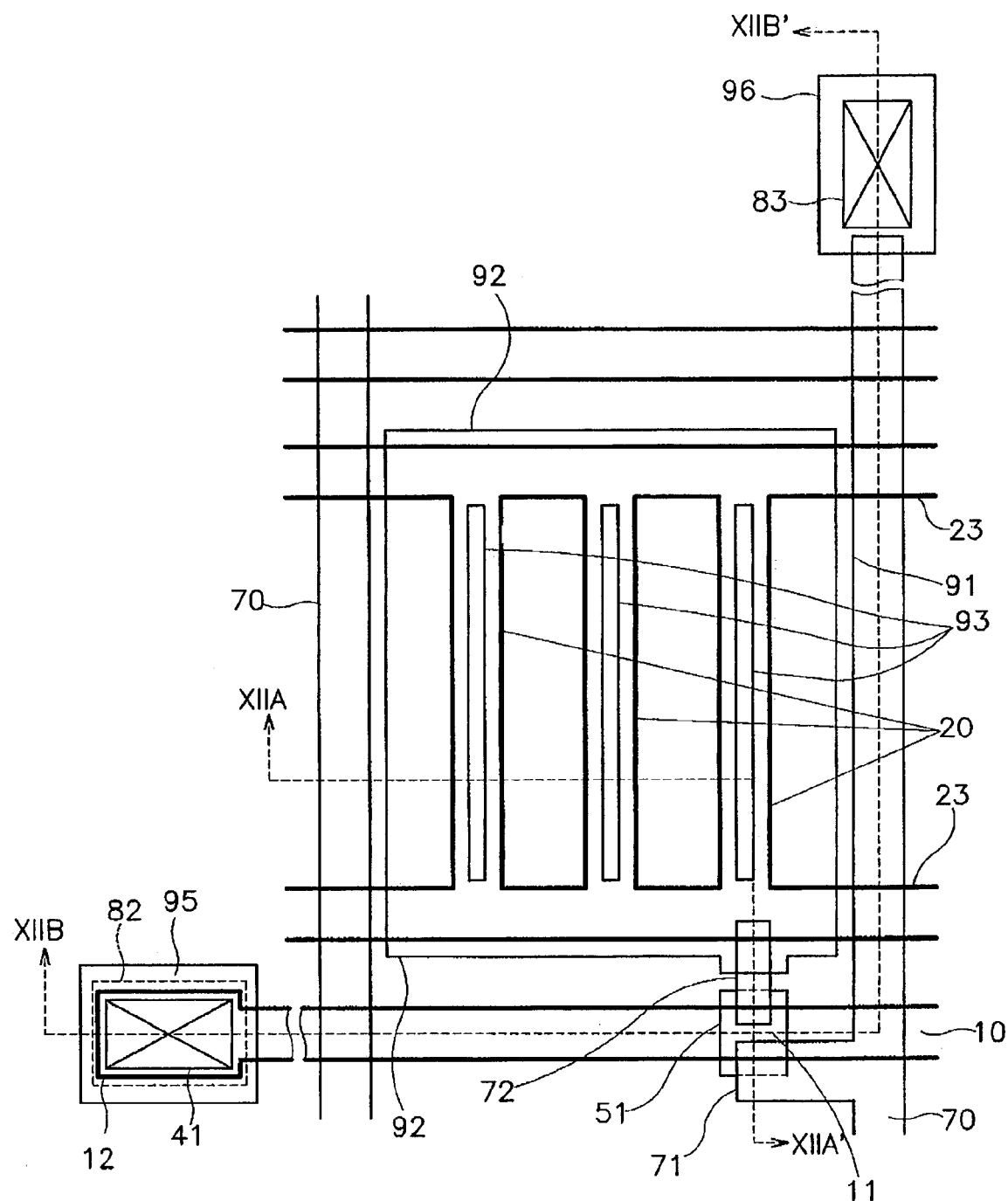
FIG. 58 is a layout view of an LCD according to a twelfth embodiment of the present invention.
Figure 59:
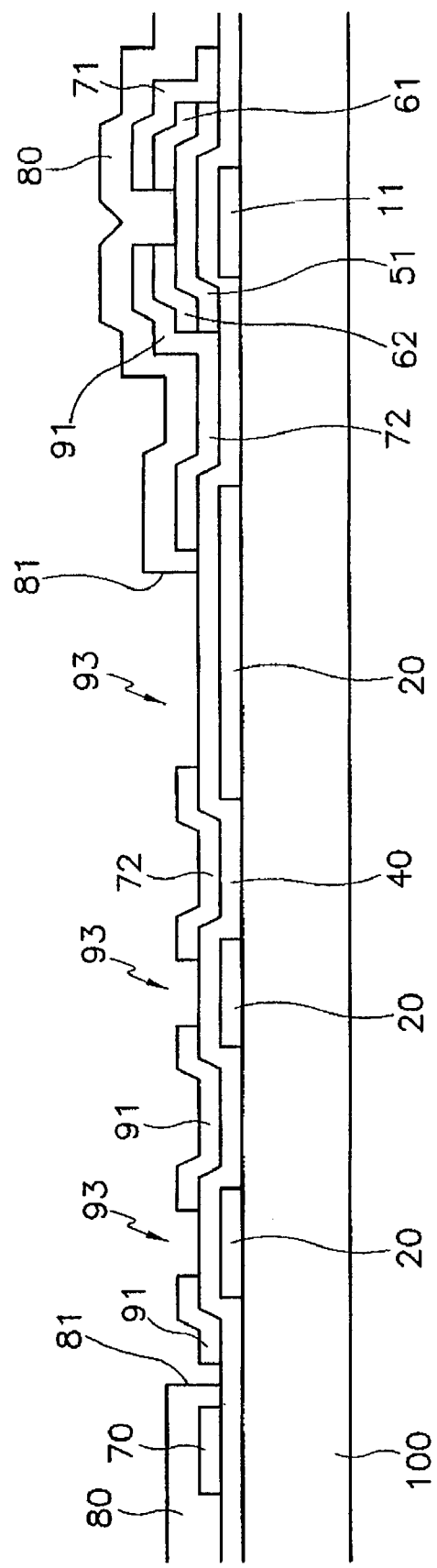
FIGS. 59 and 60 are cross-sectional views taken along lines XIIA-XIIA' and XIIB-XIIB' in FIG. 58.
Figure 60:
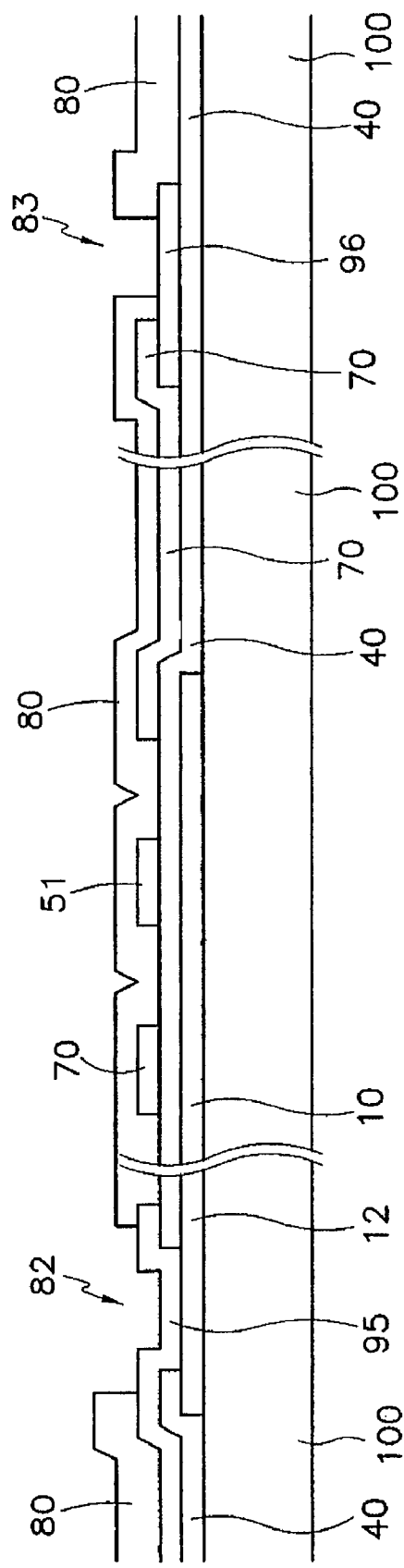

An LCD according to a twelfth embodiment has pixel electrodes directly on a gate insulating layer, as shown in the layout of FIG. 58. FIGS. 59 and 60 are sectional views taken along the lines XIIA-XIIA' and XIIB-XIIB', respectively.

A plurality of pixel electrodes 91 are formed on a portion of a gate insulating layer 40 between common electrodes 20 on an insulating substrate 100. A drain electrode 72 on the gate insulating layer 40 extends to connecting portion 92 of the pixel electrodes 91 and is electrically connected to the pixel electrodes 91. A passivation film 80 covers a data line 70, a source electrode 71 and the drain electrode 72 on the gate insulating layer 40, and has an opening 81 in the display region in order to obtain sufficient electrical field.

A portion of the gate insulating layer 40 on a gate pad 12 connected to a gate line is removed to form a contact hole 41, and a redundant gate pad 95 on the gate insulating layer 40 is in contact with the gate pad through the contact hole 41. A data pad 96 is formed on the gate insulating layer 40 and the data line 70 extends to the data pad 96 to contact the data pad 96. The passivation layer 80 has contact holes 82 and 83 respectively exposing the redundant gate pad 95 and the data pad 96.

The remaining structure is substantially the same as the eleventh embodiment.

A method for manufacturing the LCD according to the twelfth embodiment of the present invention is described in detail with reference to FIGS. 58 to 60 and 61A to 63B.

Gate lines 10, a gate pad 12, common electrodes 91 and common electrode lines 23 are formed, a gate insulating layer 40, an amorphous silicon layer and a doped amorphous silicon layer are deposited, and the doped amorphous silicon layer 51 and the amorphous silicon layer 60 are patterned as in the eleventh embodiment.

Figure 61A:
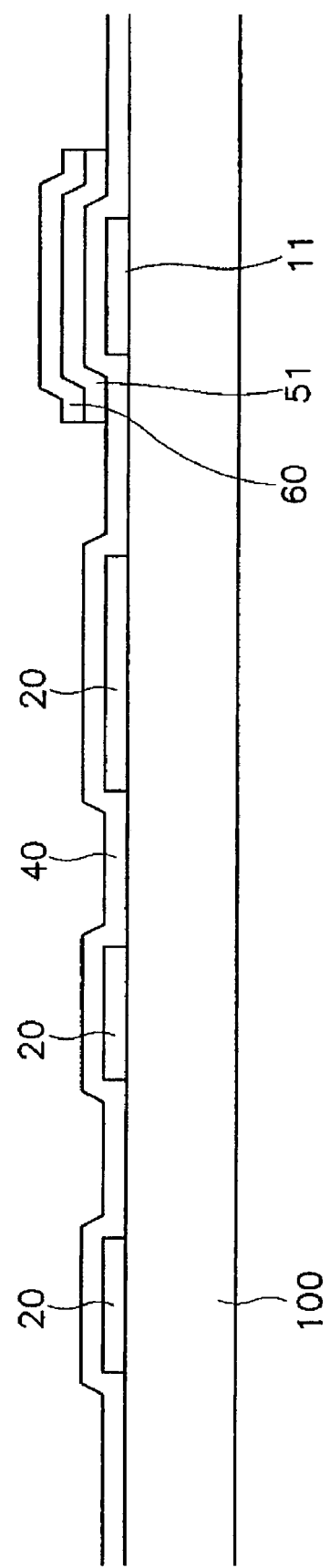
FIGS. 61A to 63B show intermediate structures of the LCD shown in FIGS. 58 to 60.
Figure 61B:
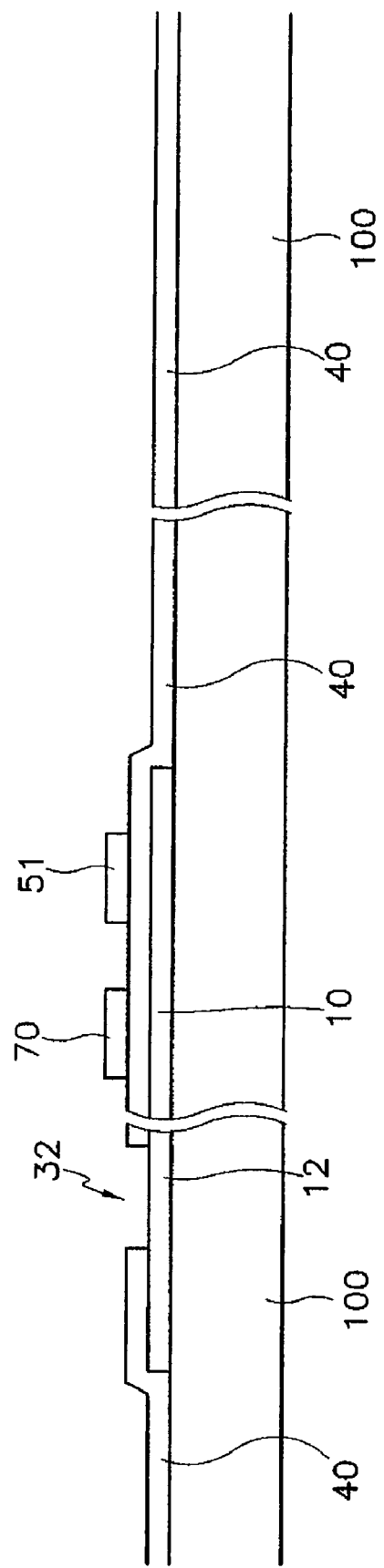

As shown in FIGS. 61A and 61B, the gate insulating layer 40 is patterned to form a contact hole 32 exposing the gate pad 12 by using a third mask.

Figure 62A:
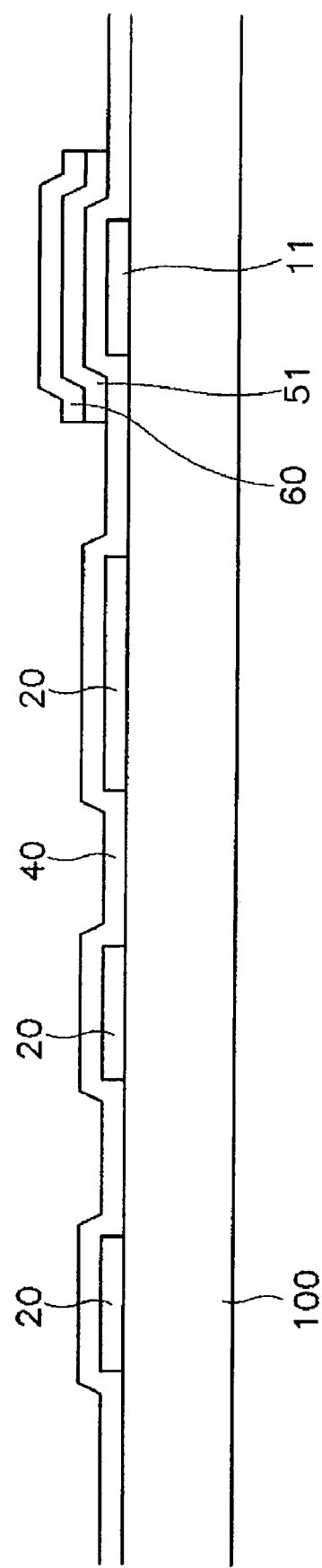
Figure 62B:
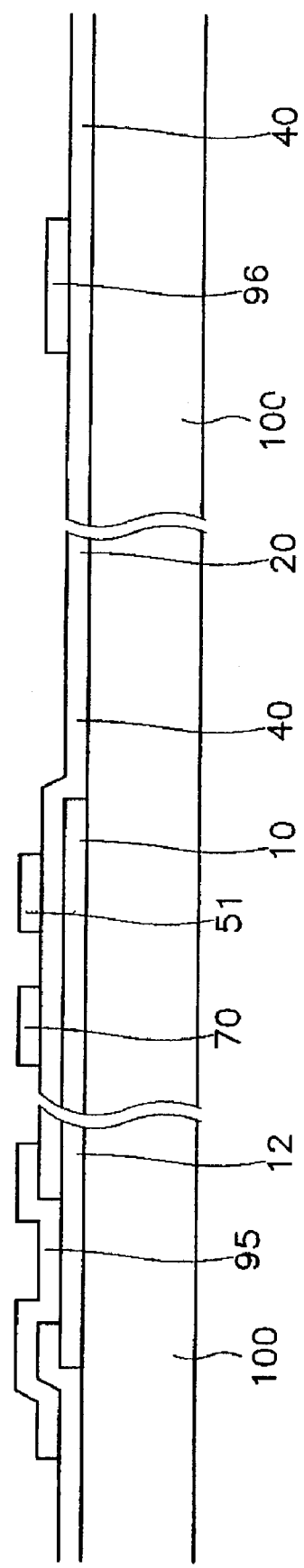

As shown in FIGS. 62A and 62B, an ITO layer is deposited and patterned by using a fourth mask to form pixel electrodes 91, connecting members 92, a redundant gate pad 95 and a data pad 96.

Figure 63A:
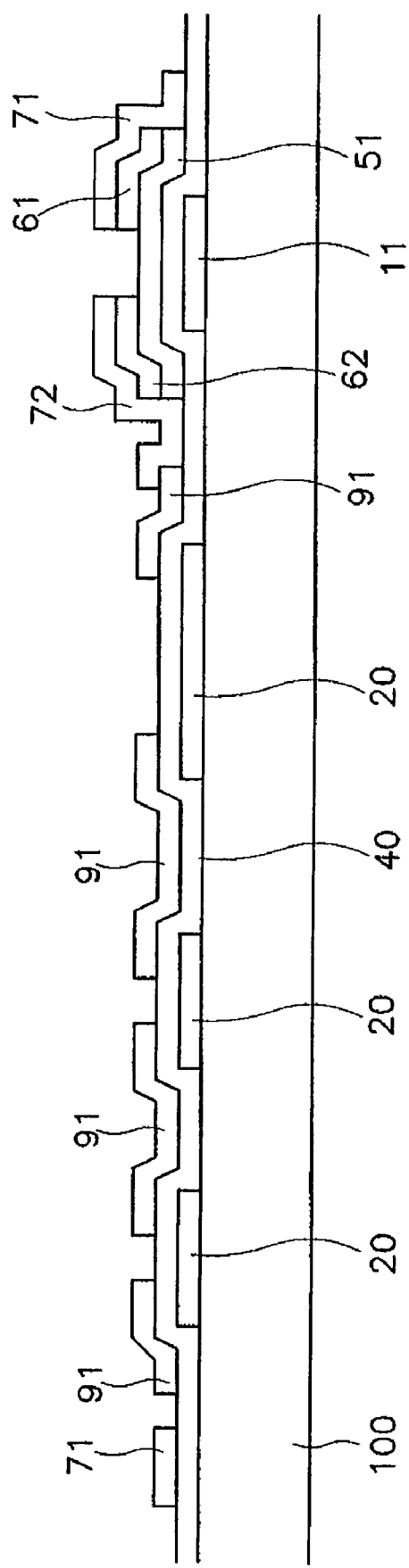
Figure 63B:
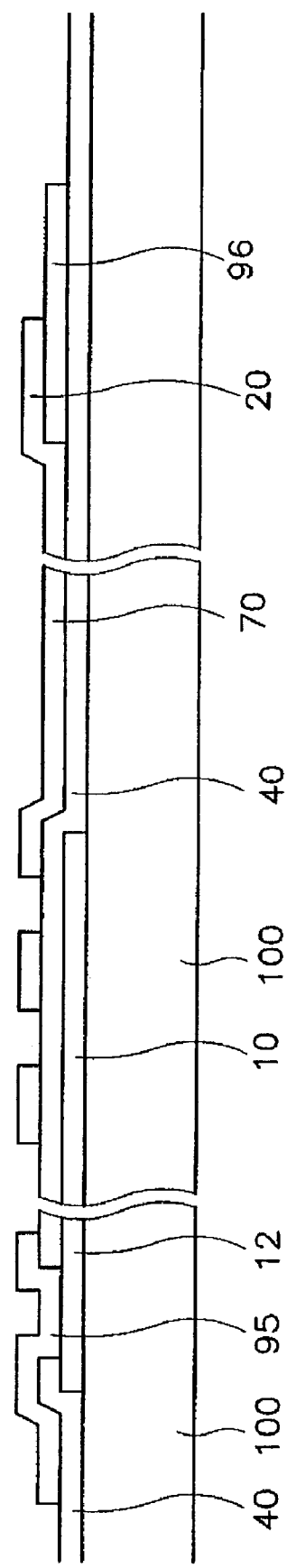

As shown in FIGS. 63A and 63B, a film made of Cr, Al, Mo and Ta or their alloys are deposited and patterned by using a fifth mask to form a data wire including data lines 70, a source electrode 71 and a drain electrodes 72. A portion of the n+ type amorphous silicon layer which is not covered by the data wire is removed to form a contact layer 61 and 62.

A passivation film 80 with thickness of 200-400 nm is deposited and patterned by using a sixth mask to form contact holes 82 and 83 and an opening 81.

As described above, the method according to the twelfth embodiment requires six masks. However, if eliminating the redundant gate pad, only 5 masks are necessary.

Figure 64:
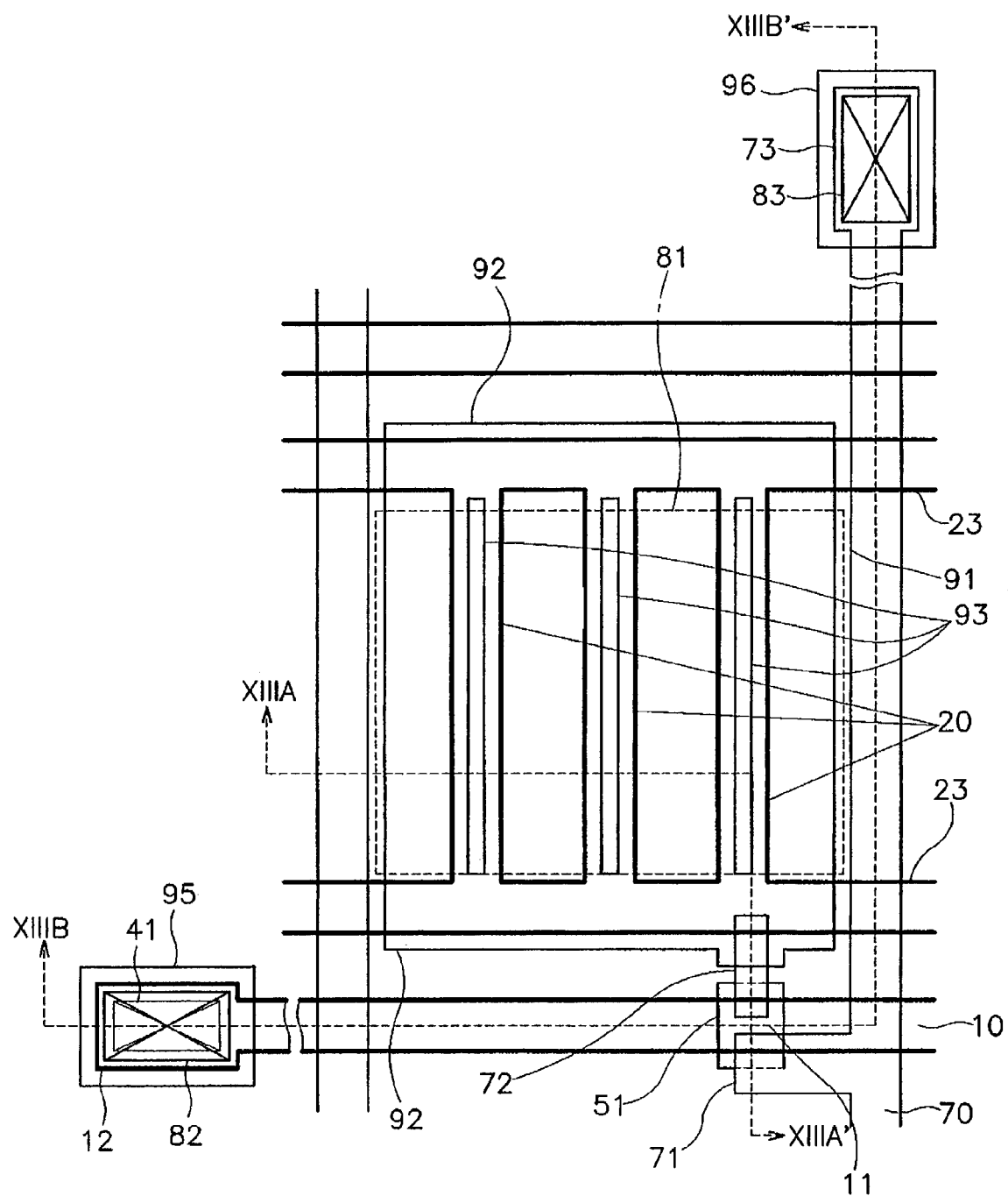
FIG. 64 is a layout view of an LCD according to a thirteenth embodiment of the present invention.
Figure 65:
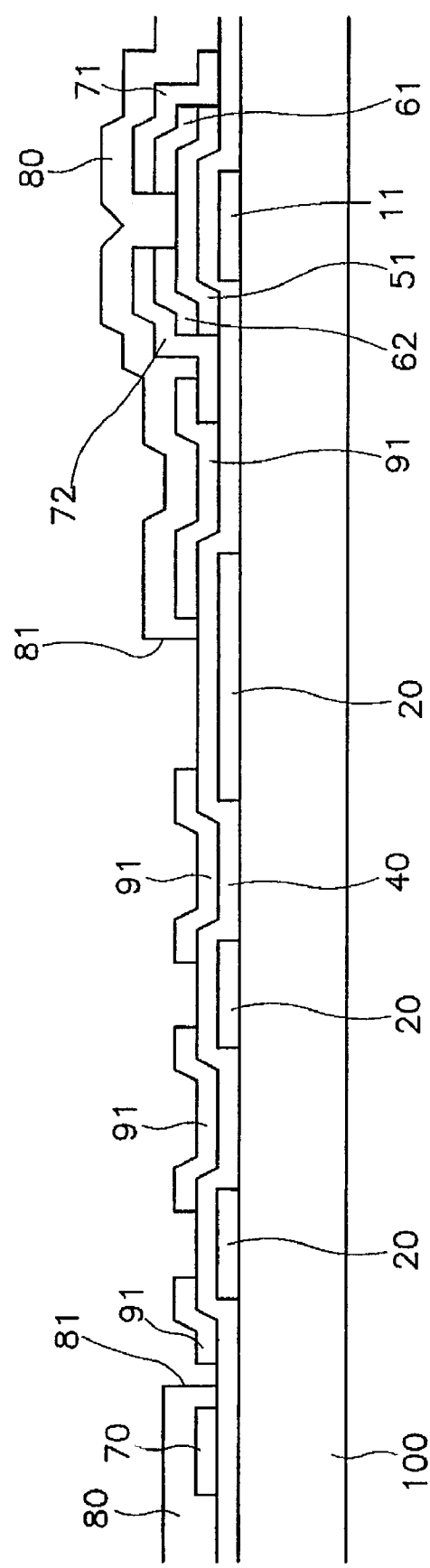

A thirteenth embodiment changed the order of the step of forming the pixel electrodes and the step of forming the data wire in the twelfth embodiment. FIG. 64 is a layout view of an LCD according to the thirteenth embodiment of the present invention, and FIGS. 65 and 66 are sectional views taken along the lines XIIIA-XIIIA' and XIIIB-XIIIB', respectively.

The structure of the LCD in this embodiment is substantially the same as that in the twelfth embodiment except the points that a connecting portion 92 is on a drain electrode 72 not under the drain electrode 72, a data pad 73 is made of the same layer as a data line 70, and a redundant data pad 96 is on the data pad 73.

A method for manufacturing the LCD according to the thirteenth embodiment of the present invention is substantially the same as that of the twelfth embodiment until the step of forming contact hole 32 in a gate insulating layer 40.

Figure 67B:
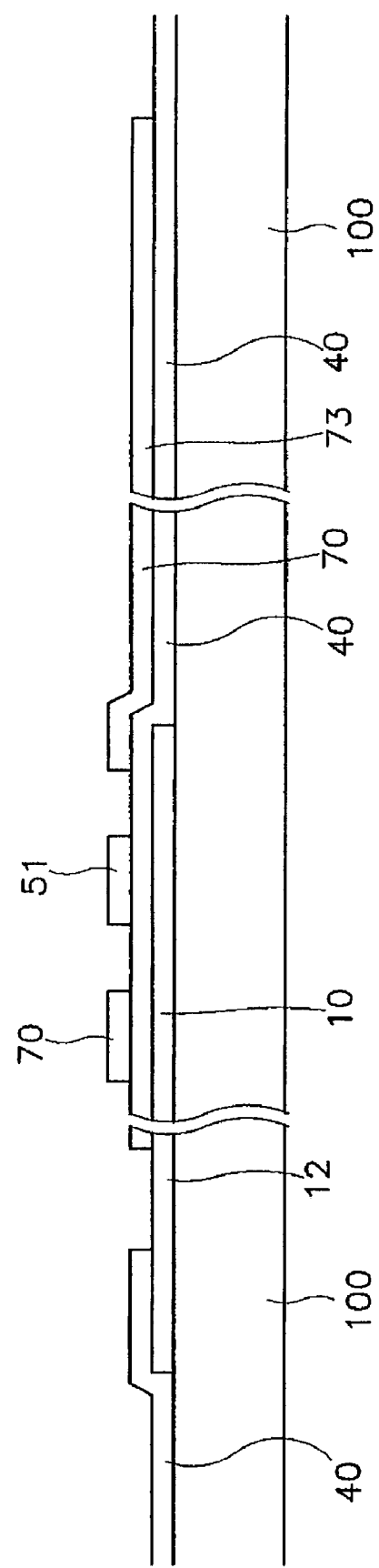
FIGS. 67A to 68B show intermediate structures of the LCD shown in FIGS. 64 to 66.

As shown in FIGS. 67A and 67B, a film made of Cr, Al, Mo and Ta or their alloys are deposited and patterned by using a fourth mask to form a data wire including data lines 70, a source electrode 71 and a drain electrodes 72. A portion of the n+ type amorphous silicon layer which is not covered by the data wire is removed to form a contact layer 61 and 62.

Figure 68A:
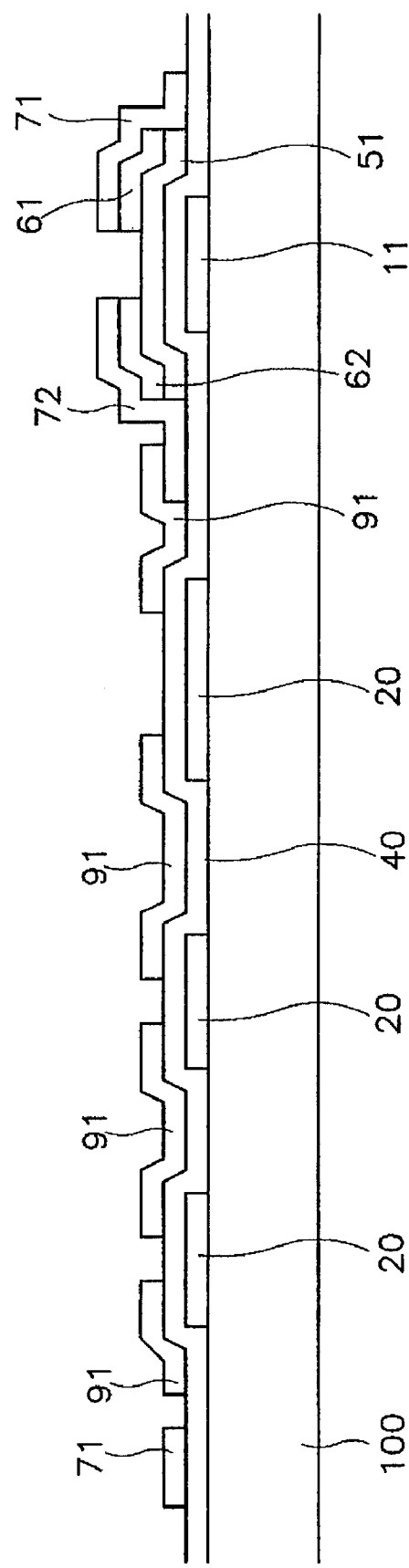
Figure 68B:
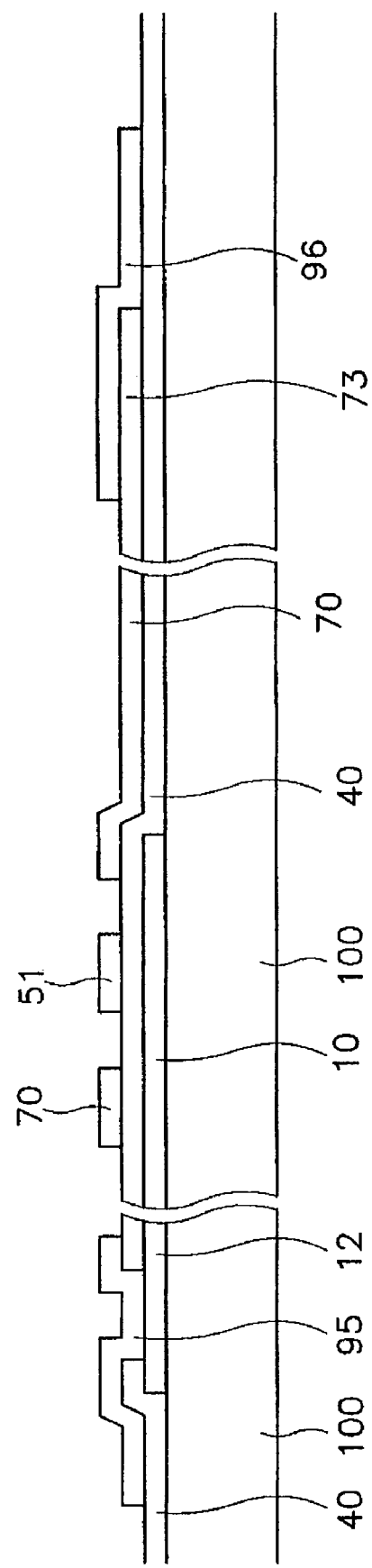

As shown in FIGS. 68A and 68B, an ITO layer is deposited and patterned by using a fifth mask to form pixel electrodes 91, connecting members 92, a redundant gate pad 95 and a data pad 96.

The step of forming a passivation layer is also the same as the twelfth embodiment.

The fourteenth embodiment suggests a structure having non-overlapping electrodes.

Figure 69:
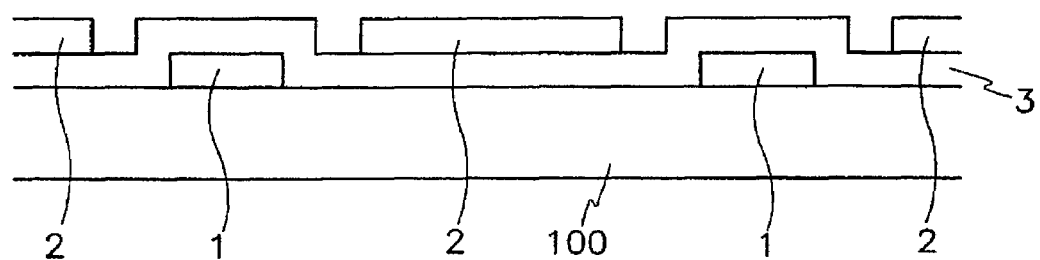
FIG. 69 is a layout view of an LCD according to a fourteenth embodiment of the present invention.

FIG. 69 is a sectional view of an LCD according to the fourteenth embodiment of the present invention.

As shown in FIG. 69, a plurality of linear first electrodes 1 are formed on an insulating substrate 100, and the first electrodes 1 are covered with an insulating layer 3. A plurality of planar second electrodes 2 are formed on the insulating layer 3, and have the width equal to or larger than that of the first electrode. The first and the second electrodes 1 and 2 do not overlap each other, but the distance therebetween is very small.

The LCD according to a fifteenth embodiment of the present invention having a thin film transistor as a switching element as well as the electrode suggested in the fourteenth embodiment, is described in detail with reference to FIGS. 70 to 72.

Figure 70:
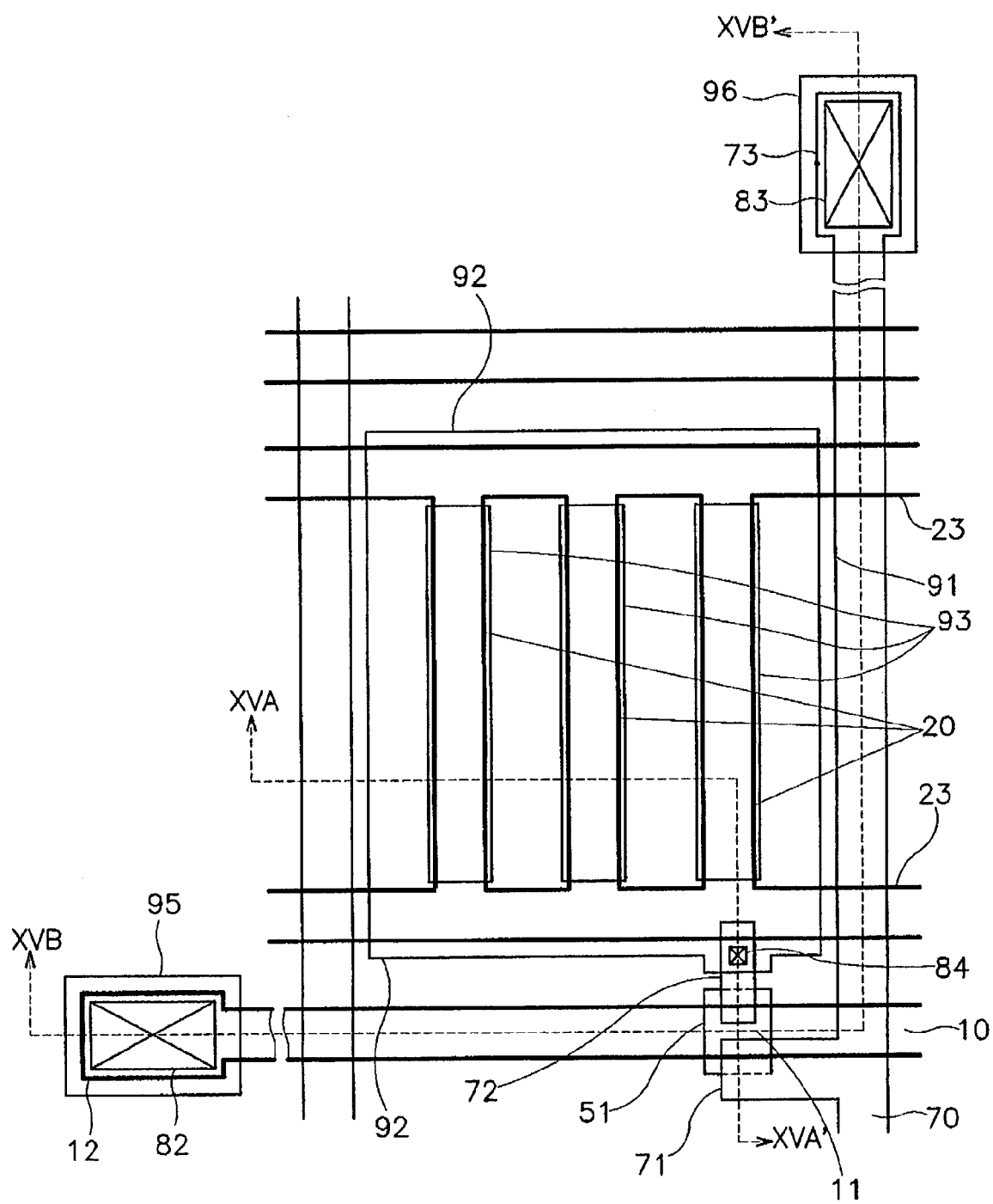
FIG. 70 is a layout view of an LCD according to a fifteenth embodiment of the present invention.
Figure 71:
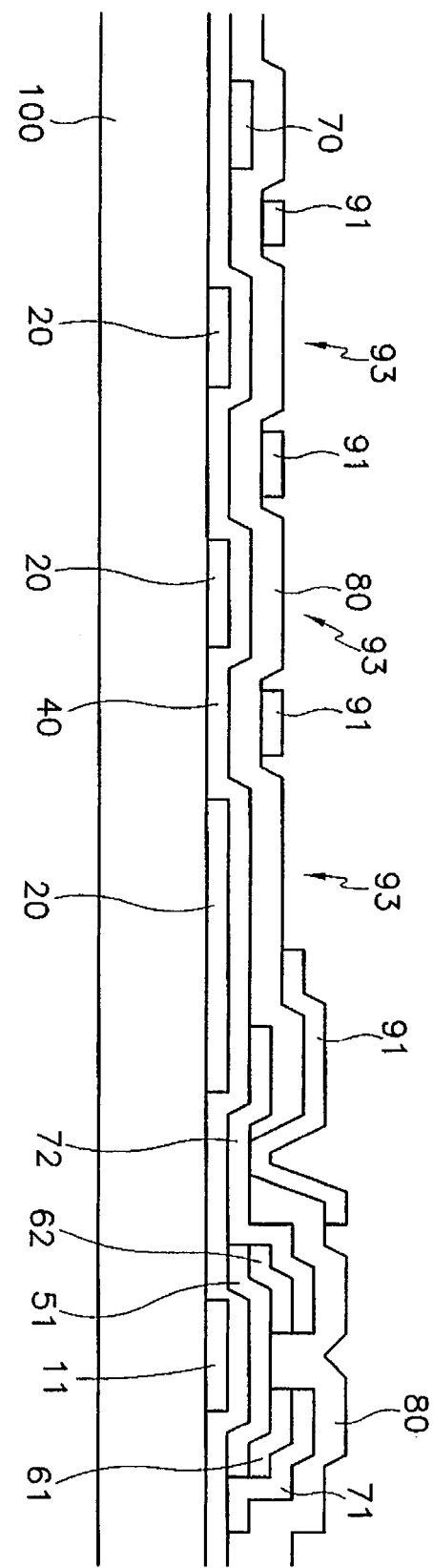
FIGS. 71 and 72 are cross-sectional views taken along lines XVA-XVA' and XVB-XVB' in FIG. 70.
Figure 72:
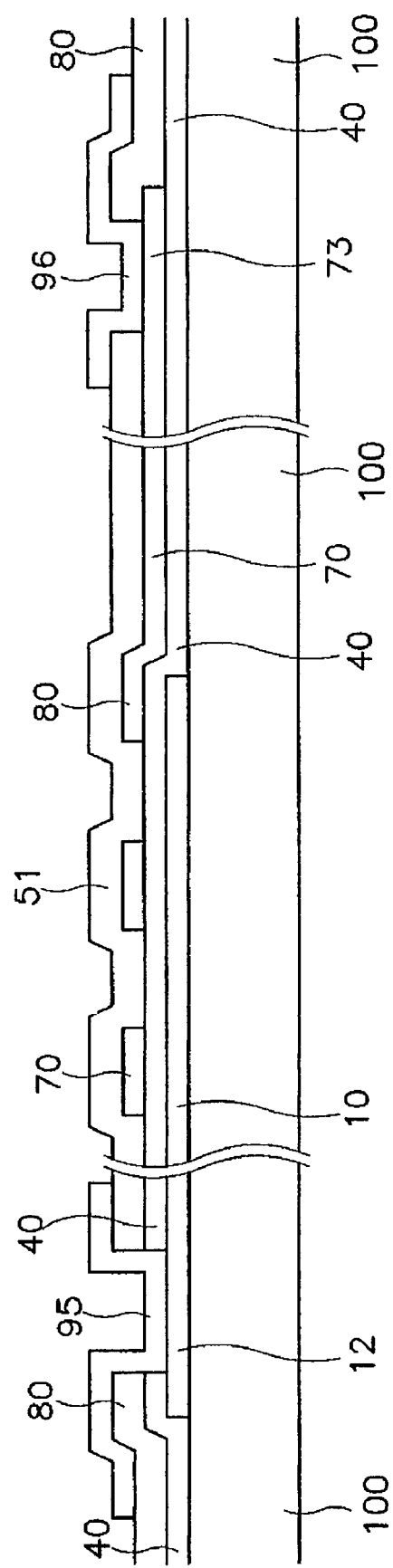

FIG. 70 is a layout of a lower substrate of an LCD according to the fifteenth embodiment of the present invention, and FIGS. 71 and 72 are sectional views taken along the lines XVA-XVA' and XVB-XVB', respectively.

Pixel electrodes 91 and common electrodes 20 do not overlap, but the distance therebetween is very small. The remaining structure is substantially the same as the eleventh embodiment. The manufacturing method is similar to that of the eleventh embodiment, and its modifications as in the twelfth and the thirteenth are possible.

The sixteenth embodiment suggests electrodes lying on the same layer.

Figure 73:
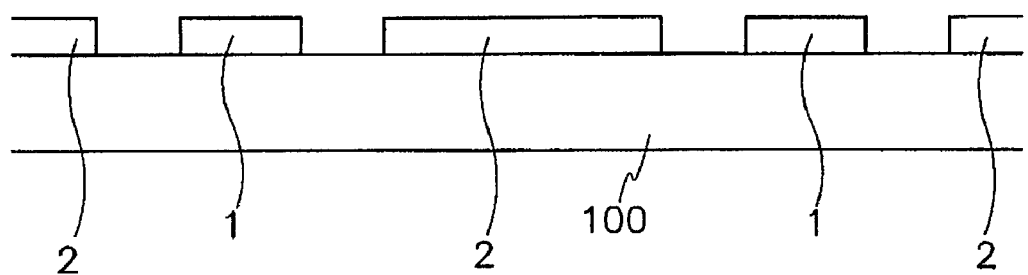
FIG. 73 is a layout view of an LCD according to a sixteenth embodiment of the present invention.

FIG. 73 is a sectional view of an LCD according to the sixteenth embodiment of the present invention.

As shown in FIG. 73, a plurality of linear first electrodes 1 are formed on an insulating substrate 100, and a plurality of planar second electrodes 2 are formed on the substrate 100 and located between the first electrodes 1. The first and the second electrodes 1 and 2 do not overlap each other, and the electric field is similar to that of the first embodiment.

The LCD according to a seventeenth embodiment of the present invention having a thin film transistor as a switching element as well as the electrode suggested in the fourteenth embodiment, is described in detail with reference to FIGS. 74 to 76.

Figure 74:
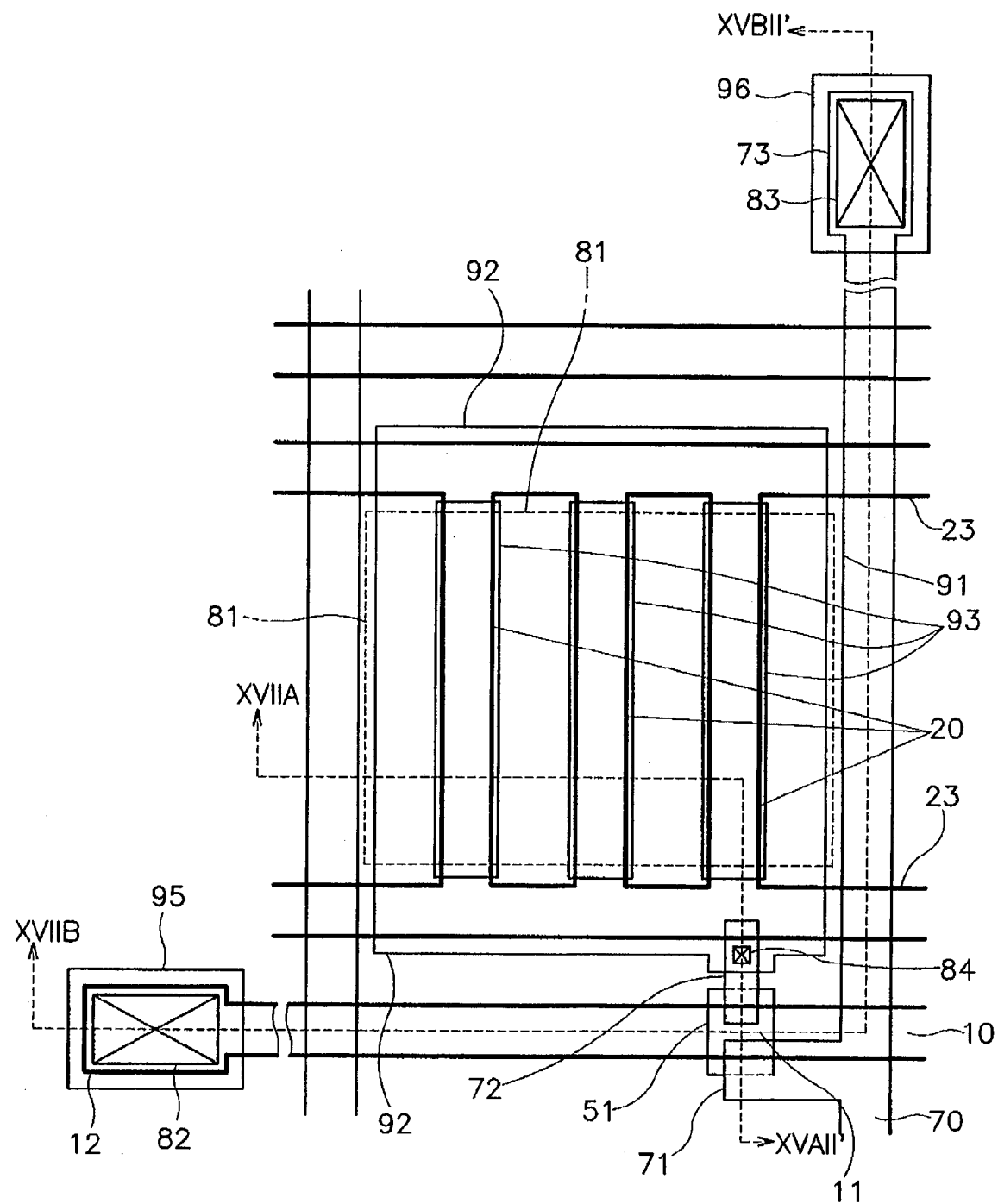
FIG. 74 is a layout view of an LCD according to a seventeenth embodiment of the present invention.
Figure 75:
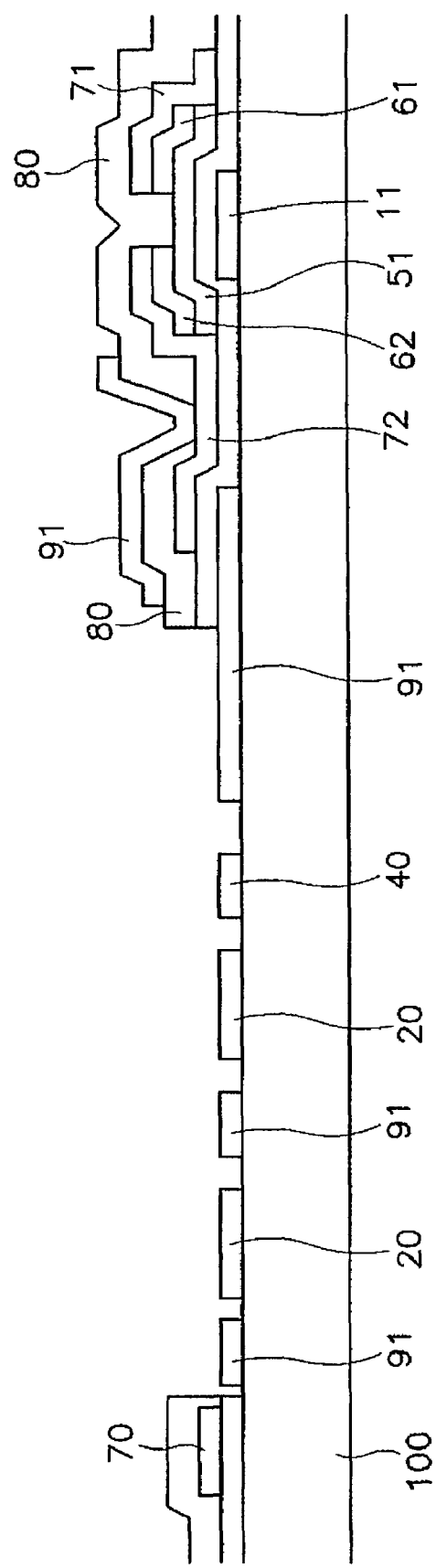
FIGS. 75 and 76 are cross-sectional views taken along lines XVIIA-XVIIA' and XVIIB-XVIIB' in FIG. 74.
Figure 76:
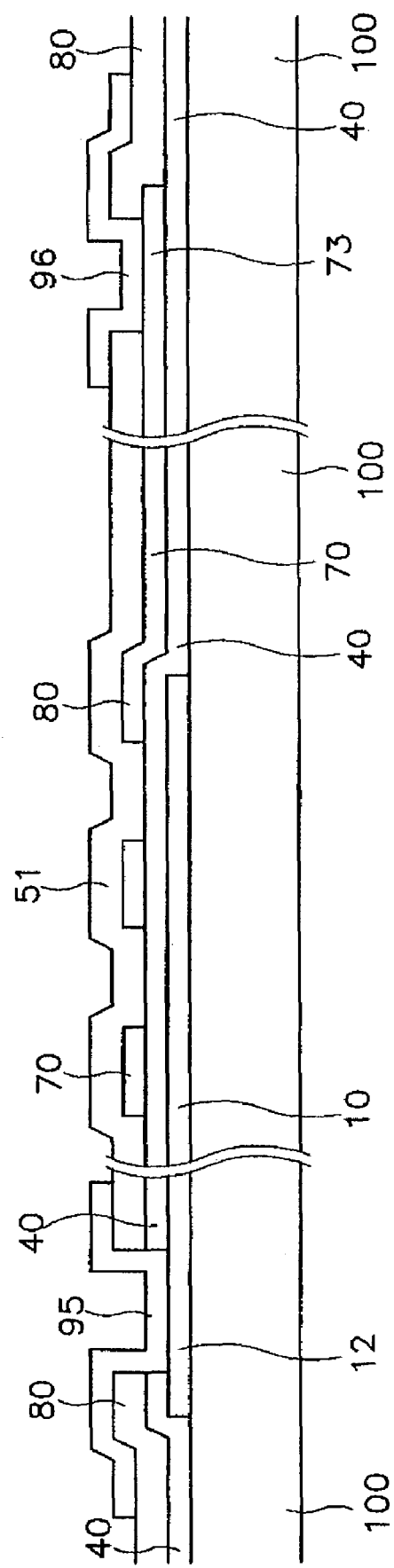

FIG. 74 is a layout of a lower substrate of an LCD according to the seventeenth embodiment of the present invention, and FIGS. 75 and 76 are sectional views taken along the lines XVIIA-XVIIA' and XVIIB-XVIIB', respectively.

A portion of a gate insulating layer 40 in the pixel region surrounded by gate lines 10 and data lines 70 is removed, and pixel electrodes 91 lie between the common electrodes 20. The remaining structure is substantially the same as the fourteenth embodiment. The manufacturing method is similar to that of the eleventh embodiment, and its modifications as in the twelfth and the thirteenth are possible.

Now, embodiments having electrodes on the upper substrate as well as those on the lower substrate will be described.

Figure 77:
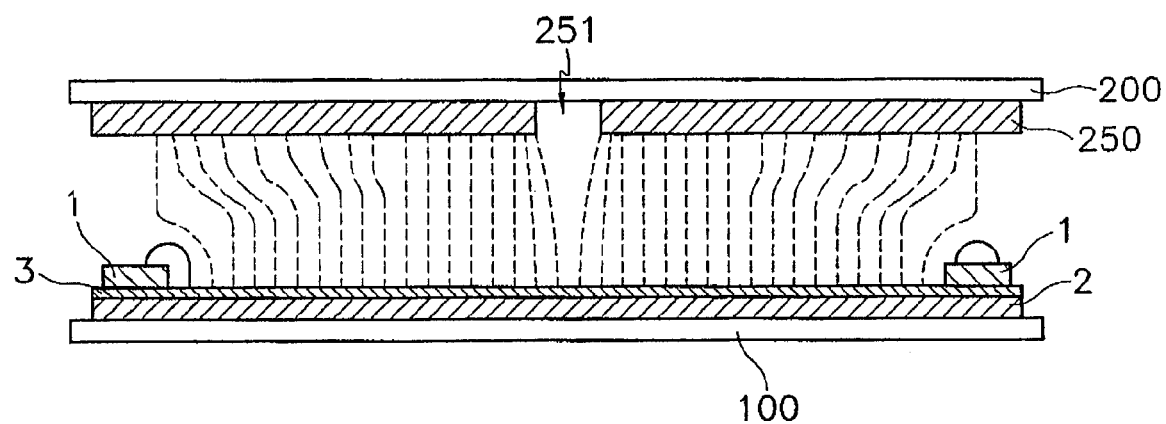
FIGS. 77 to 79 are cross-sectional views of LCDs according to an eighteenth through a twentieth embodiments of the present invention.

In the eighteenth embodiment, a planar electrode 2 is formed on a lower substrate 100 and covered with an insulating layer 3 as shown in FIG. 77. A plurality of linear electrodes 1 made of Cr or ITO are formed on the insulating layer 3. An upper electrode 250 is formed on an upper substrate 200. Since field strength is stronger, the response time becomes short and the arrangement of the liquid crystal molecules is stable. Moreover, since the upper electrode 250 has an aperture 251 causing fringe field, the arrangement of the liquid crystal molecules varies depending on the domains.

Figure 78:
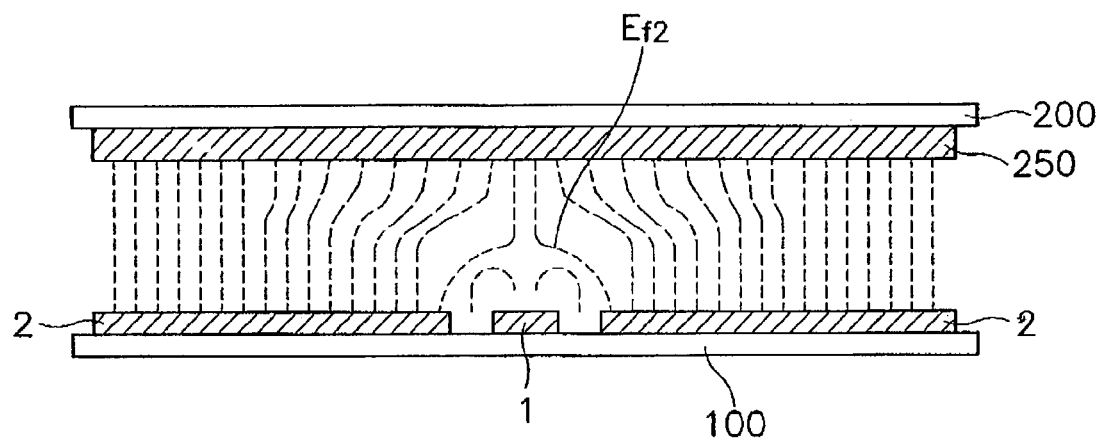
Figure 79:
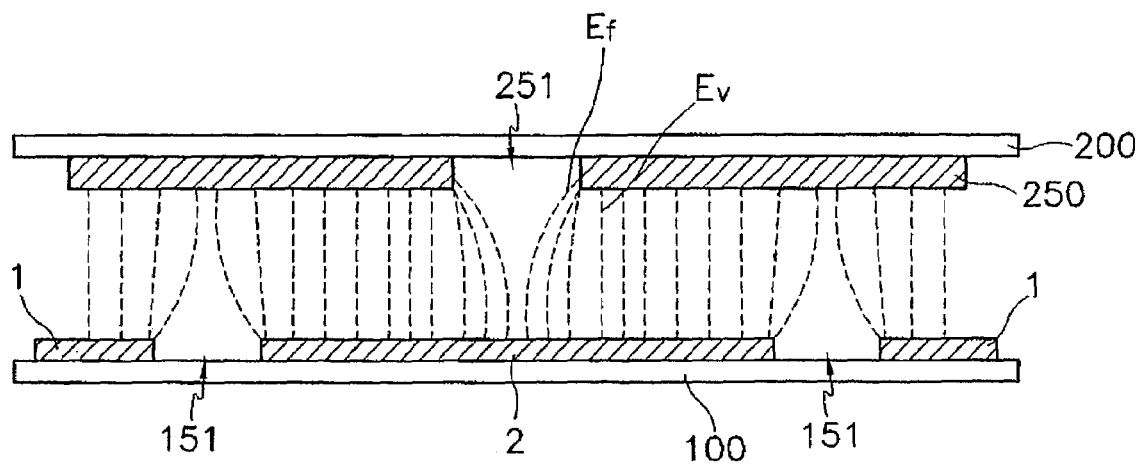

The planar and the linear electrodes 2 and 1 according to the nineteenth embodiment lie on the same plane as shown in FIG. 78. Also, in this case, the upper electrode 250 according to the twentieth embodiment has an aperture 251 as shown in FIG. 79.

In the meantime, as shown in the graph shown in FIG. 10, the transmittance for the red and the green pixels is about 0.1 and that for the blue pixels is about 0.08 which is lower than the red and the green pixels by 20%. In order to reduce this difference between the transmittance for respective pixels, the aperture ratio may be adjusted depending on the color.

Figure 80:
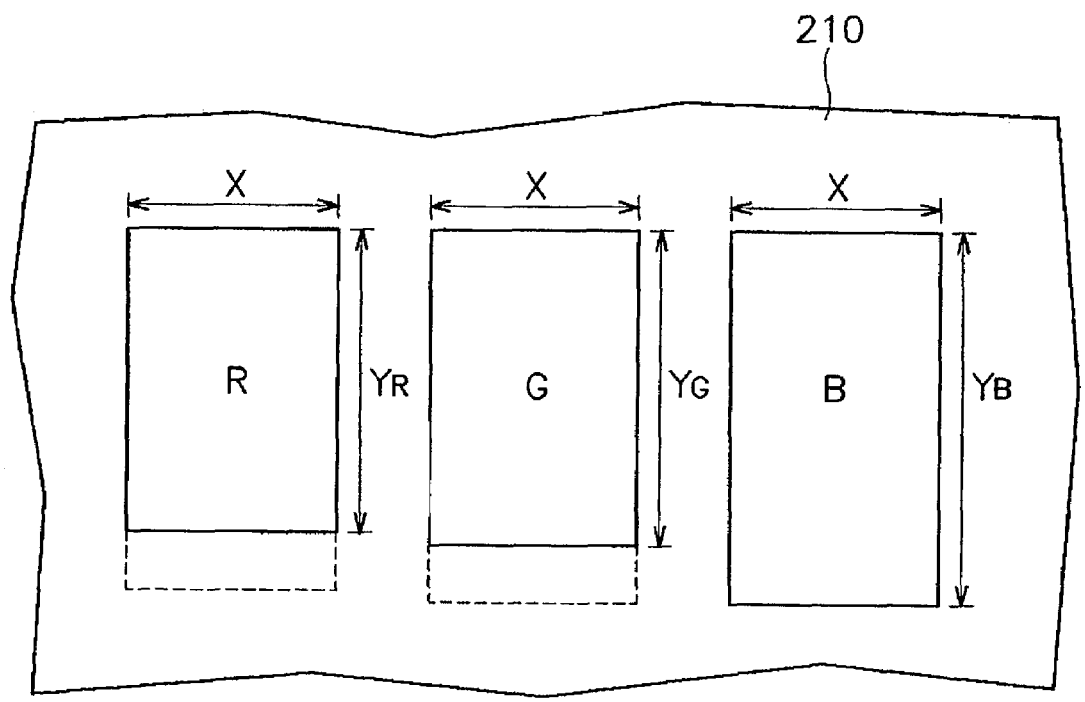
FIG. 80 shows an LCD according to a twenty-first embodiments of the present invention.

FIG. 80 shows a plan view of a black matrix for an LCD according to the twenty-first embodiment. In FIG. 80, the reference numeral 210 represents a black matrix which may be formed either on an upper substrate or on the lower substrate, and R, G and B indicates the red, the green and the blue pixels respectively. The area of the openings is determined by the relation TR*SR=TG*SG=TB*SB where TR, TG and TB are transmittances for red, green and blue pixels and SR, SG and SB are the area of the openings for red, green and blue pixels. As a result, the aperture ratio increases as the transmittance decreases.

As described above, the viewing angle can be widened, the driving voltage can be lowered down, and the aperture ratio can be increased.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A liquid crystal display (LCD), comprising:
   a first substrate having a plurality of gate lines and a plurality of data lines;
   a second substrate facing the first substrate;
   a liquid crystal layer formed between the first substrate and second substrate and comprising a plurality of liquid crystal molecules;
   a plurality of pixel regions formed between the first substrate and the second substrate and districted by the gate lines and data lines;
   a plurality of pixel electrodes formed in the pixel regions, respectively, on the first substrate; and
   a plurality of planar common electrodes formed in the pixel regions, respectively, on the first substrate, and electrically connected to each other,
   wherein the plurality of pixel electrodes overlap the plurality of common electrodes to form storage capacitors in each pixel region, and wherein each of the plurality of pixel electrodes includes a plurality of linear pixel electrodes connected to each other by a connecting portion, and the common electrode in each pixel region includes a single continuous planer portion extending in a first direction parallel to the connecting portion from a first linear pixel electrode to a last linear pixel electrode connected by the connecting portion, wherein the single continuous planar portion overlaps and runs between each of the linear pixel electrodes in each pixel region.

2. The LCD of claim 1, further comprising an insulating layer formed between the pixel electrodes and the common electrodes.

3. The LCD of claim 2, wherein the pixel electrodes are located under the insulating layer, and the common electrodes are located on the insulating layer.

4. The LCD of claim 2, wherein the pixel electrodes are located on the insulating layer, and the common electrodes are located under the insulating layer.

5. The LCD of claim 4, further comprising a main connection connecting the common electrodes.

6. The LCD of claim 5, further comprising a redundant connection formed on the main connection.

7. The LCD of claim 5, further comprising a redundant connection formed under the main connection.

8. The LCD of claim 5, wherein the main connection is located on the common electrodes.

9. The LCD of claim 1, further comprising:
   a light blocking film formed on the first substrate covering a region between the data line and the common electrodes and the pixel electrodes adjacent to the data line.

10. The LCD of claim 1, wherein the pixel electrodes and the common electrodes are located on the same plane.

11. The LCD of claim 1, further comprising:
   a plurality of color filters formed on the second substrate; and
   a black matrix formed on the second substrate and having a plurality of openings exposing the color filters,
   wherein areas of the openings vary depending on colors of the color filters exposed by the openings.

12. The LCD of claim 11, wherein the area of the opening exposing a blue color filter is greater than the area of the opening exposing a red color filter and the area of the opening exposing a green color filter.

13. The LCD of claim 6, further comprising a buffer layer interposed between the main connection and the redundant connection.

14. The LCD of claim 13, wherein the buffer layer comprises a refractory metal.

15. The LCD of claim 9, wherein part of the light blocking film is formed on the common electrode.

16. The LCD of claim 1, wherein the single continuous planar portion extends in a second direction perpendicular to the connecting portion and parallel to a lengthwise direction of the linear pixel electrodes to substantially the entire length of each of the linear pixel electrodes without overlapping the connecting portion.

17. The LCD of claim 1, wherein at least three linear pixel electrodes are connected by the connecting portion and overlapped by the single continuous planar portion of the common electrode.

* * * * *